US012552865B2

United States Patent
Ho et al.

(10) Patent No.: US 12,552,865 B2
(45) Date of Patent: Feb. 17, 2026

(54) HIGH AFFINITY NANOBODIES TARGETING B7-H3 (CD276) FOR TREATING MULTIPLE SOLID TUMORS

(71) Applicant: The U.S.A., as represented by the Secretary, Department of Health and Human Services, Bethesda, MD (US)

(72) Inventors: Mitchell Ho, Urbana, MD (US); Ruixue Wang, Bethesda, MD (US); Bradley St. Croix, Frederick, MD (US); Dan Li, Rockville, MD (US)

(73) Assignee: The United States of America, as represented by the Secretary, Department of Health and Human Services, Bethesda, MD (US)

( * ) Notice: Subject to any disclaimer, the term of this patent is extended or adjusted under 35 U.S.C. 154(b) by 791 days.

(21) Appl. No.: 17/770,940

(22) PCT Filed: Oct. 21, 2020

(86) PCT No.: PCT/US2020/056601
§ 371 (c)(1),
(2) Date: Apr. 21, 2022

(87) PCT Pub. No.: WO2021/081052
PCT Pub. Date: Apr. 29, 2021

(65) Prior Publication Data
US 2022/0380471 A1    Dec. 1, 2022

Related U.S. Application Data

(60) Provisional application No. 62/924,298, filed on Oct. 22, 2019.

(51) Int. Cl.
| | | |
|---|---|---|
| C07K 16/28 | (2006.01) |
| A61K 40/11 | (2025.01) |
| A61K 40/31 | (2025.01) |
| A61K 40/42 | (2025.01) |
| A61P 35/00 | (2006.01) |
| G01N 33/574 | (2006.01) |

(52) U.S. Cl.
CPC .......... *C07K 16/2827* (2013.01); *A61K 40/11* (2025.01); *A61K 40/31* (2025.01); *A61K 40/421* (2025.01); *A61K 40/4211* (2025.01); *A61P 35/00* (2018.01); *G01N 33/574* (2013.01); *A61K 2239/28* (2023.05); *A61K 2239/31* (2023.05); *A61K 2239/38* (2023.05); *A61K 2239/47* (2023.05); *A61K 2239/54* (2023.05); *C07K 2317/22* (2013.01); *C07K 2317/24* (2013.01); *C07K 2317/565* (2013.01); *C07K 2317/569* (2013.01); *C07K 2319/03* (2013.01)

(58) Field of Classification Search
CPC ............ C07K 16/2827; C07K 2317/22; C07K 2317/24; C07K 2317/565; C07K 2317/569; C07K 2319/03; C07K 2317/33; A61K 40/11; A61K 40/31; A61K 40/421; A61K 40/4211; A61K 2239/28; A61K 2239/31; A61K 2239/38; A61K 2239/47; A61K 2239/54; A61K 47/6849; A61K 39/001111; A61P 35/00; G01N 33/574; G01N 2333/70532
See application file for complete search history.

(56) References Cited

U.S. PATENT DOCUMENTS

2020/0283729 A1    9/2020    Loew et al.

FOREIGN PATENT DOCUMENTS

| CN | 106163547 A | 11/2016 |
| WO | WO 2017/180813 | 10/2017 |
| WO | WO 2019/200022 | 10/2019 |

OTHER PUBLICATIONS

Du et al., "Antitumor Responses in the Absence of Toxicity in Solid Tumors by Targeting B7-H3 via Chimeric Antigen Receptor T Cells," *Cancer Cell*, vol. 35:221-237, 2019.
Feng et al., "Isolation of Rabbit Single Domain Antibodies to B7-H3 via Protein Immunization and Phage Display," *Antibody Ther.*, vol. 3:10-17, 2020.
International Search Report and Written Opinion, PCT/US2020/056601, dated Mar. 29, 2021 (26 pages).
Mohanty et al., "CAR T cell therapy: A new era for cancer treatment (Review)," *Oncol. Rep.*, vol. 42:2183-2195, 2019.
Seaman et al., "Eradication of Tumors through Simultaneous Ablation of CD276/B7-H3-Positive Tumor Cells and Tumor Vasculature," *Cancer Cell*, vol. 31: 501-515, 2017.
Shinozaki et al., "Efficient Generation of Single Domain Antibodies with High Affinities and Enhanced Thermal Stabilities," *Sci. Rep.*, vol. 7:5794, 2017 (11 pages).
Xie et al., "Nanobody-based CAR T Cells that Target the Tumor Microenvironment Inhibit that Growth of Solid Tumors in Immunocompetent Mice," *Proc. Natl. Acad. Sci. USA*, vol. 116:7624-7631, 2019.

*Primary Examiner* — Misook Yu
*Assistant Examiner* — Grace H Lunde
(74) *Attorney, Agent, or Firm* — Klarquist Sparkman, LLP

(57) ABSTRACT

Single-domain monoclonal antibodies that specifically bind B7H3 (also known as CD276) are described. The single-domain antibodies include camel $V_HH$ and rabbit VH domain nanobodies selected from phage display libraries. Chimeric antigen receptors (CARs) and other antibody conjugates targeted to B7H3 are also described. The single-domain antibodies and conjugates thereof can be used for the diagnosis and treatment of B7H3 expressing solid tumors.

31 Claims, 41 Drawing Sheets
Specification includes a Sequence Listing.

FIG. 3A

|  |  | CDR1 | CDR2 |
|---|---|---|---|
| A1 (1) | 1 | -QSLEESGGGLVTPGGTLTLTCTVS | GFSLSSYGMS | WVRQAPGKGLEWIGS | MAWNGDP | YASWAKGRFTI |
| B1 (1) | 1 | QEQLKESGGRLVTPGTPLTLTCTVS | GFSPNNYGVS | WVRQPPGKGLEWIGM | SSTAGAT | YANWAKGRFTI |
| 5DUB (1) | 1 | -XSVEESGGRLVTPGTPLTLTCTVS | GFSLSTYYTM | NWVRQAPGKGLEWIGD | IYTDGNT | YANWAKGRFTI |

|  |  | CDR3 |  |
|---|---|---|---|
| A1 (70) | 70 | SKTSTTVDLKITSPTTEDTATYFCVR-----APWGSHSM | WGPGTLVTVSS |
| B1 (69) | 69 | SNTSTTVDLEITSPTTEDTATYFCAKGTPSLSYGN---IW | GPGTLVTVSS |
| 5DUB (69) | 69 | SKTSTTVDLKITSPTTEDTATYFCARDSWDASSYYGLDL | WGQGTLVTVSS |

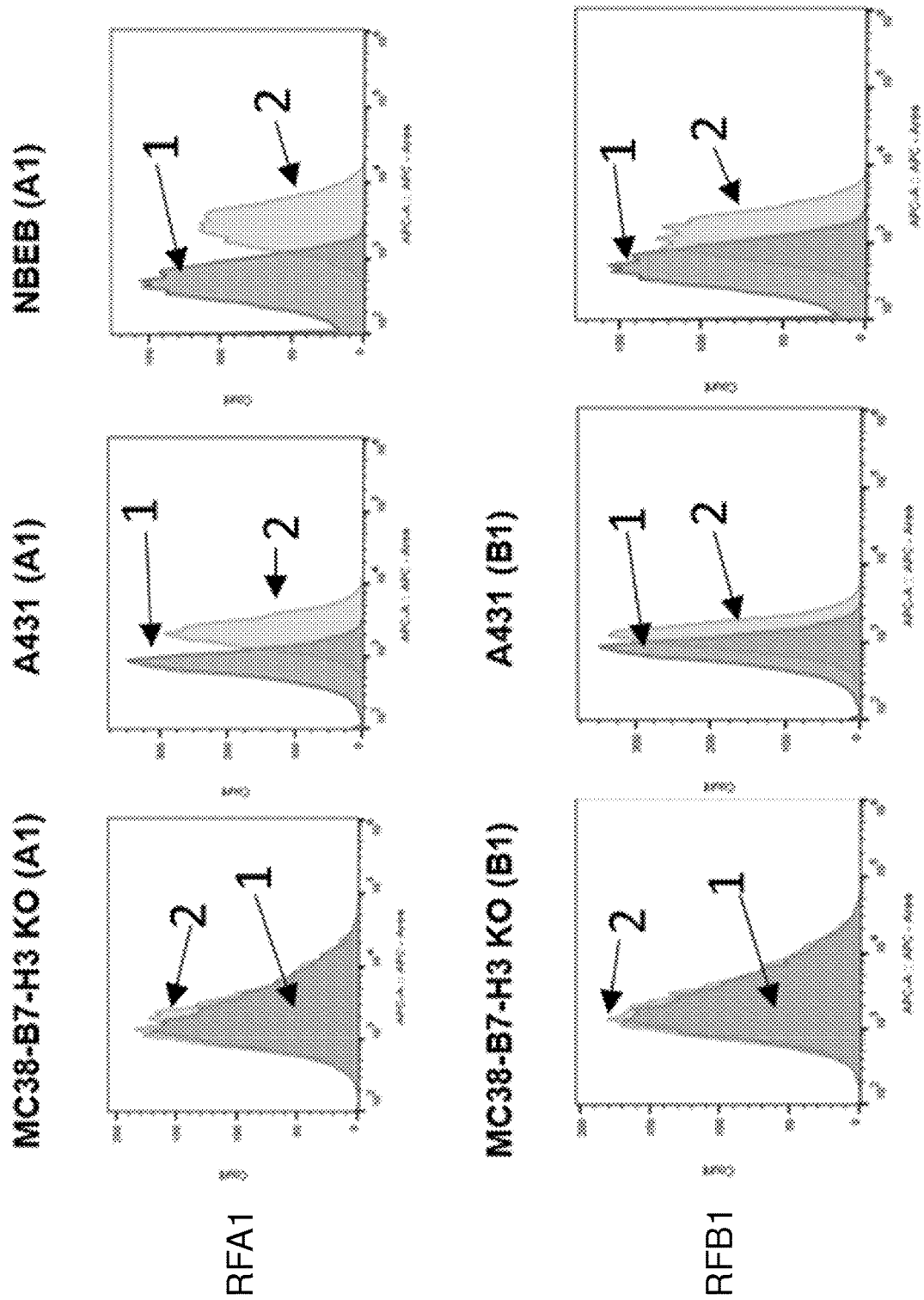

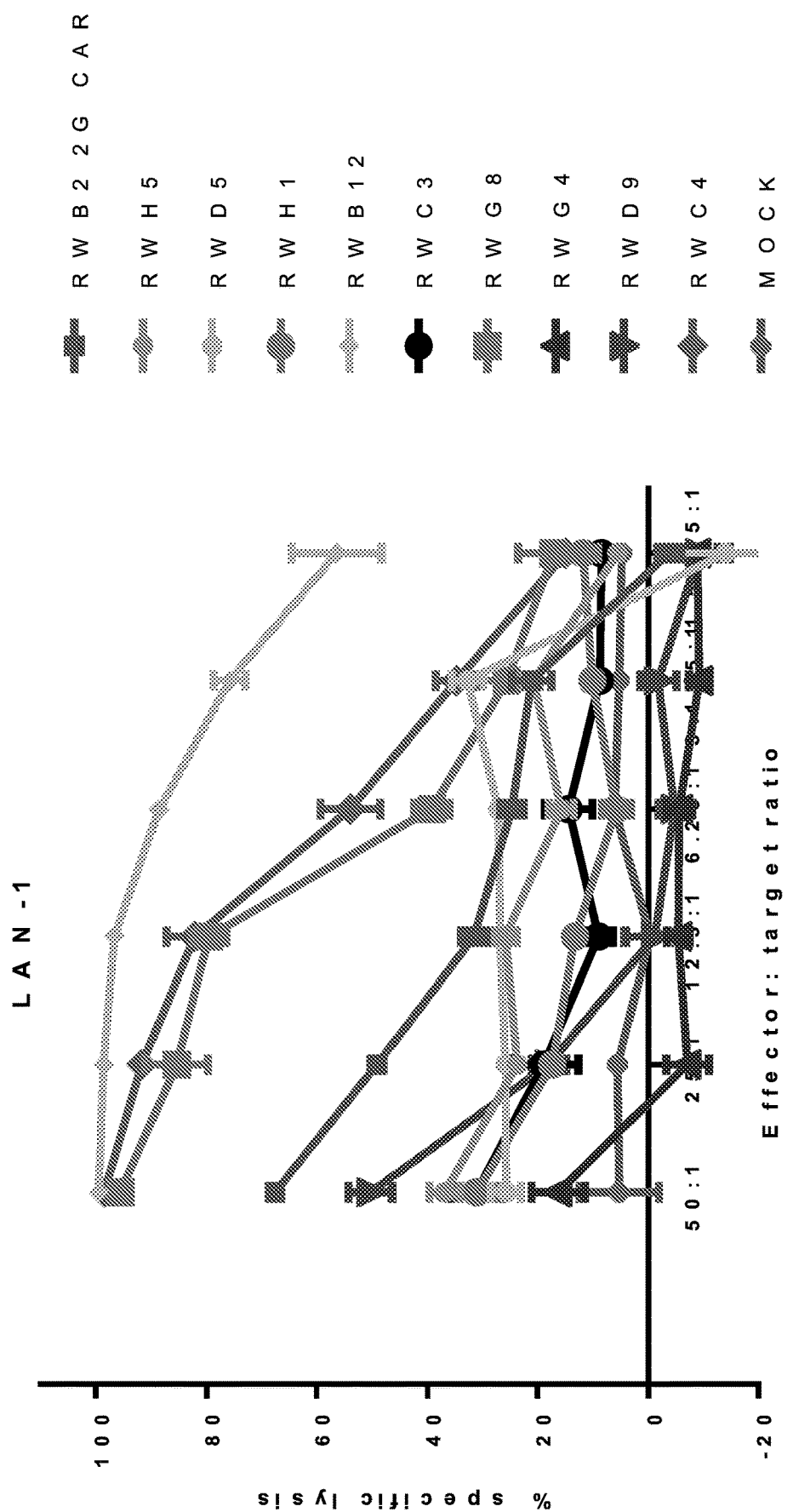

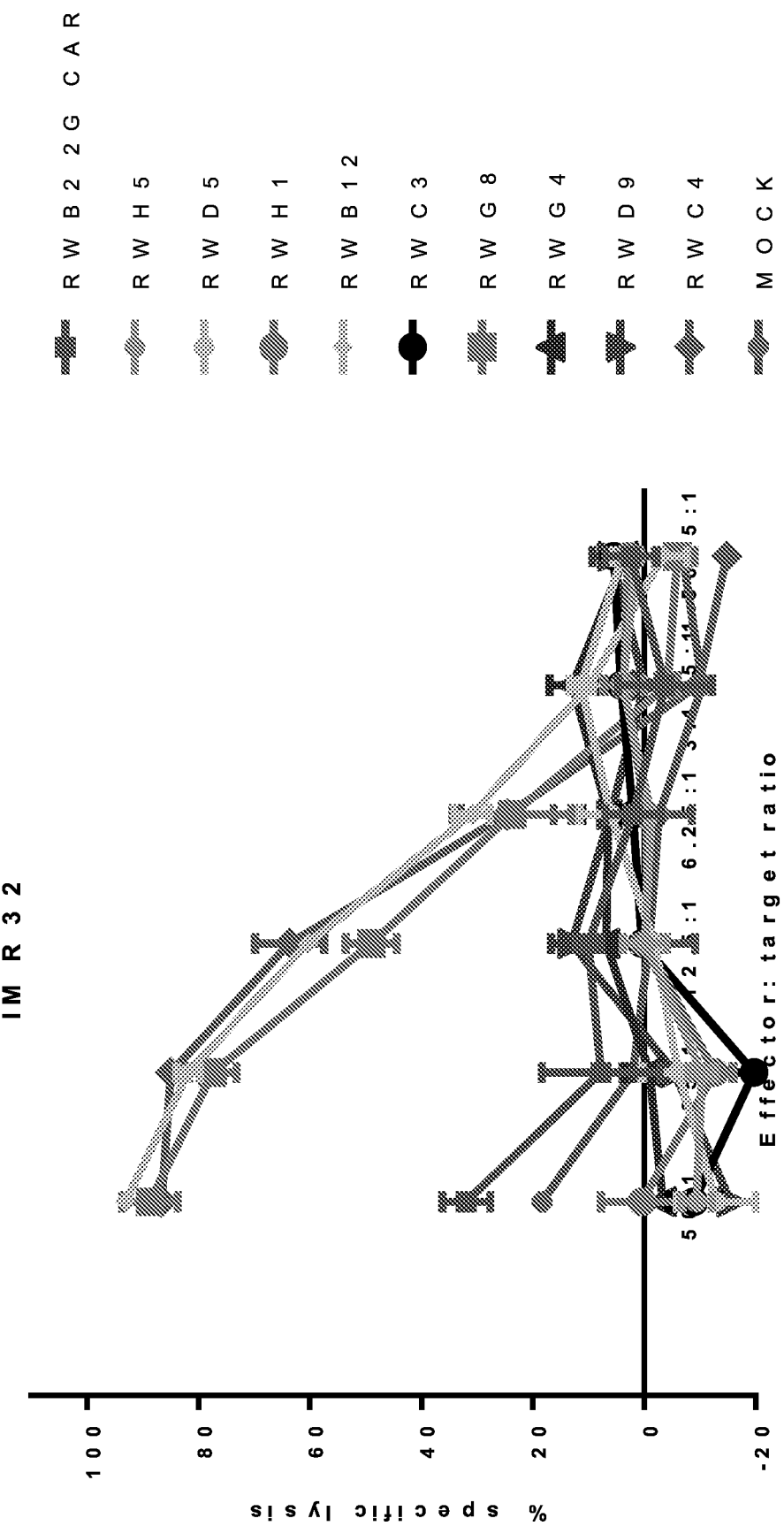

FIG. 21C

Peptide #10: QRVRVADEGSFTCFVSIR
Peptide #11: SFTCFVSIRDFGSAAVSL
Peptide #15: LRPGDTVTITCSSYQGYP

FIG. 22

| | B12 | | | C4 | | | G8 | | | 376.96 | | |
|---|---|---|---|---|---|---|---|---|---|---|---|---|
| Rat | 0.3718 | 0.4075 | 0.3594 | 0.0683 | 0.0688 | 0.0685 | 1.6838 | 1.7402 | 1.7268 | 0.9814 | 1.0111 | 1.0565 |
| Human | 0.1807 | 0.2104 | 0.1991 | 0.9763 | 0.9791 | 0.9377 | 0.1362 | 0.1473 | 0.1638 | 1.4823 | 1.5659 | 1.4414 |
| Monkey | 0.1875 | 0.2006 | 0.1784 | 1.0019 | 1.0023 | 1.0414 | 0.1971 | 0.1984 | 0.1958 | 1.5898 | 1.5866 | 1.6536 |
| Mouse-1 (msB7H3) | 0.0714 | 0.0683 | 0.0702 | 0.0616 | 0.0533 | 0.0488 | 0.2361 | 0.2327 | 0.2242 | 0.1402 | 0.1562 | 0.1338 |
| Mouse-2 (mB7H3) | 0.0742 | 0.0771 | 0.0764 | 0.0791 | 0.0498 | 0.0468 | 0.3168 | 0.3325 | 0.2945 | 0.1574 | 0.1451 | 0.1837 |
| B7H3 R&D | 0.0582 | 0.0559 | 0.0955 | 0.1315 | 0.1513 | 0.1563 | 0.0696 | 0.0632 | 0.0646 | 0.9909 | 0.9934 | 1.0689 |
| B7H3-Fc | 0.8785 | 0.9459 | 0.9522 | 2.0063 | 1.9873 | 1.9504 | 1.9664 | 2.0073 | 1.8715 | 1.6051 | 1.5873 | 1.5903 |
| B7H3-his | 0.0603 | 0.0595 | 0.0946 | 0.1144 | 0.0879 | 0.0814 | 0.0693 | 0.0686 | 0.0636 | 0.8111 | 0.8125 | 0.8133 |
| Irrelevant antigen | 0.08 | 0.0864 | 0.0853 | 0.0845 | 0.0888 | 0.1023 | 0.1044 | 0.0983 | 0.1149 | 0.0531 | 0.0634 | 0.0624 |
| PDL1-Fc | 0.0639 | 0.0685 | 0.0624 | 0.0625 | 0.0627 | 0.0613 | 0.0653 | 0.0639 | 0.0999 | 0.0652 | 0.0812 | 0.0749 |
| HN3-Fc | 0.0533 | 0.0616 | 0.0488 | 0.0801 | 0.0467 | 0.0463 | 0.0514 | 0.0535 | 0.0545 | 0.0541 | 0.0521 | 0.0521 |

SEQUENCE LISTING

```
<160> NUMBER OF SEQ ID NOS: 37

<210> SEQ ID NO 1
<211> LENGTH: 130
<212> TYPE: PRT
<213> ORGANISM: Artificial Sequence
<220> FEATURE:
<223> OTHER INFORMATION: Synthetic polypeptide

<400> SEQUENCE: 1

Gln Val Gln Leu Val Glu Ser Gly Gly Gly Ser Val Gln Val Gly Gly
1               5                   10                  15

Ser Leu Arg Leu Ser Cys Ala Ala Ser Gly Phe Thr Tyr Asn Ser Tyr
            20                  25                  30

Ser Val Gly Trp Phe Arg Gln Ala Pro Gly Lys Glu Arg Glu Gly Val
        35                  40                  45

Ala Ala Ile Asn Ser Gly Gly Ser Ser Thr Tyr Ala Ala Ser Val
    50                  55                  60

Lys Gly Arg Phe Thr Ile Ser Arg Asp Asn Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Arg Ser Pro Ser Pro Leu Thr Phe Gln Thr Arg Thr Leu Arg
                100                 105                 110

Glu Asp Ser Tyr Asn Tyr Trp Gly Gln Gly Thr Gln Val Thr Val Ser
            115                 120                 125

Ser Ser
    130

<210> SEQ ID NO 2
<211> LENGTH: 117
<212> TYPE: PRT
<213> ORGANISM: Artificial Sequence
<220> FEATURE:
<223> OTHER INFORMATION: Synthetic polypeptide

<400> SEQUENCE: 2

Asp Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Arg Tyr
            20                  25                  30

Trp Met Gly Trp Phe Arg Gln Ala Pro Gly Lys Gly Val Glu Trp Val
        35                  40                  45

Ser Thr Ile Asn Ser Gly Gly Gly Ser Thr Tyr Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Leu Asn Asn Leu Lys Thr Glu Asp Thr Ala Met Tyr Tyr Cys
                85                  90                  95
```

```
Ala Lys Glu Gln Trp Arg Thr Gly Ser Arg Gly Gln Gly Thr Gln Val
                100                 105                 110

Thr Val Ser Ser Ser
        115

<210> SEQ ID NO 3
<211> LENGTH: 126
<212> TYPE: PRT
<213> ORGANISM: Artificial Sequence
<220> FEATURE:
<223> OTHER INFORMATION: Synthetic polypeptide

<400> SEQUENCE: 3

Glu Val Gln Leu Val Glu Ser Gly Gly Gly Ser Val Gln Ala Gly Gly
1               5                   10                  15

Ser Leu Arg Leu Ser Cys Val Ala Ser Glu Asp Ser Thr Ser Ala Met
                20                  25                  30

Cys Met Gly Trp Phe Arg Gln Ala Pro Gly Lys Glu Arg Glu Gly Val
            35                  40                  45

Ala Cys Ile Asn Pro Thr Gly Glu Val Thr Trp Tyr Gly Asp Ser Val
        50                  55                  60

Lys Gly Arg Phe Thr Ile Ser Arg Asp Thr Val Lys Lys Ile Val Tyr
65                  70                  75                  80

Leu Gln Met Asn Ser Leu Lys Pro Glu Asp Thr Ala Met Tyr Tyr Cys
                85                  90                  95

Ala Ala Arg Val Thr Tyr Gly Gly Asp Trp Ser Thr Asp Thr Asp Tyr
                100                 105                 110

Glu Tyr Trp Gly Gln Gly Thr Gln Val Thr Val Ser Ser Ser
            115                 120                 125

<210> SEQ ID NO 4
<211> LENGTH: 119
<212> TYPE: PRT
<213> ORGANISM: Artificial Sequence
<220> FEATURE:
<223> OTHER INFORMATION: Synthetic polypeptide

<400> SEQUENCE: 4

Ala Val Gln Leu Val Asp Ser Gly Gly Gly Ser Val Gln Ala Gly Gly
1               5                   10                  15

Ser Leu Arg Leu Ser Cys Val Val Ser Gly Tyr Ala Phe Ser Thr Tyr
                20                  25                  30

Asp Met Ala Trp Phe Arg Gln Ala Pro Gly Glu Lys Cys Glu Trp Val
            35                  40                  45

Ser Thr Val Thr Asn Asn Gly Arg Thr Phe Tyr Ala Asp Ser Val Lys
        50                  55                  60

Gly Arg Phe Ile Ile Ser Arg Asp Asn Ala Lys Asn Ile Leu Tyr Leu
65                  70                  75                  80

Gln Met Asn Ser Leu Lys Pro Glu Asp Thr Ala Val Tyr Ser Cys Ala
                85                  90                  95

Ala Ala Gly Val Arg Trp Arg Cys Ala Ser Gly Gly Asn Glu Gly Thr
                100                 105                 110

Gln Val Thr Val Ser Ser Ser
        115

<210> SEQ ID NO 5
<211> LENGTH: 121
<212> TYPE: PRT
<213> ORGANISM: Artificial Sequence
```

<220> FEATURE:
<223> OTHER INFORMATION: Synthetic polypeptide

<400> SEQUENCE: 5

Ala Val Gln Leu Val Glu Ser Gly Gly Gly Ser Val Gln Ala Gly Gly
1               5                   10                  15

Ser Leu Arg Leu Ser Cys Lys Ala Ser Gly Tyr Cys Met Gly Trp Phe
            20                  25                  30

Arg Gln Ala Pro Gly Lys Glu Arg Glu Gly Val Ala Ala Leu Asn Thr
        35                  40                  45

Glu Gly Gly Val Thr Tyr Tyr Ala Asp Ser Val Lys Gly Arg Phe Ser
    50                  55                  60

Ile Ser Arg Asp Asn Thr Asn Leu Tyr Leu Gln Met Asn Ser Leu Lys
65                  70                  75                  80

Pro Glu Asp Thr Ala Ile Tyr Tyr Cys Ala Ala Asp Asp Arg Pro Thr
                85                  90                  95

Arg Cys Ala Val Gly Ser Leu Tyr Leu Pro Tyr Thr Tyr Arg Gly Gln
            100                 105                 110

Gly Thr Gln Val Thr Val Ser Ser
        115                 120

<210> SEQ ID NO 6
<211> LENGTH: 123
<212> TYPE: PRT
<213> ORGANISM: Artificial Sequence
<220> FEATURE:
<223> OTHER INFORMATION: Synthetic polypeptide

<400> SEQUENCE: 6

Ala Val Gln Leu Val Glu Ser Gly Gly Gly Leu Val Gln Pro Gly Gly
1               5                   10                  15

Ser Leu Ser Val Ser Cys Ala Ala Ser Gly Phe Thr Phe Ser Val Tyr
            20                  25                  30

Trp Phe Tyr Trp Val Arg Gln Ala Pro Arg Gln Gly Leu Glu Trp Val
        35                  40                  45

Ser Thr Ile Ala Ser Asn Gly Ser Thr Tyr Tyr Ser Asp Ser Val Lys
    50                  55                  60

Gly Arg Phe Thr Ile Ser Arg Asp Asn Ala Lys Asn Thr Val Tyr Leu
65                  70                  75                  80

Gln Met Asn Ser Leu Lys Pro Glu Asp Thr Ala Val Tyr Tyr Cys Val
                85                  90                  95

Ser Asp Pro Asp Tyr Tyr Ser Asp Tyr Glu Arg Glu Tyr Lys Phe Trp
            100                 105                 110

Ala Gln Gly Thr Gln Val Thr Val Ser Ser Ser
        115                 120

<210> SEQ ID NO 7
<211> LENGTH: 123
<212> TYPE: PRT
<213> ORGANISM: Artificial Sequence
<220> FEATURE:
<223> OTHER INFORMATION: Synthetic polypeptide

<400> SEQUENCE: 7

Gln Val Gln Leu Val Glu Ser Gly Gly Gly Leu Val Gln Pro Gly Gly
1               5                   10                  15

Ser Leu Ser Val Ser Cys Ala Ser Gly Phe Thr Phe Ser Val Tyr
            20                  25                  30

```
Trp Phe Tyr Trp Val Arg Gln Ala Pro Arg Gln Gly Leu Glu Trp Val
            35                  40                  45

Ser Thr Ile Ala Ser Asn Gly Ser Thr Tyr Tyr Ser Asp Ser Val Lys
 50                  55                  60

Gly Arg Phe Thr Ile Ser Arg Asp Asn Ala Lys Asn Thr Val Tyr Leu
 65                  70                  75                  80

Gln Met Asn Ser Leu Lys Pro Glu Asp Thr Ala Val Tyr Tyr Cys Val
                 85                  90                  95

Ser Asp Pro Asp Tyr Tyr Ser Asp Tyr Glu Arg Ala Tyr Lys Phe Trp
                100                 105                 110

Ala Gln Gly Thr Gln Val Thr Val Ser Ser Ser
            115                 120
```

<210> SEQ ID NO 8
<211> LENGTH: 123
<212> TYPE: PRT
<213> ORGANISM: Artificial Sequence
<220> FEATURE:
<223> OTHER INFORMATION: Synthetic polypeptide

<400> SEQUENCE: 8

```
Gln Val Gln Leu Val Gln Ser Gly Gly Gly Leu Val Gln Pro Gly Gly
  1               5                  10                  15

Ser Leu Arg Leu Ser Cys Ala Ala Ser Gly Phe Thr Phe Ser Val Tyr
                 20                  25                  30

Trp Phe Tyr Trp Val Arg Gln Ala Pro Arg Gln Gly Leu Glu Trp Val
            35                  40                  45

Ser Thr Ile Ala Ser Asn Gly Ser Thr Tyr Tyr Ser Asp Ser Val Lys
 50                  55                  60

Gly Arg Phe Thr Ile Ser Arg Asp Asn Ala Lys Asn Thr Val Tyr Leu
 65                  70                  75                  80

Gln Met Asn Ser Leu Lys Pro Glu Asp Thr Ala Val Tyr Tyr Cys Val
                 85                  90                  95

Ser Asp Pro Asp Tyr Tyr Ser Asp Tyr Glu Arg Ala Tyr Lys Phe Trp
                100                 105                 110

Ala Gln Gly Thr Gln Val Thr Val Ser Ser Ser
            115                 120
```

<210> SEQ ID NO 9
<211> LENGTH: 123
<212> TYPE: PRT
<213> ORGANISM: Artificial Sequence
<220> FEATURE:
<223> OTHER INFORMATION: Synthetic polypeptide

<400> SEQUENCE: 9

```
Glu Val Gln Leu Val Glu Ser Gly Gly Gly Leu Val Gln Pro Gly Gly
  1               5                  10                  15

Ser Leu Ser Val Ser Cys Ala Ala Ser Gly Phe Thr Phe Ser Val Tyr
                 20                  25                  30

Trp Phe Tyr Trp Val Arg Gln Ala Pro Arg Gln Gly Leu Glu Trp Val
            35                  40                  45

Ser Thr Ile Ala Ser Asn Gly Ser Thr Tyr Tyr Ser Asp Ser Val Lys
 50                  55                  60

Gly Arg Phe Thr Ile Ser Arg Asp Asn Ala Lys Asn Thr Val Tyr Leu
 65                  70                  75                  80

Gln Met Asn Ser Leu Lys Pro Glu Asp Thr Ala Val Tyr Tyr Cys Val
                 85                  90                  95
```

```
Ser Asp Pro Asp Tyr Tyr Ser Asp Tyr Glu Arg Ala Tyr Lys Phe Trp
            100                 105                 110

Ala Gln Gly Thr Gln Val Thr Val Ser Ser Ser
        115                 120
```

<210> SEQ ID NO 10
<211> LENGTH: 125
<212> TYPE: PRT
<213> ORGANISM: Artificial Sequence
<220> FEATURE:
<223> OTHER INFORMATION: Synthetic polypeptide

<400> SEQUENCE: 10

```
Ala Val Gln Leu Val Glu Ser Gly Gly Gly Val Gln Ala Gly Gly
1               5                   10                  15

Ser Leu Arg Leu Ser Cys Ala Ala Ser Gly Met Asn Leu Asp Asn Tyr
            20                  25                  30

Val Arg Gly Trp Leu Arg Gln Ala Pro Gly Ser Lys Cys Glu Phe Val
        35                  40                  45

Ser Ile Ile Arg Arg Asp Gly Thr Thr Asp Tyr Gly Asp Ser Val Lys
    50                  55                  60

Gly Arg Phe Thr Ile Ser Arg Asp Asn Ala Lys Asn Thr Val Tyr Leu
65                  70                  75                  80

Gln Met Asn Ser Leu Lys Pro Asp Asp Thr Ala Val Tyr Tyr Cys Ala
                85                  90                  95

Ala Ile Val Val Pro Arg Ala Ala Glu Tyr Ala Cys Asp Gly Leu Pro
            100                 105                 110

Tyr Arg Gly Gln Gly Thr Gln Val Thr Val Ser Ser Ser
        115                 120                 125
```

<210> SEQ ID NO 11
<211> LENGTH: 145
<212> TYPE: PRT
<213> ORGANISM: Artificial Sequence
<220> FEATURE:
<223> OTHER INFORMATION: Synthetic polypeptide

<400> SEQUENCE: 11

```
Gln Ser Leu Glu Glu Ser Gly Gly Gly Leu Val Thr Pro Gly Gly Thr
1               5                   10                  15

Leu Thr Leu Thr Cys Thr Val Ser Gly Phe Ser Leu Ser Ser Tyr Gly
            20                  25                  30

Met Ser Trp Val Arg Gln Ala Pro Gly Lys Gly Leu Glu Trp Ile Gly
        35                  40                  45

Ser Met Ala Asn Asn Gly Asp Pro Tyr Tyr Ala Ser Trp Ala Lys Gly
    50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Val Arg Ala Pro
                85                  90                  95

Trp Gly Ser His Ser Met Trp Gly Pro Gly Thr Leu Val Thr Val Ser
            100                 105                 110

Ser Gly Gly Gly Gly Ser Gly Gly Gly Ser Gly Gly Gly Gly Ser
        115                 120                 125

Asp Pro Val Leu Thr Gln Thr Ala Gly Gly Thr Asn Val Glu Ile
    130                 135                 140

Lys
```

-continued

145

<210> SEQ ID NO 12
<211> LENGTH: 151
<212> TYPE: PRT
<213> ORGANISM: Artificial Sequence
<220> FEATURE:
<223> OTHER INFORMATION: Synthetic polypeptide

<400> SEQUENCE: 12

Gln Glu Gln Leu Lys Glu Ser Gly Gly Arg Leu Val Thr Pro Gly Thr
1               5                   10                  15

Pro Leu Thr Leu Thr Cys Thr Val Ser Gly Phe Ser Pro Asn Asn Tyr
            20                  25                  30

Gly Val Ser Trp Val Arg Gln Pro Pro Gly Lys Gly Leu Glu Trp Ile
        35                  40                  45

Gly Met Ser Ser Thr Ala Gly Ala Thr Tyr Tyr Ala Asn Trp Ala Lys
    50                  55                  60

Gly Arg Phe Thr Ile Ser Lys Thr Ser Thr Thr Val Asp Leu Glu Ile
65                  70                  75                  80

Thr Ser Pro Thr Thr Glu Asp Thr Ala Thr Tyr Phe Cys Ala Lys Gly
                85                  90                  95

Thr Pro Ser Leu Ser Tyr Gly Asn Ile Trp Gly Pro Gly Thr Leu Val
            100                 105                 110

Thr Val Ser Ser Gly Gly Gly Gly Ser Gly Gly Gly Gly Ser Gly Gly
        115                 120                 125

Gly Gly Ser Ala Gln Pro Thr Gln Thr Pro Gly Gly Gly Ser
    130                 135                 140

Gly Thr Glu Val Val Val Lys
145                 150

<210> SEQ ID NO 13
<211> LENGTH: 428
<212> TYPE: PRT
<213> ORGANISM: Homo sapiens

<400> SEQUENCE: 13

Leu Glu Val Gln Val Pro Glu Asp Pro Val Ala Leu Val Gly Thr
1               5                   10                  15

Asp Ala Thr Leu Cys Cys Ser Phe Ser Pro Glu Pro Gly Phe Ser Leu
            20                  25                  30

Ala Gln Leu Asn Leu Ile Trp Gln Leu Thr Asp Thr Lys Gln Leu Val
        35                  40                  45

His Ser Phe Ala Glu Gly Gln Asp Gln Gly Ser Ala Tyr Ala Asn Arg
    50                  55                  60

Thr Ala Leu Phe Pro Asp Leu Leu Ala Gln Gly Asn Ala Ser Leu Arg
65                  70                  75                  80

Leu Gln Arg Val Arg Val Ala Asp Glu Gly Ser Phe Thr Cys Phe Val
                85                  90                  95

Ser Ile Arg Asp Phe Gly Ser Ala Ala Val Ser Leu Gln Val Ala Ala
            100                 105                 110

Pro Tyr Ser Lys Pro Ser Met Thr Leu Glu Pro Asn Lys Asp Leu Arg
        115                 120                 125

Pro Gly Asp Thr Val Thr Ile Thr Cys Ser Ser Tyr Gln Gly Tyr Pro
    130                 135                 140

Glu Ala Glu Val Phe Trp Gln Asp Gly Gln Gly Val Pro Leu Thr Gly
145                 150                 155                 160

-continued

```
Asn Val Thr Thr Ser Gln Met Ala Asn Glu Gln Gly Leu Phe Asp Val
            165                 170                 175

His Ser Ile Leu Arg Val Val Leu Gly Ala Asn Gly Thr Tyr Ser Cys
        180                 185                 190

Leu Val Arg Asn Pro Val Leu Gln Gln Asp Ala His Ser Ser Val Thr
        195                 200                 205

Ile Thr Pro Gln Arg Ser Pro Thr Gly Ala Val Glu Val Gln Val Pro
    210                 215                 220

Glu Asp Pro Val Val Ala Leu Val Gly Thr Asp Ala Thr Leu Arg Cys
225                 230                 235                 240

Ser Phe Ser Pro Glu Pro Gly Phe Ser Leu Ala Gln Leu Asn Leu Ile
                245                 250                 255

Trp Gln Leu Thr Asp Thr Lys Gln Leu Val His Ser Phe Thr Glu Gly
            260                 265                 270

Arg Asp Gln Gly Ser Ala Tyr Ala Asn Arg Thr Ala Leu Phe Pro Asp
        275                 280                 285

Leu Leu Ala Gln Gly Asn Ala Ser Leu Arg Leu Gln Arg Val Arg Val
        290                 295                 300

Ala Asp Glu Gly Ser Phe Thr Cys Phe Val Ser Ile Arg Asp Phe Gly
305                 310                 315                 320

Ser Ala Ala Val Ser Leu Gln Val Ala Ala Pro Tyr Ser Lys Pro Ser
                325                 330                 335

Met Thr Leu Glu Pro Asn Lys Asp Leu Arg Pro Gly Asp Thr Val Thr
            340                 345                 350

Ile Thr Cys Ser Ser Tyr Arg Gly Tyr Pro Glu Ala Glu Val Phe Trp
        355                 360                 365

Gln Asp Gly Gln Gly Val Pro Leu Thr Gly Asn Val Thr Thr Ser Gln
    370                 375                 380

Met Ala Asn Glu Gln Gly Leu Phe Asp Val His Ser Val Leu Arg Val
385                 390                 395                 400

Val Leu Gly Ala Asn Gly Thr Tyr Ser Cys Leu Val Arg Asn Pro Val
                405                 410                 415

Leu Gln Gln Asp Ala His Gly Ser Val Thr Ile Thr
            420                 425
```

<210> SEQ ID NO 14
<211> LENGTH: 42
<212> TYPE: DNA
<213> ORGANISM: Artificial Sequence
<220> FEATURE:
<223> OTHER INFORMATION: Synthetic oligonucleotide

<400> SEQUENCE: 14
gaggagttgg cccaggcggc ccagtcggtg gaggagtccr gg                42

<210> SEQ ID NO 15
<211> LENGTH: 42
<212> TYPE: DNA
<213> ORGANISM: Artificial Sequence
<220> FEATURE:
<223> OTHER INFORMATION: Synthetic oligonucleotide

<400> SEQUENCE: 15
gaggagttgg cccaggcggc ccagtcagtg aaggagtccg ag                42

<210> SEQ ID NO 16
<211> LENGTH: 42

```
<212> TYPE: DNA
<213> ORGANISM: Artificial Sequence
<220> FEATURE:
<223> OTHER INFORMATION: Synthetic oligonucleotide

<400> SEQUENCE: 16
gaggagttgg cccaggcggc ccagtcgytg gaggagtccg gg                          42

<210> SEQ ID NO 17
<211> LENGTH: 45
<212> TYPE: DNA
<213> ORGANISM: Artificial Sequence
<220> FEATURE:
<223> OTHER INFORMATION: Synthetic oligonucleotide

<400> SEQUENCE: 17
gaggagttgg cccaggcggc ccaggagcag ctggaggagt ccggg                       45

<210> SEQ ID NO 18
<211> LENGTH: 44
<212> TYPE: DNA
<213> ORGANISM: Artificial Sequence
<220> FEATURE:
<223> OTHER INFORMATION: Synthetic oligonucleotide

<400> SEQUENCE: 18
gaggagttgg cccaggcggc ccaggagcag ctgaaggagt ccgg                        44

<210> SEQ ID NO 19
<211> LENGTH: 44
<212> TYPE: DNA
<213> ORGANISM: Artificial Sequence
<220> FEATURE:
<223> OTHER INFORMATION: Synthetic oligonucleotide

<400> SEQUENCE: 19
gaggagttgg cccaggcggc ccagragcag ctggtggagt ccgg                        44

<210> SEQ ID NO 20
<211> LENGTH: 45
<212> TYPE: DNA
<213> ORGANISM: Artificial Sequence
<220> FEATURE:
<223> OTHER INFORMATION: Synthetic oligonucleotide

<400> SEQUENCE: 20
gaggagttgg cccaggcggc ccaggagcag cagaaggagt ccggg                       45

<210> SEQ ID NO 21
<211> LENGTH: 42
<212> TYPE: DNA
<213> ORGANISM: Artificial Sequence
<220> FEATURE:
<223> OTHER INFORMATION: Synthetic oligonucleotide

<400> SEQUENCE: 21
gaggagttgg cccaggcggc ccagtcgctg gaggagtcca gg                          42

<210> SEQ ID NO 22
<211> LENGTH: 42
<212> TYPE: DNA
<213> ORGANISM: Artificial Sequence
<220> FEATURE:
<223> OTHER INFORMATION: Synthetic oligonucleotide

<400> SEQUENCE: 22
```

```
gaggagttgg cccaggcggc ccagtcgctg ggggagtcca gg                              42
```

<210> SEQ ID NO 23
<211> LENGTH: 42
<212> TYPE: DNA
<213> ORGANISM: Artificial Sequence
<220> FEATURE:
<223> OTHER INFORMATION: Synthetic oligonucleotide

<400> SEQUENCE: 23

```
gaggagttgg cccaggcggc ccagacagtg aaggagtccg ag                              42
```

<210> SEQ ID NO 24
<211> LENGTH: 42
<212> TYPE: DNA
<213> ORGANISM: Artificial Sequence
<220> FEATURE:
<223> OTHER INFORMATION: Synthetic oligonucleotide

<400> SEQUENCE: 24

```
gaggagttgg cccaggcggc ccagtcgctg gaggaattcg gg                              42
```

<210> SEQ ID NO 25
<211> LENGTH: 46
<212> TYPE: DNA
<213> ORGANISM: Artificial Sequence
<220> FEATURE:
<223> OTHER INFORMATION: Synthetic oligonucleotide

<400> SEQUENCE: 25

```
gaggagtttg gccggcctgg cctgargaga yggtgaccag ggtgcc                          46
```

<210> SEQ ID NO 26
<211> LENGTH: 46
<212> TYPE: DNA
<213> ORGANISM: Artificial Sequence
<220> FEATURE:
<223> OTHER INFORMATION: Synthetic oligonucleotide

<400> SEQUENCE: 26

```
gaggagtttg gccggcctgg cctgaagaga cggtgacgag ggtccc                          46
```

<210> SEQ ID NO 27
<211> LENGTH: 22
<212> TYPE: PRT
<213> ORGANISM: Homo sapiens

<400> SEQUENCE: 27

Met Leu Leu Leu Val Thr Ser Leu Leu Leu Cys Glu Leu Pro His Pro
1               5                   10                  15

Ala Phe Leu Leu Ile Pro
            20

<210> SEQ ID NO 28
<211> LENGTH: 45
<212> TYPE: PRT
<213> ORGANISM: Homo sapiens

<400> SEQUENCE: 28

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp
        35                  40                  45

<210> SEQ ID NO 29
<211> LENGTH: 21
<212> TYPE: PRT
<213> ORGANISM: Homo sapiens

<400> SEQUENCE: 29

Ile Tyr Ile Trp Ala Pro Leu Ala Gly Thr Cys Gly Val Leu Leu Leu
1               5                   10                  15

Ser Leu Val Ile Thr
            20

<210> SEQ ID NO 30
<211> LENGTH: 42
<212> TYPE: PRT
<213> ORGANISM: Homo sapiens

<400> SEQUENCE: 30

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
            35                  40

<210> SEQ ID NO 31
<211> LENGTH: 112
<212> TYPE: PRT
<213> ORGANISM: Homo sapiens

<400> SEQUENCE: 31

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
            35                  40                  45

Pro Arg Arg Lys Asn Pro Gln Glu Gly Leu Tyr Asn Glu Leu Gln Lys
        50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 32
<211> LENGTH: 18
<212> TYPE: PRT
<213> ORGANISM: Artificial Sequence
<220> FEATURE:
<223> OTHER INFORMATION: Synthetic peptide

<400> SEQUENCE: 32

Glu Gly Arg Gly Ser Leu Leu Thr Cys Gly Asp Val Glu Glu Asn Pro
1               5                   10                  15

Gly Pro

<210> SEQ ID NO 33

```
<211> LENGTH: 335
<212> TYPE: PRT
<213> ORGANISM: Homo sapiens

<400> SEQUENCE: 33

Arg Lys Val Cys Asn Gly Ile Gly Ile Gly Glu Phe Lys Asp Ser Leu
1               5                   10                  15

Ser Ile Asn Ala Thr Asn Ile Lys His Phe Lys Asn Cys Thr Ser Ile
            20                  25                  30

Ser Gly Asp Leu His Ile Leu Pro Val Ala Phe Arg Gly Asp Ser Phe
        35                  40                  45

Thr His Thr Pro Pro Leu Asp Pro Gln Glu Leu Asp Ile Leu Lys Thr
    50                  55                  60

Val Lys Glu Ile Thr Gly Phe Leu Leu Ile Gln Ala Trp Pro Glu Asn
65                  70                  75                  80

Arg Thr Asp Leu His Ala Phe Glu Asn Leu Glu Ile Ile Arg Gly Arg
                85                  90                  95

Thr Lys Gln His Gly Gln Phe Ser Leu Ala Val Val Ser Leu Asn Ile
            100                 105                 110

Thr Ser Leu Gly Leu Arg Ser Leu Lys Glu Ile Ser Asp Gly Asp Val
        115                 120                 125

Ile Ile Ser Gly Asn Lys Asn Leu Cys Tyr Ala Asn Thr Ile Asn Trp
    130                 135                 140

Lys Lys Leu Phe Gly Thr Ser Gly Gln Lys Thr Lys Ile Ile Ser Asn
145                 150                 155                 160

Arg Gly Glu Asn Ser Cys Lys Ala Thr Gly Gln Val Cys His Ala Leu
                165                 170                 175

Cys Ser Pro Glu Gly Cys Trp Gly Pro Glu Pro Arg Asp Cys Val Ser
            180                 185                 190

Cys Arg Asn Val Ser Arg Gly Arg Glu Cys Val Asp Lys Cys Asn Leu
        195                 200                 205

Leu Glu Gly Glu Pro Arg Glu Phe Val Glu Asn Ser Glu Cys Ile Gln
    210                 215                 220

Cys His Pro Glu Cys Leu Pro Gln Ala Met Asn Ile Thr Cys Thr Gly
225                 230                 235                 240

Arg Gly Pro Asp Asn Cys Ile Gln Cys Ala His Tyr Ile Asp Gly Pro
                245                 250                 255

His Cys Val Lys Thr Cys Pro Ala Gly Val Met Gly Glu Asn Asn Thr
            260                 265                 270

Leu Val Trp Lys Tyr Ala Asp Ala Gly His Val Cys His Leu Cys His
        275                 280                 285

Pro Asn Cys Thr Tyr Gly Cys Thr Gly Pro Gly Leu Glu Gly Cys Pro
    290                 295                 300

Thr Asn Gly Pro Lys Ile Pro Ser Ile Ala Thr Gly Met Val Gly Ala
305                 310                 315                 320

Leu Leu Leu Leu Leu Val Val Ala Leu Gly Ile Gly Leu Phe Met
                325                 330                 335

<210> SEQ ID NO 34
<211> LENGTH: 118
<212> TYPE: PRT
<213> ORGANISM: Oryctolagus cuniculus
<220> FEATURE:
<221> NAME/KEY: misc_feature
<222> LOCATION: (1)..(1)
<223> OTHER INFORMATION: Xaa can be any naturally occurring amino acid
```

```
<400> SEQUENCE: 34

Xaa Ser Val Glu Glu Ser Gly Gly Arg Leu Val Thr Pro Gly Thr Pro
1               5                   10                  15

Leu Thr Leu Thr Cys Thr Val Ser Gly Phe Ser Leu Ser Thr Tyr Thr
            20                  25                  30

Met Asn Trp Val Arg Gln Ala Pro Gly Lys Gly Leu Glu Trp Ile Gly
        35                  40                  45

Asp Ile Tyr Thr Asp Gly Asn Thr Tyr Tyr Ala Asn Trp Ala Lys Gly
    50                  55                  60

Arg Phe Thr Ile Ser Lys Thr Ser Thr Val Asp Leu Lys Ile Thr
65              70                  75                  80

Ser Pro Thr Thr Glu Asp Thr Ala Thr Tyr Phe Cys Ala Arg Asp Ser
                85                  90                  95

Trp Asp Ala Ser Ser Tyr Tyr Gly Leu Asp Leu Trp Gly Gln Gly Thr
                100                 105                 110

Leu Val Thr Val Ser Ser
            115

<210> SEQ ID NO 35
<211> LENGTH: 18
<212> TYPE: PRT
<213> ORGANISM: Homo sapiens

<400> SEQUENCE: 35

Gln Arg Val Arg Val Ala Asp Glu Gly Ser Phe Thr Cys Phe Val Ser
1               5                   10                  15

Ile Arg

<210> SEQ ID NO 36
<211> LENGTH: 18
<212> TYPE: PRT
<213> ORGANISM: Homo sapiens

<400> SEQUENCE: 36

Ser Phe Thr Cys Phe Val Ser Ile Arg Asp Phe Gly Ser Ala Ala Val
1               5                   10                  15

Ser Leu

<210> SEQ ID NO 37
<211> LENGTH: 18
<212> TYPE: PRT
<213> ORGANISM: Homo sapiens

<400> SEQUENCE: 37

Leu Arg Pro Gly Asp Thr Val Thr Ile Thr Cys Ser Ser Tyr Gln Gly
1               5                   10                  15

Tyr Pro
```

HIGH AFFINITY NANOBODIES TARGETING B7-H3 (CD276) FOR TREATING MULTIPLE SOLID TUMORS

CROSS REFERENCE TO RELATED APPLICATIONS

This application is the U.S. National Stage of International Application No. PCT/US2020/056601, filed Oct. 21, 2020, which was published in English under PCT Article 21 (2), which claims the benefit of U.S. Provisional Application No. 62/924,298, filed Oct. 22, 2019. The above-listed applications are herein incorporated by reference in their entirety.

ACKNOWLEDGMENT OF GOVERNMENT SUPPORT

This invention was made with government support under project number Z01 BC010891 awarded by the National Institutes of Health. The government has certain rights in the invention.

FIELD

This disclosure concerns single-chain monoclonal antibodies that bind B7 homolog 3 (B7H3) with high affinity. This disclosure further concerns use of the monoclonal antibodies and antibody conjugates, such as for the treatment of solid tumors.

BACKGROUND

Nanobodies are the smallest known antigen-binding fragments of antibodies, being formed from approximately 120 amino acids with a molecular weight of 12 kD to 15 kD and size of about 4×2.5 nm (Khodabakhsh et al., *Int Rev Immunol*, 37, 316-322, 2018). Most well-studied nanobodies are derived from the variable region of the heavy chain (VH), which can occur naturally in creatures of camelid (termed $V_HH$) and cartilaginous fishes ($V_{NAR}$) (Feng et al., *Antib Ther*, 2, 1-11, 2019), and exist in vivo in some human heavy chain diseases (Prelli and Frangione, *J Immunol*, 148, 949-952, 1992). Due to their small size, high solubility, excellent thermal stability, reversible refolding capacity, and relatively easier tissue penetration in vivo compared to conventional whole IgG, nanobodies can be used in medical applications or as research tools (Khodabakhsh et al., *Int Rev Immunol*, 37, 316-322, 2018; Wesolowski et al., *Med Microbiol Immunol*, 198, 157-174, 2009; Ho, *Antib Ther*, 1, 1-5, 2018), as evidenced by the approval of the first nanobody drug Caplacizumab (CABLIVI®), a humanized camelid $V_HH$, for the treatment of acquired thrombotic thrombocytopenic purpura (aTTP) and thrombosis (Elverdi and Eskazan, *Drug Des Devel Ther*, 13, 1251-1258, 2019; Scully et al., *N Engl J Med*, 380, 335-346, 2019).

Historically, camelid $V_HH$ domain antibodies dominated research until the rise of human VH domain antibodies (Feng et al., *Proc Natl Acad Sci USA*, 110, E1083-E1091, 2013; Tang et al., *Mol Cancer Ther*, 12, 416-426, 2013; Li et al., *Proc Natl Acad Sci USA*, 114, E6623-E6631, 2017). In sera of Camelidae, there are both conventional IgG and a significant amount of heavy chain only IgG (HCAbs) that account for 45% to 75% of all serum immunoglobulins depending on the particular species (Khodabakhsh et al., *Int Rev Immunol*, 37, 316-322, 2018). The HCAbs consist of a $V_HH$ fragment, the sole antigen binding domain, followed by CH2 and CH3 domains, and a light chain that pairs with a VH-CH1 domain in conventional IgG. The recombinant $V_HH$ domains are the functional entities that are being exploited.

There are several structural features that make the naturally evolved camelid $V_HH$ domain highly soluble and stable. First, the Val37 (Kabat numbering) in the human VH germline is typically Phe37 (or Tyr37) in a $V_HH$ domain (Riechmann and Muyldermans, *J Immunol Methods*, 231, 25-38, 1999), which forms a more compact and stable hydrophobic packing of the domain, and this is probably the driving force to make $V_HH$ particularly stable (Shinozaki et al., *J Biosci Bioeng*, 125, 654-661, 2018). Second, the light chain contacting residues in the human VH germline, G44, L45 and W47, are E44 (or Q44), R45 (or C45) and G47 (or Ser, Leu, Phe) in $V_HH$ (Holt et al., *Trends Biotechnol*, 21, 484-490, 2003), which make the accessible surface area more hydrophilic and less aggregate. Further, in some of the $V_HH$ domains, W103 can be replaced with R103. Third, $V_HH$ domains usually have a longer CDR3 than human/rodent CDR3, and they typically contain a Cys in CDR3 that forms an additional disulfide bond with the Cys in the end of CDR1 (camels) or the beginning of CDR2 (llamas) (Wesolowski et al., *Med Microbiol Immunol*, 198, 157-174, 2009). This additional CDR3 disulfide bond and the canonical C22-C92 disulfide bond further make $V_HH$ domains more stable ($T_m$ value ranging from 60-78° C.), and make reversible unfolding/refolding possible (Holt et al., *Trends Biotechnol*, 21, 484-490, 2003).

The first non-$V_HH$ mammalian domain antibodies were screened in 1989 from a cDNA expression library made from the spleen of mouse immunized with lysozyme and keyhole-limpet hemocyanin, with two mouse VH domains showing affinities for lysozyme in the 20 nM range (Ward et al., *Nature*, 341, 544-546, 1989), and for the first time, the name "single domain antibodies (dAbs)" was suggested. Thereafter, the camelid $V_HH$ was discovered, and boosted the idea of exploring human VH domain antibodies, which are more attractive in pharmaceutical and other applications. Although both camelid and human domain antibodies have been vastly studied, there are some technical limitations to access the resources, especially for the discovery of domain antibodies by immunization. To overcome the limitation of resource accessibility, several strategies have been developed to generate human or humanized VH domain antibodies. Phage display of naïve human VH domain libraries is a proven method (Feng et al., *Proc Natl Acad Sci USA*, 110, E1083-1091, 2013; Tang et al., *Mol Cancer Ther*, 12, 416-426, 2013; Li et al., *Proc Natl Acad Sci USA*, 114, E6623-E6631, 2017), although the affinity is not always as high as that of immunized antibodies. Another way to generate human domain antibodies is using transgenic animals with human VH germline genes (Schusser et al., *Eur J Immunol*, 46, 2137-2148, 2016; Janssens et al., *Proc Natl Acad Sci USA*, 103, 15130-15135, 2006). Instead of directly isolating human domain antibodies, generation of immunized animal VH domain antibodies followed by humanization is also a way to generate human-like antibodies with high-affinity.

SUMMARY

The present disclosure describes ten camel single-domain $V_HH$ monoclonal antibodies and two rabbit VH single-domain antibodies that specifically bind B7H3 (also known as CD276). The B7H3-specific camel antibodies, referred to herein as RWB12 ("B12"), RWG8 ("G8"), RWC4 ("C4"), RWB2, RWH5, RWD5, RWC3, RWG4, RWD9 and RWH1, and the B7H3-specific rabbit antibodies, referred to herein as RFA1 and R1-B1, bind B7H3 with high affinity. Generation of chimeric antigen receptor (CAR) T cells comprised of the disclosed nanobodies is also disclosed.

Provided herein are monoclonal antibodies that bind, such as specifically bind, B7H3. In some embodiments, the monoclonal antibody includes the complementarity determining region (CDR) sequences of nanobody RWB12, RWG8, RWC4, RWB2, RWH5, RWD5, RWC3, RWG4, RWD9, RWH1, RFA1 or RFB1. Also provided herein are conjugates that include a disclosed monoclonal antibody. In some examples, provided are CARs (and CAR-expressing T cells and natural killer cells), immunoconjugates (such as immunotoxins), multi-specific antibodies (such as bispecific T-cell engagers), antibody-drug conjugates (ADCs), antibody-nanoparticle conjugates, antibody-radioisotope conjugates (such as for cancer diagnostics and immunoPET imaging) and fusion proteins that include a monoclonal antibody disclosed herein.

Compositions that include a B7H3-specific monoclonal antibody and a pharmaceutically acceptable carrier are also provided by the present disclosure.

Also provided herein are nucleic acid molecules and vectors encoding the B7H3-specific monoclonal antibodies, CARs, immunoconjugates (such as immunotoxins), multi-specific antibodies and fusion proteins disclosed herein. Isolated cells that include a nucleic acid or vector encoding a B7H3 monoclonal antibody or CAR are further provided.

Methods of treating a B7H3-positive cancer in a subject, and methods of inhibiting tumor growth or metastasis of a B7H3-positive cancer in a subject are also provided. In some embodiments, the methods include administering to the subject a therapeutically effective amount of a monoclonal antibody disclosed herein, or administering to the subject a therapeutically effective amount of a CAR (or CAR T cells or CAR NK cells), immunoconjugate (such as an immunotoxin), ADC, multi-specific antibody, antibody-nanoparticle conjugate or fusion protein comprising a monoclonal antibody disclosed herein.

Further provided herein are methods of detecting expression of B7H3 in a sample. In some embodiments, the method includes contacting the sample with a monoclonal antibody disclosed herein, and detecting binding of the antibody to the sample.

Also provided are methods of diagnosing a subject as having a B7H3-positive cancer. In some embodiments, the method includes contacting a sample obtained from the subject with a monoclonal antibody disclosed herein, and detecting binding of the antibody to the sample.

The foregoing and other objects and features of the disclosure will become more apparent from the following detailed description, which proceeds with reference to the accompanying figures.

BRIEF DESCRIPTION OF THE DRAWINGS

(FIG. 2A) Titering of B7H3-hFc immunized rabbit sera by protein binding ELISA. IAB-hFc, which is derived from a N-terminal fragment of mesothelin, served as hFc tag control. R31M0, R31M1, R31M2, and R31M3 represented the sera of pre-immunization, $1^{st}$, $2^{nd}$ and $3^{rd}$ immunization. (FIG. 2B) Cell binding assay of the immunized sera. The shaded area represents cells stained with FITC-conjugated secondary antibody only (goat-anti-rabbit); left curve, cells stained with pre-immunization sera; right curve, cells stained with immunized sera R31M3.

FIGS. 3A-3B: Sequences and structural modeling of the B7H3 binders. (FIG. 3A) Sequence alignment of the B7H3 binders (A1, SEQ ID NO: 11; B1, SEQ ID NO: 12), along with a similar VH from a rabbit anti-hypusine monoclonal antibody (PDB #5DUB, SEQ ID NO: 34). CDR regions were defined by IMGT delineating system. (FIG. 3B) Structure modeling of A1 and B1 binders using online software SWISS-MODEL. The crystal structure of 5DUB is also shown as a comparison.

FIGS. 4A-4D: Binding properties of the B7H3 binders. (FIG. 4A) SDS-PAGE analysis of the purified A1 and B1 binders (VH-His-FLAG fusion) from *E. coli*. Two micrograms of purified B7H3-hFc, non-reduced (Non.) or reduced (Red.) by β-mercaptoethanol, were separated on an 8% SDS-PAGE gel. Protein bands were visualized by Coomassie blue R-250 staining. (FIG. 4B) Protein binding affinity measurement by ELISA. Five micrograms of B7H3-hFc were coated on the ELISA plate, and different concentrations of domain antibodies were incubated with the plate, and binding was detected by HRP conjugated anti-FLAG mouse monoclonal antibody M2. The binding curves were plotted using the software GraphPad Prism and the calculated EC50 values were determined by the software's algorithm of hyperbola one site binding. (FIGS. 4C-4D) Cell binding determination by flow cytometry. Ten microgram per mL domain antibody was co-incubated with one million cells. Antibody binding was visualized by APC conjugated anti-FLAG monoclonal antibody. The curves labelled "1" represent cells stained with secondary antibody only; the curves labelled "2" represent cells stained with A1 or B1 domain antibody.

(FIG. 7A) SDS-PAGE of the RWC4 $V_HH$ camel nanobody fractions eluted from the AKTA Explorer (GE Healthcare). (FIG. 7B) Chromatograph of the nanobody elution from a nickel column (GE Healthcare) on the AKTA Explorer (GE Healthcare). The yield of RWC4 was 33.8 mg/L.

(FIG. 8A) SDS-PAGE of the RWG8 $V_HH$ camel nanobody fractions eluted from the AKTA Explorer (GE Healthcare).

(FIG. 8B) Chromatograph of the RWG8 nanobody elution from a nickel column (GE Healthcare) on the AKTA Explorer (GE Healthcare). The yield of RWG8 was 50 mg/L.

(FIG. 8A) SDS-PAGE of the RWB12 $V_HH$ camel nanobody fractions eluted from the AKTA Explorer (GE Healthcare). (FIG. 9B) Chromatograph of the RWB12 nanobody elution from a nickel column (GE Healthcare) on the AKTA Explorer (GE Healthcare). The yield of RWB12 was 132 mg/L.

FIGS. 15A-15D: Cytotoxicity of CAR-T cells targeting B7H3 in B7H3-positive cells. (FIG. 15A) Human neuroblastoma NBEB cells. (FIG. 15B) Human neuroblastoma LAN-1 cells. (FIG. 15C) Human adenocarcinoma BXPC-3 cells. (FIG. 15D) Human pancreas carcinoma Miacapa2 cells. RWB12, RWG8 and RWC4 CAR-T cells were the most effective for inducing specific lysis.

FIGS. 16A-16D: Cytotoxicity of CAR-T cells targeting B7H3 in B7H3-positive and B7H3-knockout cells. (FIG. 16A) Human neuroblastoma IMR32 cells. (FIG. 16B) Murine colon adenocarcinoma MC38-CD276$^+$ cells. (FIG. 16C) Human neuroblastoma IMR32-CD276$^{-/-}$ cells. (FIG. 16D) Murine colon adenocarcinoma MC38-CD276$^{-/-}$ cells. Three of the CAR T-cells (RWB12, RWG8 and RWC4) exhibited potent cytotoxicity on B7H3-positive cells, but not B7H3-negative cells.

(FIG. 17A) Flow cytometry shows both Panc-1 and BxPC-1 are B7H3-positive cell lines. (FIG. 17B) T cell transduction efficiency with G8, C4 and B12 CARs was 60.4%, 58.6%, and 68.4%, respectively. Transduction efficiency of T cells with an irrelevant CAR (CD19) was 32%. (FIG. 17C) B7H3-targeted CAR (G8/B12/C4) T cells as well as the irrelevant control CAR (CD19) T cells were incubated with Panc-1 GL cells or BxPC-3 GL cells for 24 hours at varying Effector:Target (E:T) ratios. Both Panc-1 GL and BxPC-3 GL cells were effectively lysed by all three B7H3-targeted CAR T cells in a dose-dependent manner, while minimum killing was observed from the control CAR T cells.

(FIG. 18A) Schematic of the Panc-1 xenograft study. One million Panc-1 GFP/Luc tumor cells were i.v. implanted into NSG mice to establish the tumor model. After 20 days (Day 0), mice were i.v. infused with 10 million C4, G8 or B12 CAR T cells (or control CD19 CAR T cells). Imaging was performed weekly. (FIG. 18B) Representative bioluminescence images of Panc-1 tumor growth in CAR T cell treated mice. Mice treated with 10 million B7H3-targeted CAR T cells (C4, G8 or B12) showed significantly decreased tumor growth as compared with infusion of control CAR T cells. (FIG. 18C) Quantification of tumor bioluminescence as photons per second in mice shown in FIG. 18B. (FIG. 18D) Kaplan-Meier survival curve of tumor-bearing mice after treatment with 10 million C4, G8 or B12 CAR T cells. The results demonstrate that C4 CAR T cells are more potent than G8 or B12 CAR T cells in promoting mouse survival when administered at a high dose (10 million), and indicate that administration of 10 million CAR T cells is safe for mice.

(FIG. 19A) Experimental schematic. Panc-1 xenograft mice were i.v. infused with 5 million C4 CAR T cells, B12 CAR T cells, untransduced T cells (mock) or PBS 20 days (day 0) following inoculation of 1 million Panc-1-Luc cells. C4 CART cell- and B12 CART cell-treated mice that showed no detectable tumor were i.v. implanted with 1 million Panc-1 cells on day 35. As a control, naïve mice were implanted with Panc-1 cells. Imaging was performed weekly. (FIG. 19B) Representative bioluminescence images of Panc-1 tumor growth in CAR T cell treated mice. Mice treated with 5 million C4 CAR T cells or B12 CAR T cells showed significantly decreased tumor growth compared with mice administered mock T cells or PBS. While tumors grew rapidly in control mice, 100% of mice previously treated with C4 CAR T cells remained tumor free after Panc-1 tumor re-challenge, and 60% of mice previously treated with B12 CAR T cells remained tumor free until 10 weeks after treatment. (FIG. 19C) Quantification of tumor bioluminescence as photons per second in mice shown in FIG. 19B. (FIG. 19D) Kaplan-Meier survival curve of tumor-bearing mice after treatment, showing that mice that received 5 million C4 or B12 CAR T cells were still alive at day 70. In contrast, no mice treated with PBS or mock T cells survived more than 30 days following infusion.

(FIG. 20A) In vitro killing of neuroblastoma cell line IMR5 using B7H3-targeted CAR T cells was evaluated. B7H3-targeted G8, B12 or C4 CAR T cells, as well as commercial anti-human B7H3 hybridoma antibody 376.96 based CAR T cells, were incubated with IMR5 GL cells for 24 hours at varying Effector:Target (E:T) ratios. All CAR T cells effectively lysed IMR5 tumor cells in a dose-dependent manner compared to mock T cells; however, B12 CAR T cells were slightly effective than the other CAR T cells tested. (FIG. 20B) Experimental schematic of an in vivo study. IMR5 xenograft mice were i.v. infused with 5 million C4 CART cells, B12 CART cells, G8

CAR T cells, 376.96 CAR T cells or untransduced T cells (mock) 35 days after tumor inoculation. (FIG. 20C) Representative bioluminescence image of IMR5 tumor growth in the xenograft model. Mice treated with 5 million B12 CAR T cells showed significantly decreased tumor growth compared with 376.96 CAR T cells and mock T cells. C4 CAR T cells also showed modest anti-tumor activity. (FIG. 20D) Tumor bioluminescence as photons per second in treated mice.

FIGS. 21A-21C: G8 cross-reacts with mouse B7H3 and kills mouse cancer cells. (FIG. 21A) Binding activity of anti-B7H3 nanobodies to mouse antigen detected by flow cytometry. G8, but not C4 or B12, showed positive binding to mouse B7H3 expressed on three KPC cell lines (CREP128096, CREP133239, and PDA95775) and mouse melanoma cell line B16. (FIG. 21B) Only G8 CAR T cells showed specific killing of mouse B7H3 positive B16 cell line. (FIG. 21C). Epitope mapping of anti-B7H3 nanobodies and commercial antibody 376.96. A total of 48 peptides from the human B7H3 protein were designed and synthesized. Each peptide consisted of 18 amino acids and overlapped with adjacent peptides by 9 amino acids. ELISA technology was used to test binding ability of antibody to each peptide. Number indicates the $OD_{450}$ value. Both G8 and 376.96 bound to peptides 10, 11, and 15 (SEQ ID NOs: 35-37), indicating they bind a similar epitope. The peptide sequences are shown below the table. C4 and B12 may have a conformational epitope that couldn't be predicted by a linearized peptide library.

FIG. 22: Binding of B7H3-specific antibodies B12, C4, G8 and 376.96 to B7H3 proteins by ELISA.

SEQUENCE LISTING

Figure 1A:
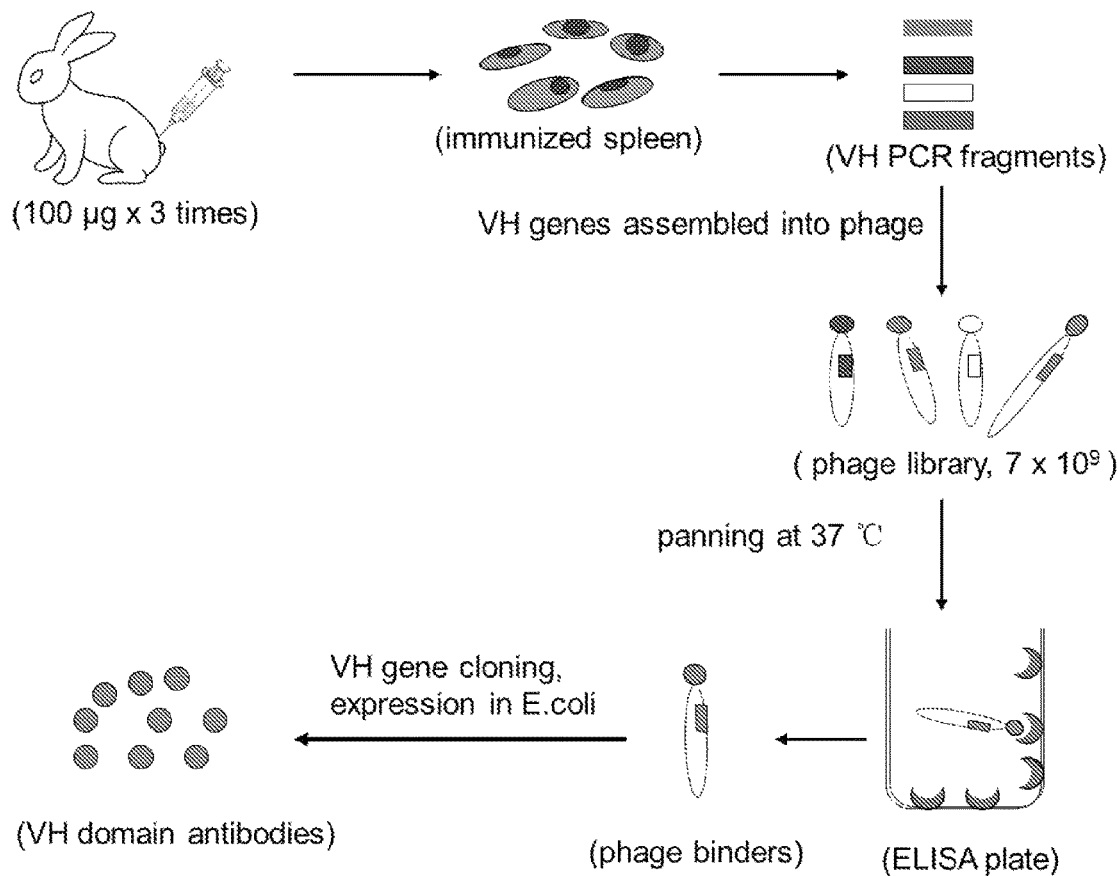
FIG. 1A: Schematic depicting immunization of rabbits with recombinant B7H3, generation of a VH domain phage display library, and selection of B7H3 binders.

The nucleic and amino acid sequences listed in the accompanying sequence listing are shown using standard letter abbreviations for nucleotide bases, and three letter code for amino acids, as defined in 37 C.F.R. 1.822. Only one strand of each nucleic acid sequence is shown, but the complementary strand is understood as included by any reference to the displayed strand. The Sequence Listing is submitted as an ASCII text file, created on Mar. 25, 2022. 27.9 KB, which is incorporated by reference herein. In the accompanying sequence listing:

SEQ ID NO: 1 is the amino acid sequence of camel antibody RWB12.
SEQ ID NO: 2 is the amino acid sequence of camel antibody RWG8.
SEQ ID NO: 3 is the amino acid sequence of camel antibody RWC4.
SEQ ID NO: 4 is the amino acid sequence of camel antibody RWB2.
SEQ ID NO: 5 is the amino acid sequence of camel antibody RWH5.
SEQ ID NO: 6 is the amino acid sequence of camel antibody RWD5.
SEQ ID NO: 7 is the amino acid sequence of camel antibody RWC3.
SEQ ID NO: 8 is the amino acid sequence of camel antibody RWG4.
SEQ ID NO: 9 is the amino acid sequence of camel antibody RWD9.
SEQ ID NO: 10 is the amino acid sequence of camel antibody RWH1.
SEQ ID NO: 11 is the amino acid sequence of rabbit antibody RFA1.
SEQ ID NO: 12 is the amino acid sequence of rabbit antibody RFB1.
SEQ ID NO: 13 is the amino acid sequence of the extracellular domain of B7H3.
SEQ ID NOs: 14-26 are primer sequences.
SEQ ID NO: 27 is the amino acid sequence of GMCSFRss.
SEQ ID NO: 28 is the amino acid sequence of the CD8α hinge region.
SEQ ID NO: 29 is the amino acid sequence of the CD8α transmembrane region.
SEQ ID NO: 30 is the amino acid sequence of 4-1BB.
SEQ ID NO: 31 is the amino acid sequence of CD3ζ.
SEQ ID NO: 32 is the amino acid sequence of a self-cleaving T2A peptide.
SEQ ID NO: 33 is the amino acid sequence of huEGFRt.
SEQ ID NO: 34 is the amino acid sequence of rabbit VH domain antibody 5DUB.
SEQ ID NOs: 35-37 are amino acid sequences of B7H3 peptides.

DETAILED DESCRIPTION

I. Abbreviations

ADC antibody-drug conjugate
ADCC antibody-dependent cell-mediated cytotoxicity
B7H3 B7 homolog 3
BBIR biotin-binding immune receptor
CAR chimeric antigen receptor
CDR complementarity determining region
CTL cytotoxic T lymphocyte
ECD extracellular domain
EGF epidermal growth factor
EGFR epidermal growth factor receptor
ELISA enzyme-linked immunosorbent assay
EM effector moiety
FACS fluorescence activated cells sorting
GMCSFRss granulocyte-macrophage colony stimulating factor receptor signal sequence
hFc human Fc
huEGFRt human truncated epidermal growth factor receptor
IC50 inhibitory concentration 50
Ig immunoglobulin
KO knockout
NK natural killer
PBD pyrrolobenzodiazepine
PE *Pseudomonas* exotoxin
PET positron emission tomography
TM transmembrane
VH variable heavy
VL variable light II. Terms and Methods Unless otherwise noted, technical terms are used according to conventional usage. Definitions of common terms in molecular biology may be found in Benjamin Lewin, *Genes X*, published by Jones & Bartlett Publishers, 2009; and Meyers et al. (eds.), *The Encyclopedia of Cell Biology and Molecular Medicine*, published by Wiley-VCH in 16 volumes, 2008; and other similar references.

As used herein, the singular forms "a," "an," and "the," refer to both the singular as well as plural, unless the context clearly indicates otherwise. For example, the term "an antigen" includes single or plural antigens and can be considered equivalent to the phrase "at least one antigen." As used herein, the term "comprises" means "includes." It is further to be understood that any and all base sizes or amino acid sizes, and all molecular weight or molecular mass values, given for nucleic acids or polypeptides are approximate, and are provided for descriptive purposes, unless otherwise indicated. Although many methods and materials similar or equivalent to those described herein can be used, particular suitable methods and materials are described herein. In case of conflict, the present specification, including explanations of terms, will control. In addition, the materials, methods, and examples are illustrative only and not intended to be limiting. To facilitate review of the various embodiments, the following explanations of terms are provided:

4-1BB: A co-stimulatory molecule expressed by T cell receptor (TCR)-activated lymphocytes, and by other cells including natural killer cells. Ligation of 4-1BB induces a signaling cascade that results in cytokine production, expression of anti-apoptotic molecules and an enhanced immune response. An exemplary amino acid sequence of 4-1BB is set forth herein as SEQ ID NO: 30.

Administration: To provide or give a subject an agent, such as a monoclonal antibody, CAR or CAR-expressing cell provided herein, by any effective route. Exemplary routes of administration include, but are not limited to, oral, injection (such as subcutaneous, intramuscular, intradermal, intraperitoneal, intravenous, intraprostatic, and intratumoral), sublingual, rectal, transdermal, intranasal, vaginal and inhalation routes.

Antibody: A polypeptide ligand comprising at least one variable region that recognizes and binds (such as specifically recognizes and specifically binds) an epitope of an antigen. Mammalian immunoglobulin molecules are composed of a heavy (H) chain and a light (L) chain, each of which has a variable region, termed the variable heavy ($V_H$) region and the variable light ($V_L$) region, respectively. Together, the $V_H$ region and the $V_L$ region are responsible for binding the antigen recognized by the antibody. There are five main heavy chain classes (or isotypes) of mammalian immunoglobulin, which determine the functional activity of an antibody molecule: IgM, IgD, IgG, IgA and IgE. Antibody isotypes not found in mammals include IgX, IgY, IgW and IgNAR. IgY is the primary antibody produced by birds and reptiles, and is functionally similar to mammalian IgG and IgE. IgW and IgNAR antibodies are produced by cartilaginous fish, while IgX antibodies are found in amphibians.

Antibody variable regions contain "framework" regions and hypervariable regions, known as "complementarity determining regions" or "CDRs." The CDRs are primarily responsible for binding to an epitope of an antigen. The framework regions of an antibody serve to position and align the CDRs in three-dimensional space. The amino acid sequence boundaries of a given CDR can be readily determined using any of a number of well-known numbering schemes, including those described by Kabat et al. (*Sequences of Proteins of Immunological Interest*, U.S. Department of Health and Human Services, 1991; the "Kabat" numbering scheme), Chothia et al. (see Chothia and Lesk, *J Mol Biol* 196:901-917, 1987; Chothia et al., *Nature* 342:877, 1989; and Al-Lazikani et al., JMB 273,927-948, 1997; the "Chothia" numbering scheme), Kunik et al. (see Kunik et al., *PLoS Comput Biol* 8: e1002388, 2012; and Kunik et al., *Nucleic Acids Res* 40(Web Server issue):W521-524, 2012; "Paratome CDRs") and the ImMunoGeneTics (IMGT) database (see, Lefranc, *Nucleic Acids Res* 29:207-9, 2001; the "IMGT" numbering scheme). The Kabat, Paratome and IMGT databases are maintained online.

A "single-domain antibody" refers to an antibody having a single domain (a variable domain) that is capable of specifically binding an antigen, or an epitope of an antigen, in the absence of an additional antibody domain. Single-domain antibodies include, for example, $V_H$ domain antibodies, VNAR antibodies, camelid $V_HH$ antibodies, and $V_L$ domain antibodies. $V_{NAR}$ antibodies are produced by cartilaginous fish, such as nurse sharks, wobbegong sharks, spiny dogfish and bamboo sharks. Camelid $V_HH$ antibodies are produced by several species including camel, llama, alpaca, dromedary, and guanaco, which produce heavy chain antibodies that are naturally devoid of light chains.

A "monoclonal antibody" is an antibody produced by a single clone of lymphocytes or by a cell into which the coding sequence of a single antibody has been transfected. Monoclonal antibodies are produced by methods known to those of skill in the art. Monoclonal antibodies include humanized monoclonal antibodies.

A "chimeric antibody" has framework residues from one species, such as human, and CDRs (which generally confer antigen binding) from another species.

A "humanized" antibody is an immunoglobulin including a human framework region and one or more CDRs from a non-human (for example a mouse, rabbit, rat, shark or synthetic) immunoglobulin. The non-human immunoglobulin providing the CDRs is termed a "donor," and the human immunoglobulin providing the framework is termed an "acceptor." In one embodiment, all CDRs are from the donor immunoglobulin in a humanized immunoglobulin. Constant regions need not be present, but if they are, they must be substantially identical to human immunoglobulin constant regions, i.e., at least about 85-90%, such as about 95% or more identical. Hence, all parts of a humanized immunoglobulin, except possibly the CDRs, are substantially identical to corresponding parts of natural human immunoglobulin sequences. A humanized antibody binds to the same antigen as the donor antibody that provides the CDRs. Humanized or other monoclonal antibodies can have additional conservative amino acid substitutions which have substantially no effect on antigen binding or other immunoglobulin functions.

Antibody-drug conjugate (ADC): A molecule that includes an antibody (or antigen-binding fragment of an antibody) conjugated to a drug, such as a cytotoxic agent. ADCs can be used to specifically target a drug to cancer cells through specific binding of the antibody to a tumor antigen expressed on the cell surface. Exemplary drugs for use with ADCs include anti-microtubule agents (such as maytansinoids, auristatin E and auristatin F) and interstrand cross-linking agents (for example, pyrrolobenzodiazepines; PBDs). In some cases, the ADC is a bi-specific ADC, which is comprised of two monoclonal antibodies or antigen-fragments thereof, each directed to a different antigen or epitope, conjugated to a drug. In one example, the agent attached to the antibody is IRDye® 700 DX (IR700, Li-cor, Lincoln, NE), which can then be used with near infrared light NIR light to kill cancer cells to which the antibody binds (photoimmunotherapy; see for example U.S. Pat. No. 8,524,239 and 10,538,590). For example, amino-reactive IR700 can be covalently conjugated to an antibody using the NHS ester of IR700.

Anti-microtubule agent: A type of drug that blocks cell growth by stopping mitosis. Anti-microtubule agents, also referred to as "anti-mitotic agents," are used to treat cancer.

B7 homolog 3 (B7H3): An immune checkpoint molecule that is expressed by some types of solid tumors. This protein is a member of the B7 superfamily of co-stimulatory molecules. B7H3 is also known as CD276.

B7H3-positive cancer: A cancer that expresses or overexpresses B7H3. Examples of B7H3-positive cancers include, but are not limited to, liver cancers (such as hepatocellular carcinoma), pancreatic cancers, kidney cancers, bladder cancers, cervical cancers, esophageal cancers, prostate cancers, breast cancers, ovarian cancers, colon cancers, lung cancers, brain cancers (such as neuroblastoma or glioblastoma), pediatric cancers (such as osteosarcoma, neuroblastoma, rhabdomyosarcoma or Ewing's sarcoma), melanoma and mesothelioma (see, for example, Seaman et al., *Cancer Cell* 31(4):501-505, 2017).

Binding affinity: Affinity of an antibody for an antigen. In one embodiment, affinity is calculated by a modification of the Scatchard method described by Frankel et al., *Mol. Immunol.*, 16:101-106, 1979. In another embodiment, binding affinity is measured by an antigen/antibody dissociation rate. In another embodiment, a high binding affinity is measured by a competition radioimmunoassay. In another embodiment, binding affinity is measured by ELISA. In other embodiments, antibody affinity is measured by flow cytometry or by surface plasmon reference. An antibody that "specifically binds" an antigen (such as B7H3) is an antibody that binds the antigen with high affinity and does not significantly bind other unrelated antigens.

In some examples, a monoclonal antibody (such as an anti-B7H3 single-domain antibody provided herein) specifically binds to a target (such as a B7H3) with a binding constant that is at least $10^3$ $M^{-1}$ greater, $10^4 M^{-1}$ greater or $10^5$ $M^{-1}$ greater than a binding constant for other molecules in a sample or subject. In some examples, an antibody (e.g., monoclonal antibody) has an equilibrium constant (Kd) of 1 µM or less, such as 900 nM or less, 500 nM or less, 250 nM or less, 100 nM or less, 50 nM or less, 10 nM or less, 5 nM or less, or 1 nM or less. For example, a single-domain monoclonal antibody binds to a target, such as B7H3 with a binding affinity of at least about $1\times10^{-6}$ M, at least about $0.5\times10^{-6}$ M, at least about $1\times10^{-7}$ M, at least about $0.5\times10^{-7}$ M, at least about $1\times10^{-8}$ M, at least about $0.5\times10^{-8}$ M, at least about $1\times10^{-9}$ M, at least about $0.5\times10^{-9}$M, or at least about $0.1\times10^{-9}$. In certain embodiments, a specific binding agent that binds to its target has a dissociation constant (Kd) of ≤1000 nM, ≤750 nM, 500 nM, ≤250 nM, ≤100 nM, ≤50 nM, ≤25 nM, ≤10 nM, ≤5 nM, ≤2.5 nM, ≤1 nM, ≤0.5 nM, ≤0.25 nM, ≤0.01 nM, or ≤0.001 nM (e.g., $10^{-6}$M or less, e.g., from $10^{-6}$M to $10^{-10}$M, e.g., from $10^{-7}$M to $10^{-9}$ M). In some examples, binding affinity is measured using the Octet system (Creative Biolabs), which is based on bio-layer interferometry (BLI) technology. In some examples, Kd is measured using surface plasmon resonance assays using a BIACORES-2000 or a BIACORES-3000 (BIAcore, Inc., Piscataway, N.J.).

Bispecific antibody: A recombinant protein that includes antigen-binding fragments of two different monoclonal antibodies and is thereby capable of binding two different antigens. In some embodiments, bispecific antibodies are used for cancer immunotherapy by simultaneously targeting, for example, both CTLs (such as a CTL receptor component such as CD3) or effector natural killer (NK) cells, and a tumor antigen (such as B7H3). Similarly, a multi-specific antibody is a recombinant protein that includes antigen-binding fragments of at least two different monoclonal antibodies, such as two, three or four different monoclonal antibodies.

Brain cancer or tumor: A type of cancer or tumor that develops from brain tissue. Brain cancers include, but are not limited to, neuroblastoma, medulloblastoma, glioma, glioblastoma, meningioma, pituitary adenoma, astrocytoma, choroid plexus carcinoma, ependymoma and pineoblastoma.

Breast cancer: A type of cancer that forms in tissues of the breast, usually the ducts and lobules. Types of breast cancer include, for example, ductal carcinoma in situ, invasive ductal carcinoma, triple negative breast cancer, inflammatory breast cancer, metastatic breast cancer, medullary carcinoma, tubular carcinoma and mucinous carcinoma. Triple negative breast cancer refers to a type of breast cancer in which the cancer cells do not express estrogen receptors, progesterone receptors or significant levels of HER2/neu protein. Triple negative breast cancer is also called ER-negative PR-negative HER2/neu-negative breast cancer.

Chemotherapeutic agent: Any chemical agent with therapeutic usefulness in the treatment of diseases characterized by abnormal cell growth. Such diseases include tumors, neoplasms, and cancer as well as diseases characterized by hyperplastic growth such as psoriasis. In one embodiment, a chemotherapeutic agent is an agent of use in treating a B7H3-positive tumor. In one embodiment, a chemotherapeutic agent is a radioactive compound. One of skill in the art can readily identify a chemotherapeutic agent of use (see for example, Slapak and Kufe, *Principles of Cancer Therapy*, Chapter 86 in Harrison's Principles of Internal Medicine, 14th edition; Perry et al., *Chemotherapy, Ch.* 17 in Abeloff, Clinical Oncology $2^{nd}$ ed., 2000 Churchill Livingstone, Inc; Baltzer, L., Berkery, R. (eds.): *Oncology Pocket Guide to Chemotherapy*, 2nd ed. St. Louis, Mosby-Year Book, 1995; Fischer, D. S., Knobf, M. F., Durivage, H. J. (eds): *The Cancer Chemotherapy Handbook*, 4th ed. St. Louis, Mosby-Year Book, 1993). Combination chemotherapy is the administration of more than one agent to treat cancer. One example is the administration of an antibody that binds B7H3 used in combination with a radioactive or chemical compound. In one example, a chemotherapeutic agent is a biologic, such as a therapeutic antibody (e.g., therapeutic monoclonal antibody), such as an anti-B7H3 antibody provided herein, as well as other anti-cancer antibodies, such as anti-PD1 or anti-PDL1 (e.g., pembrolizumab and nivolumab), anti-CTLA4 (e.g., ipilimumab), anti-EGFR (e.g., cetuximab), anti-VEGF (e.g., bevacizumab), or combinations thereof (e.g., anti-PD-1 and anti-CTLA-4).

Chimeric antigen receptor (CAR): A chimeric molecule that includes an antigen-binding portion (such as a scFv or single-domain antibody) and a signaling domain, such as a signaling domain from a T cell receptor (for example, CD3ζ). Typically, CARs are comprised of an antigen-binding moiety, a transmembrane domain and an endodomain The endodomain typically includes a signaling chain having an immunoreceptor tyrosine-based activation motif (ITAM), such as CD3ζ or FcεRIγ. In some instances, the endodomain further includes the intracellular portion of at least one additional co-stimulatory domain, such as CD28, 4-1BB (CD137), ICOS, OX40 (CD134), CD27 and/or DAP10. In some examples, the CAR is multispecific (such as bispecific) or bicistronic. A multispecific CAR is a single CAR molecule comprised of at least two antigen-binding domains (such as scFvs and/or single-domain antibodies) that each bind a different antigen or a different epitope on the same antigen (see, for example, US 2018/0230225). For example, a bispecific CAR refers to a single CAR molecule having two antigen-binding domains that each bind a different antigen. A bicistronic CAR refers to two complete CAR molecules, each containing an antigen-binding moiety that binds a different antigen. In some cases, a bicistronic CAR construct expresses two complete CAR molecules that are linked by a cleavage linker. T cells or NK cells expressing a bispecific or bicistronic CAR can bind cells that express both of the antigens to which the binding moieties are directed (see, for example, Qin et al., *Blood* 130:810, 2017; and WO/2018/213337).

Colon cancer: A type of cancer that develops in the colon or the rectum. The most common type of colon cancer (also known as "colorectal cancer") is colorectal adenocarcinoma, which accounts for approximately 95% of all colon cancers. Adenocarcinomas develop in the cells lining the inside of the colon and/or rectum. Other types of colorectal cancers include gastrointestinal carcinoid tumors, metastatic colorectal cancer, primary colorectal lymphoma (a type of non-Hodgkin's lymphoma), gastrointestinal stromal tumors (classified as a sarcoma and arising from interstitial cells of Cajal), leiomyosarcoma (arising from smooth muscle cells) and colorectal melanoma.

Complementarity determining region (CDR): A region of hypervariable amino acid sequence that defines the binding affinity and specificity of an antibody. The light and heavy chains of a mammalian immunoglobulin each have three CDRs, designated L-CDR1, L-CDR2, L-CDR3 and H-CDR1, H-CDR2, H-CDR3, respectively. A single-domain antibody contains three CDRs, referred to herein as CDR1, CDR2 and CDR3.

Conjugate: In the context of the present disclosure, a "conjugate" is an antibody or antibody fragment (such as an antigen-binding fragment) covalently linked to an effector molecule or a second protein (such as a second antibody). The effector molecule can be, for example, a drug, toxin, therapeutic agent, detectable label, protein, nucleic acid, lipid, nanoparticle, photon absorber, carbohydrate or recombinant virus. An antibody conjugate is often referred to as an "immunoconjugate." When the conjugate comprises an antibody linked to a drug (such as a cytotoxic agent), the conjugate is often referred to as an "antibody-drug conjugate" or "ADC." Other antibody conjugates include, for example, multi-specific (such as bispecific or trispecific) antibodies and chimeric antigen receptors (CARs).

Conservative variant: A protein containing conservative amino acid substitutions that do not substantially affect or decrease the affinity of a protein, such as an antibody to B7H3. For example, a monoclonal antibody that specifically binds B7H3 can include at most about 1, at most about 2, at most about 5, and most about 10, or at most about 15 conservative substitutions and specifically bind the B7H3 polypeptide. The term "conservative variant" also includes the use of a substituted amino acid in place of an unsubstituted parent amino acid, provided that antibody specifically binds B7H3. Non-conservative substitutions are those that reduce an activity or binding to B7H3.

Conservative amino acid substitution tables providing functionally similar amino acids are well known to one of ordinary skill in the art. The following six groups are examples of amino acids that are considered to be conservative substitutions for one another:
1) Alanine (A), Serine (S), Threonine (T);
2) Aspartic acid (D), Glutamic acid (E);
3) Asparagine (N), Glutamine (Q);
4) Arginine (R), Lysine (K);
5) Isoleucine (I), Leucine (L), Methionine (M), Valine (V); and
6) Phenylalanine (F), Tyrosine (Y), Tryptophan (W).

Contacting: Placement in direct physical association; includes both in solid and liquid form.

Cytotoxic agent: Any drug or compound that kills cells.

Cytotoxicity: The toxicity of a molecule, such as an immunotoxin, to the cells intended to be targeted, as opposed to the cells of the rest of an organism. In contrast, the term "toxicity" refers to toxicity of an immunotoxin to cells other than those that are the cells intended to be targeted by the targeting moiety of the immunotoxin, and the term "animal toxicity" refers to toxicity of the immunotoxin to an animal by toxicity of the immunotoxin to cells other than those intended to be targeted by the immunotoxin.

Degenerate variant: A polynucleotide encoding a polypeptide that includes a sequence that is degenerate as a result of the genetic code. There are 20 natural amino acids, most of which are specified by more than one codon. Therefore, all degenerate nucleotide sequences are included as long as the amino acid sequence of the polypeptide is unchanged.

Diagnostic: Identifying the presence or nature of a pathologic condition, such as a B7H3-positive cancer. Diagnostic methods differ in their sensitivity and specificity. The "sensitivity" of a diagnostic assay is the percentage of diseased individuals who test positive (percent of true positives). The "specificity" of a diagnostic assay is one minus the false positive rate, where the false positive rate is defined as the proportion of those without the disease who test positive. While a particular diagnostic method may not provide a definitive diagnosis of a condition, it suffices if the method provides a positive indication that aids in diagnosis. "Prognostic" is the probability of development (such as severity) of a pathologic condition, such cancer.

Diagnostic tumor imaging: Coupling antibodies and their derivatives with positron emitting radionuclides for positron emission tomography (PET) is a process often referred to as immunoPET. While full length antibodies can make good immunoPET agents, their biological half-life necessitates waiting several days prior to imaging, resulting in an increase in non-target radiation doses. Smaller, single domain antibodies, or nanobodies, have biological half-lives amenable to same day imaging.

Drug: Any compound used to treat, ameliorate or prevent a disease or condition in a subject. In some embodiments herein, the drug is an anti-cancer agent, for example a cytotoxic agent, such as an anti-mitotic or anti-microtubule agent.

Effector molecule: The portion of a chimeric molecule that is intended to have a desired effect on a cell to which the chimeric molecule is targeted. Effector molecule is also known as an effector moiety (EM), therapeutic agent, diagnostic agent, or similar terms. Therapeutic agents (or drugs) include such compounds as nucleic acids, proteins, peptides, amino acids or derivatives, glycoproteins, radioisotopes, photon absorbers, lipids, carbohydrates, or recombinant viruses. Nucleic acid therapeutic and diagnostic moieties include antisense nucleic acids, derivatized oligonucleotides for covalent cross-linking with single or duplex DNA, and triplex forming oligonucleotides. Alternatively, the molecule linked to a targeting moiety, such as an anti-B7H3 antibody, may be an encapsulation system, such as a liposome or micelle that contains a therapeutic composition such as a drug, a nucleic acid (such as an antisense nucleic acid), or another therapeutic moiety that can be shielded from direct exposure to the circulatory system. Means of preparing liposomes attached to antibodies are well known to those of skill in the art (see, for example, U.S. Pat. No. 4,957,735; and Connor et al., *Pharm Ther* 28:341-365, 1985). Diagnostic agents or moieties include radioisotopes and other detectable labels. Detectable labels useful for such purposes are also well known in the art, and include radioactive isotopes such as $^{35}S$, $^{11}C$, $^{13}N$, $^{15}O$, $^{18}F$, $^{19}F$, $^{99m}Tc$, $^{131}I$, $^{3}H$, $^{14}C$, $^{15}N$, $^{90}Y$, $^{99}Tc$, $^{111}In$ and $^{125}I$, fluorophores, chemiluminescent agents, and enzymes.

Epitope: An antigenic determinant These are particular chemical groups or peptide sequences on a molecule that are antigenic (that elicit a specific immune response). An antibody specifically binds a particular antigenic epitope on a polypeptide, such as B7H3.

Framework region: Amino acid sequences interposed between CDRs. Framework regions of an immunoglobulin molecule include variable light and variable heavy framework regions.

Fusion protein: A protein comprising at least a portion of two different (heterologous) proteins.

Heterologous: Originating from a separate genetic source or species.

Immune response: A response of a cell of the immune system, such as a B cell, T cell, or monocyte, to a stimulus. In one embodiment, the response is specific for a particular antigen (an "antigen-specific response"). In one embodiment, an immune response is a T cell response, such as a $CD4^+$ response or a $CD8^+$ response. In another embodiment, the response is a B cell response, and results in the production of specific antibodies.

Immunoconjugate: A covalent linkage of an effector molecule to an antibody or functional fragment thereof. The effector molecule can be, for example, a detectable label, a photon absorber (such as IR700), or a toxin (to form an immunotoxin, such as an immunotoxin comprising *Pseudomonas* exotoxin or a variant thereof). Specific, non-limiting examples of toxins include, but are not limited to, abrin, ricin, *Pseudomonas* exotoxin (PE, such as PE35, PE37, PE38, and PE40), diphtheria toxin (DT), botulinum toxin, or modified toxins thereof, or other toxic agents that directly or indirectly inhibit cell growth or kill cells. For example, PE and DT are highly toxic compounds that typically bring about death through liver toxicity. PE and DT, however, can be modified into a form for use as an immunotoxin by removing the native targeting component of the toxin (such as the domain Ia of PE and the B chain of DT) and replacing it with a different targeting moiety, such as an antibody. In one embodiment, an antibody is joined to an effector molecule. In another embodiment, an antibody joined to an effector molecule is further joined to a lipid or other molecule, such as to increase its half-life in the body. The linkage can be either by chemical or recombinant means. In one embodiment, the linkage is chemical, wherein a reaction between the antibody moiety and the effector molecule has produced a covalent bond formed between the two molecules to form one molecule. A peptide linker (short peptide sequence) can optionally be included between the antibody and the effector molecule. Because immunoconjugates were originally prepared from two molecules with separate functionalities, such as an antibody and an effector molecule, they are also sometimes referred to as "chimeric molecules." The term "chimeric molecule," as used herein, therefore refers to a targeting moiety, such as a ligand or an antibody, conjugated (coupled) to an effector molecule. The term "conjugated" or "linked" refers to making two polypeptides into one contiguous polypeptide molecule.

Immunoliposome: A liposome with antibodies or antibody fragments conjugated to its surface Immunoliposomes can carry cytotoxic agents or other drugs to antibody-targeted cells, such as tumor cells.

Interstrand crosslinking agent: A type of cytotoxic drug capable of binding covalently between two strands of DNA, thereby preventing DNA replication and/or transcription.

Isolated: An "isolated" biological component, such as a nucleic acid, protein (including antibodies) or organelle, has been substantially separated or purified away from other biological components in the environment (such as a cell) in which the component naturally occurs, for example other chromosomal and extra-chromosomal DNA and RNA, proteins and organelles. Nucleic acids and proteins that have been "isolated" include nucleic acids and proteins purified by standard purification methods. The term also embraces nucleic acids and proteins prepared by recombinant expression in a host cell as well as chemically synthesized nucleic acids.

Label: A detectable compound or composition that is conjugated directly or indirectly to another molecule, such as an antibody or a protein, to facilitate detection of that molecule. Specific, non-limiting examples of labels include fluorescent tags, enzymatic linkages, and radioactive isotopes. In one example, a "labeled antibody" refers to incorporation of another molecule in the antibody. For example, the label is a detectable marker, such as the incorporation of a radiolabeled amino acid or attachment to a polypeptide of biotinyl moieties that can be detected by marked avidin (for example, streptavidin containing a fluorescent marker or enzymatic activity that can be detected by optical or colorimetric methods). Various methods of labeling polypeptides and glycoproteins are known in the art and may be used. Examples of labels for polypeptides include, but are not limited to, the following: radioisotopes or radionucleotides (such as $^{35}S$, $^{11}C$, $^{13}N$, $^{15}O$, $^{18}F$, $^{19}F$, $^{99m}Tc$, $^{131}I$, $^{3}H$, $^{14}C$, $^{15}N$, $^{90}Y$, $^{99}Tc$, $^{111}In$ and $^{125}I$), fluorescent labels (such as fluorescein isothiocyanate (FITC), rhodamine, lanthanide phosphors), enzymatic labels (such as horseradish peroxidase, beta-galactosidase, luciferase, alkaline phosphatase), chemiluminescent markers, biotinyl groups, predetermined polypeptide epitopes recognized by a secondary reporter (such as a leucine zipper pair sequences, binding sites for secondary antibodies, metal binding domains, epitope tags), or magnetic agents, such as gadolinium chelates. In some embodiments, labels are attached by spacer arms of various lengths to reduce potential steric hindrance.

Linker: In some cases, a linker is a peptide within an antibody binding fragment (such as an Fv fragment) which serves to indirectly bond the variable heavy chain to the variable light chain. "Linker" can also refer to a peptide serving to link a targeting moiety, such as an antibody, to an effector molecule, such as a cytotoxin or a detectable label. The terms "conjugating," "joining," "bonding" or "linking" refer to making two polypeptides into one contiguous polypeptide molecule, or to covalently attaching a radionuclide or other molecule to a polypeptide, such as an antibody. The linkage can be either by chemical or recombinant means. "Chemical means" refers to a reaction between the antibody moiety and the effector molecule such that there is a covalent bond formed between the two molecules to form one molecule.

Liver cancer: Any type of cancer occurring in liver tissue. The most common type of liver cancer is hepatocellular carcinoma (HCC), which develops in hepatocytes. Other types of liver cancer include cholangiocarcinoma, which develops in the bile ducts; liver angiosarcoma, which is a rare form of liver cancer that begins in the blood vessels of the liver; and hepatoblastoma, which is a very rare type of liver cancer found most often in children.

Lung cancer: Any cancer that forms in the lung. Most cancers that begin in the lung are carcinomas. The two primary types of lung carcinoma are small-cell lung carcinoma (SCLC) and non-small cell lung carcinoma (NSCLC).

Subclasses of NSCLC include adenocarcinoma, squamous-cell carcinoma and large-cell carcinoma.

Operably linked: A first nucleic acid sequence is operably linked with a second nucleic acid sequence when the first nucleic acid sequence is placed in a functional relationship with the second nucleic acid sequence. For instance, a promoter is operably linked to a coding sequence if the promoter affects the transcription or expression of the coding sequence. Generally, operably linked DNA sequences are contiguous and, where necessary to join two protein-coding regions, in the same reading frame.

Ovarian cancer: Cancer that forms in tissues of the ovary. Most ovarian cancers are either ovarian epithelial carcinomas (cancer that begins in the cells on the surface of the ovary) or malignant germ cell tumors (cancer that begins in egg cells). Another type of ovarian cancer is stromal cell cancer, which originates in cells that release hormones and connect the different structures of the ovaries.

Pancreatic cancer: A disease in which malignant cells are found in the tissues of the pancreas. Pancreatic tumors can be either exocrine tumors or neuroendocrine tumors, based on the cell origin of the cancer. The vast majority (~94%) of pancreatic cancers are exocrine tumors. Exocrine cancers include, for example, adenocarcinoma (the most common type of exocrine tumor), acinar cell carcinoma, intraductal papillary-mucinous neoplasm (IPMN), and mucinous cystadenocarcinoma. In some examples, the pancreatic cancer is pancreatic ductal adenocarcinoma (PDAC). Pancreatic neuroendocrine tumors, also referred to as islet cell tumors, are classified by the type of hormones they produce. Exemplary neuroendocrine tumors include gastrinoma, glucaganoma, insulinoma, somatostatinoma, VIPoma (vasoactive intestinal peptide) and nonfunctional islet cell tumor.

Pediatric cancer: A cancer that develops in children ages 0 to 14. The major types of pediatric cancers include, for example, neuroblastoma, acute lymphoblastic leukemia (ALL), embryonal rhabdomyosarcoma (ERMS), alveolar rhabdomyosarcoma (ARMS), Ewing's sarcoma, desmoplastic small round cell tumor (DRCT), osteosarcoma, brain and other CNS tumors (such as neuroblastoma and medulloblastoma), Wilm's tumor, non-Hodgkin lymphoma, and retinoblastoma.

Pharmaceutically acceptable carriers: The pharmaceutically acceptable carriers of use are conventional. *Remington: The Science and Practice of Pharmacy*, The University of the Sciences in Philadelphia, Editor, Lippincott, Williams, & Wilkins, Philadelphia, PA., 21$^{st}$ Edition (2005), describes compositions and formulations suitable for pharmaceutical delivery of the antibodies and other compositions disclosed herein. In general, the nature of the carrier will depend on the particular mode of administration being employed. For instance, parenteral formulations usually comprise injectable fluids that include pharmaceutically and physiologically acceptable fluids such as water, physiological saline, balanced salt solutions, aqueous dextrose, glycerol or the like as a vehicle. For solid compositions (such as powder, pill, tablet, or capsule forms), conventional non-toxic solid carriers can include, for example, pharmaceutical grades of mannitol, lactose, starch, or magnesium stearate. In addition to biologically neutral carriers, pharmaceutical compositions to be administered can contain minor amounts of non-toxic auxiliary substances, such as wetting or emulsifying agents, preservatives, and pH buffering agents and the like, for example sodium acetate or sorbitan monolaurate.

Photoimmunotherapy: A targeted cancer therapy that utilizes an antigen-specific antibody-photoabsorber conjugate that can be activated by near-infrared light to kill targeted cells. The photon absorber is typically based on phthalocyanine dye, such as a near infrared (NIR) phthalocyanine dye (for example, IRDye® 700DX, also know known as IR700). The antibody (for example, a B7H3-specific antibody) binds to the appropriate cell surface antigen (e.g. B7H3) and the photo-activatable dye induces lethal damage to cell membranes after NIR-light exposure. NIR-light exposure (e.g., 690 nm) induces highly selective, necrotic cancer cell death within minutes without damage to adjoining cells (see, for example, U.S. Application No. 2018/0236076).

Preventing, treating or ameliorating a disease: "Preventing" a disease refers to inhibiting the full development of a disease. "Treating" refers to a therapeutic intervention that ameliorates a sign or symptom of a disease or pathological condition after it has begun to develop, such as a reduction in tumor burden or a decrease in the number of size of metastases. "Ameliorating" refers to the reduction in the number or severity of signs or symptoms of a disease, such as cancer.

Purified: The term purified does not require absolute purity; rather, it is intended as a relative term. Thus, for example, a purified peptide preparation is one in which the peptide or protein is more enriched than the peptide or protein is in its natural environment within a cell. In one embodiment, a preparation is purified such that the protein or peptide represents at least 50% of the total peptide or protein content of the preparation. Substantial purification denotes purification from other proteins or cellular components. A substantially purified protein is at least 60%, 70%, 80%, 90%, 95% or 98% pure. Thus, in one specific, non-limiting example, a substantially purified protein is 90% free of other proteins or cellular components.

Pyrrolobenzodiazepine (PBD): A class of sequence-selective DNA minor-groove binding crosslinking agents originally discovered in *Streptomyces* species. PBDs are significantly more potent than systemic chemotherapeutic drugs. The mechanism of action of PBDs is associated with their ability to form an adduct in the minor groove of DNA, thereby interfering with DNA processing. In the context of the present disclosure, PBDs include naturally produced and isolated PBDs, chemically synthesized naturally occurring PBDs, and chemically synthesized non-naturally occurring PBDs. PBDs also include monomeric, dimeric and hybrid PBDs (for a review see Gerratana, *Med Res Rev* 32(2):254-293, 2012).

Recombinant: A recombinant nucleic acid or protein is one that has a sequence that is not naturally occurring or has a sequence that is made by an artificial combination of two otherwise separated segments of sequence. This artificial combination is often accomplished by chemical synthesis or by the artificial manipulation of isolated segments of nucleic acids, for example, by genetic engineering techniques.

Sample (or biological sample): A biological specimen containing genomic DNA, RNA (including mRNA), protein, or combinations thereof, obtained from a subject. Examples include, but are not limited to, peripheral blood, tissue, cells, urine, saliva, tissue biopsy, fine needle aspirate, surgical specimen, and autopsy material. In one example, a sample includes a tumor biopsy.

Sequence identity: The similarity between amino acid or nucleic acid sequences is expressed in terms of the similarity between the sequences, otherwise referred to as sequence identity. Sequence identity is frequently measured in terms of percentage identity (or similarity or homology); the higher the percentage, the more similar the two sequences are. Homologs or variants of a polypeptide or nucleic acid molecule will possess a relatively high degree of sequence identity when aligned using standard methods.

Methods of alignment of sequences for comparison are well known in the art. Various programs and alignment algorithms are described in: Smith and Waterman, *Adv. Appl. Math.* 2:482, 1981; Needleman and Wunsch, *J. Mol. Biol.* 48:443, 1970; Pearson and Lipman, *Proc. Natl. Acad. Sci. U.S.A.* 85:2444, 1988; Higgins and Sharp, *Gene* 73:237, 1988; Higgins and Sharp, *CABIOS* 5:151, 1989; Corpet et al., *Nucleic Acids Research* 16:10881, 1988; and Pearson and Lipman, *Proc. Natl. Acad. Sci. U.S.A.* 85:2444, 1988. Altschul et al., *Nature Genet.* 6:119, 1994, presents a detailed consideration of sequence alignment methods and homology calculations.

The NCBI Basic Local Alignment Search Tool (BLAST) (Altschul et al., *J. Mol. Biol.* 215:403, 1990) is available from several sources, including the National Center for Biotechnology Information (NCBI, Bethesda, Md.) and on the internet, for use in connection with the sequence analysis programs blastp, blastn, blastx, tblastn and tblastx. A description of how to determine sequence identity using this program is available on the NCBI website on the internet.

Homologs and variants of an antibody that specifically binds a B7H3 polypeptide are typically characterized by possession of at least about 75%, for example at least about 80%, 90%, 95%, 96%, 97%, 98% or 99% sequence identity counted over the full-length alignment with the amino acid sequence of the antibody using the NCBI Blast 2.0, gapped blastp set to default parameters. For comparisons of amino acid sequences of greater than about 30 amino acids, the Blast 2 sequences function is employed using the default BLOSUM62 matrix set to default parameters, (gap existence cost of 11, and a per residue gap cost of 1). When aligning short peptides (fewer than around 30 amino acids), the alignment should be performed using the Blast 2 sequences function, employing the PAM30 matrix set to default parameters (open gap 9, extension gap 1 penalties). Proteins with even greater similarity to the reference sequences will show increasing percentage identities when assessed by this method, such as at least 80%, at least 85%, at least 90%, at least 95%, at least 98%, or at least 99% sequence identity. When less than the entire sequence is being compared for sequence identity, homologs and variants will typically possess at least 80% sequence identity over short windows of 10-20 amino acids, and may possess sequence identities of at least 85% or at least 90% or 95% depending on their similarity to the reference sequence. Methods for determining sequence identity over such short windows are available at the NCBI website on the internet. One of skill in the art will appreciate that these sequence identity ranges are provided for guidance only; it is entirely possible that strongly significant homologs could be obtained that fall outside of the ranges provided.

Small molecule: A molecule, typically with a molecular weight less than about 1000 Daltons, or in some embodiments, less than about 500 Daltons, wherein the molecule is capable of modulating, to some measurable extent, an activity of a target molecule.

Subject: Living multi-cellular vertebrate organisms, a category that includes both human and veterinary subjects, including human and non-human mammals.

Synthetic: Produced by artificial means in a laboratory, for example a synthetic nucleic acid or protein (for example, an antibody) can be chemically synthesized in a laboratory.

Therapeutically effective amount: A quantity of a specific substance sufficient to achieve a desired effect in a subject being treated. For instance, this can be the amount necessary to inhibit or suppress growth of a tumor. In one embodiment, a therapeutically effective amount is the amount necessary to eliminate, reduce the size, or prevent metastasis of a tumor, such as reduce a tumor size and/or volume by at least 10%, at least 20%, at least 50%, at least 75%, at least 80%, at least 90%, at least 95%, or even 100%, and/or reduce the number and/or size/volume of metastases by at least 10%, at least 20%, at least 50%, at least 75%, at least 80%, at least 90%, at least 95%, or even 100%, for example as compared to a size/volume/number prior to treatment. When administered to a subject, a dosage will generally be used that will achieve target tissue concentrations (for example, in tumors) that has been shown to achieve a desired in vitro effect.

Toxin: A molecule that is cytotoxic for a cell. Toxins include abrin, ricin, *Pseudomonas* exotoxin (PE), diphtheria toxin (DT), botulinum toxin, saporin, restrictocin or gelonin, or modified toxins thereof. For example, PE and DT are highly toxic compounds that typically bring about death through liver toxicity. PE and DT, however, can be modified into a form for use as an immunotoxin by removing the native targeting component of the toxin (such as domain Ia of PE or the B chain of DT) and replacing it with a different targeting moiety, such as an antibody.

Vector: A nucleic acid molecule as introduced into a host cell, thereby producing a transformed host cell. A vector may include nucleic acid sequences that permit it to replicate in a host cell, such as an origin of replication. A vector may also include one or more selectable marker genes and other genetic elements known in the art. In some embodiments, the vector is a virus vector, such as a lentivirus vector.

III. Single-Domain Monoclonal Antibodies ("Nanobodies") Specific for B7H3

Nanobodies include camelid $V_HH$, cartilaginous fish $V_{NAR}$, and human VH single domain antibodies. Rabbit monoclonal antibodies can recognize diverse epitopes, including those poorly immunogenic in mice and humans. The present disclosure describes immunization of rabbits with recombinant B7H3 protein and generation of a phage-displayed VH single domain library. After three rounds of phage panning, two binders (referred to as RFA1 and RFB1) were selected. Both binders expressed well in *E. coli*, with yields of 2 mg/L (RFA1) and 10 mg/L (RFB1). The rabbit nanobodies exhibited antigen-dependent binding to B7H3-positive tumor cell lines (IMR32, MC38-B7H3+, A431, and NBEB), but not B7H3 knockout cell lines (IMR32-B7H3 KO, MC38-B7H3 KO). The present disclosure also describes ten B7H3-specific camel $V_HH$ nanobodies isolated from eight different camel $V_HH$ libraries. The selected nanobodies are capable of binding B7H3-expressing cells, such as neuroblastoma cells, epidermoid carcinoma cells and pancreatic tumor cells.

The amino acid sequences of the ten camel and two rabbit single-domain antibodies are provided below. CDR sequences determined using the methods of Kabat, IMGT and Paratome are indicated by underline, bold and italics, respectively. The tables list the amino acid positions of CDR1, CDR2 and CDR3 of each antibody, as determined using either Kabat, IMGT or Paratome. One of skill in the art could readily determine the CDR boundaries using an alternative numbering scheme, such as the Chothia numbering scheme.

RWB12

(SEQ ID NO: 1)

QVQLVESGGGSVQVGGSLRLSCAASG*FTYN*SYSVGWFRQAPGKEREGVAAINSGGSSTYYA

ASVKGRFTISRDNAKNTVYLQMNSLKPEDTAMYYCAARSPSPLTFQTRTLREDSYNYWG

QGTQVTVSSS

|  | CDR1 | CDR2 | CDR3 |
|---|---|---|---|
| Kabat | 31-35 | 50-66 | 97-118 |
| IMGT | 26-33 | 51-58 | 97-119 |
| Paratome | 27-35 | 47-62 | 98-118 |

RWG8

(SEQ ID NO: 2)

DVQLVESGGGLVQPGGSLRLSCAASG*FTFS*RYWMGWFRQAPGKGVEWVSTINSGGSTYY

ADSVKGRFTISRDNAKNTLYLQLNNLKTEDTAMYYCAKEQWRTGSRGQGTQVTVSSS

|  | CDR1 | CDR2 | CDR3 |
|---|---|---|---|
| Kabat | 31-35 | 50-66 | 97-105 |
| IMGT | 26-33 | 51-58 | 97-106 |
| Paratome | 27-35 | 47-61 | 97-106 |

RWC4

(SEQ ID NO: 3)

EVQLVESGGGSVQAGGSLRLSCVASEDSTSAMCMGWFRQAPGKEREGVACINPTGEVTW

YGDSVKGRFTISRDTVKKIVYLQMNSLKPEDTAMYYCAARVTYGGDWSTDTDYEYWGQG

TQVTVSSS

|  | CDR1 | CDR2 | CDR3 |
|---|---|---|---|
| Kabat | 31-35 | 50-66 | 97-114 |
| IMGT | 26-33 | 51-58 | 97-115 |
| Paratome | 26-35 | 50-61 | 98-114 |

RWB2

(SEQ ID NO: 4)

AVQLVDSGGGSVQAGGSLRLSCVVSGYAFSTYDMAWFRQAPGEKCEWVSTVTNNGRTFYA

DSVKGRFIISRDNAKNILYLQMNSLKPEDTAVYSCAAAGVRVWRCASGGNEGTQVTVSSS

|  | CDR1 | CDR2 | CDR3 |
|---|---|---|---|
| Kabat | 31-35 | 50-65 | 96-110 |
| IMGT | 26-33 | 51-57 | 96-110 |
| Paratome | 27-35 | 47-60 | 96-109 |

RWH5

(SEQ ID NO: 5)

AVQLVESGGGSVQAGGSLRLSCKASGYCMGWFRQAPGKEREGVALNTEGGVTYYADSV

KGRFSISRDNTNLYLQMNSLKPEDTAIYYCAADDRPTRCAVGSLYLPYTYRGQGTQVTVSS

S

|  | CDR1 | CDR2 | CDR3 |
|---|---|---|---|
| Kabat | 27-30 | 45-61 | 90-109 |
| IMGT | 26-28 | 46-53 | 90-110 |
| Paratome | 27-30 | 43-55 | 90-110 |

RWD5

(SEQ ID NO: 6)

AVQLVESGGGLVQPGGSLSVSCAASGFTFS*VYWFY*WVRQAPRQGLEW*VS*TIASNGSTYYSD

SVKGRFTISRDNAKNTVYLQMNSLKPEDTAVYYC*VSDPDYYSDYEREYKF*WAQGTQVTV

SSS

|  | CDR1 | CDR2 | CDR3 |
|---|---|---|---|
| Kabat | 31-35 | 50-65 | 96-111 |
| IMGT | 26-33 | 51-57 | 96-112 |
| Paratome | 27-35 | 47-60 | 96-111 |

RWC3

(SEQ ID NO: 7)

QVQLVESGGGLVQPGGSLSVSCAASGFTFS*VYWFY*WVRQAPRQGLEW*VS*TIASNGSTYYSD

SVKGRFTISRDNAKNTVYLQMNSLKPEDTAVYYC*VSDPDYYSDYERAYKF*WAQGTQVTV

SSS

|  | CDR1 | CDR2 | CDR3 |
|---|---|---|---|
| Kabat | 31-35 | 50-65 | 96-111 |
| IMGT | 26-33 | 51-57 | 96-112 |
| Paratome | 27-35 | 47-60 | 96-111 |

RWG4

(SEQ ID NO: 8)

QVQLVQSGGGLVQPGGSLRLSCAASGFTFS*VYWFY*WVRQAPRQGLEW*VS*TIASNGSTYYS

DSVKGRFTISRDNAKNTVYLQMNSLKPEDTAVYYC*VSDPDYYSDYERAYKF*WAQGTQVT

VSSS

|  | CDR1 | CDR2 | CDR3 |
|---|---|---|---|
| Kabat | 31-35 | 50-65 | 96-111 |
| IMGT | 26-33 | 51-57 | 96-112 |
| Paratome | 27-35 | 47-60 | 96-111 |

RWD9

(SEQ ID NO: 9)

EVQLVESGGGLVQPGGSLSVSCAASGFTFS*VYWFY*WVRQAPRQGLEW*VS*TIASNGSTYYSD

SVKGRFTISRDNAKNTVYLQMNSLKPEDTAVYYC*VSDPDYYSDYERAYKF*WAQGTQVTV

SSS

|       | CDR1  | CDR2  | CDR3   |
|-------|-------|-------|--------|
| Kabat | 31-35 | 50-65 | 96-111 |
| IMGT  | 26-33 | 51-57 | 96-112 |
| Paratome | 27-35 | 47-60 | 96-111 |

RWH1                                                                (SEQ ID NO: 10)
AVQLVESGGGSVQAGGSLRLSCAAS**GMNLD*NYVRG*W**LRQAPGSKCEF*VS* *IIRRDGTTDYG*

DSVKGRFTISRDNAKNTVYLQMNSLKPDDTAVYYC*AAIVVPRAAEYACDGLPYR*GQGTQ

VTVSSS

|       | CDR1  | CDR2  | CDR3   |
|-------|-------|-------|--------|
| Kabat | 31-35 | 50-65 | 96-113 |
| IMGT  | 26-33 | 51-57 | 96-114 |
| Paratome | 27-35 | 47-60 | 97-114 |

RFA1                                                                (SEQ ID NO: 11)
QSLEESGGGLVTPGGTLTLTCTVSG*FSLS**SYGMS*WVRQAPGKGLEW*IGS**MANNGDPYYA*S
WAKGRFTISKTSTTVDLKITSPTTEDTATYFC*VRAPWGSHSMWGP*GTLVTVSSGGGGSGG
GGSGGGGSDPVLTQTAGGGTNVEIK

|       | CDR1  | CDR2  | CDR3   |
|-------|-------|-------|--------|
| Kabat | 30-34 | 50-64 | 93-105 |
| IMGT  | 25-32 | 50-56 | 93-104 |
| Paratome | 26-34 | 46-59 | 93-105 |

RFB1                                                                (SEQ ID NO: 12)
QEQLKESGGGRLVTPGTPLTLTCTVSG*FSPNN**YGVS*WVRQPPGKGLEW*IGM**SSTAGATYYA*N
WAKGRFTISKTSTTVDLEITSPTTEDTATYFC*AKGTPSLSYGNIWG*PGTLVTVSSGGGGSGG
GGSGGGGSAQGPTQTPGGGSGTEVVVK

|       | CDR1  | CDR2  | CDR3   |
|-------|-------|-------|--------|
| Kabat | 32-35 | 51-65 | 94-107 |
| IMGT  | 26-33 | 51-57 | 94-107 |
| Paratome | 27-35 | 47-60 | 94-108 |

Provided herein are monoclonal antibodies that bind (for example, specifically bind) B7H3, such as cell-surface or soluble B7H3. In some embodiments, the monoclonal antibody is a single-domain antibody, such as a VH single-domain antibody.

In some embodiments, the single-domain monoclonal antibody includes at least a portion of the amino acid sequence set forth herein as any one of SEQ ID NOs: 1-12, such as one or more (such as all three) CDR sequences from any one of antibodies RWB12 (SEQ ID NO: 1), RWG8 (SEQ ID NO: 2), RWC4 (SEQ ID NO: 3), RWB2 (SEQ ID NO: 4), RWH5 (SEQ ID NO: 5), RWD5 (SEQ ID NO: 6), RWC3 (SEQ ID NO: 7), RWG4 (SEQ ID NO: 8), RWD9 (SEQ ID NO: 9), RWH1 (SEQ ID NO: 10), RFA1 (SEQ ID NO: 11) and RFB1 (SEQ ID NO: 12), as determined by any numbering scheme, such as IMGT, Kabat, Paratome or Chothia, or any combination thereof. In some examples, the single-domain antibody comprises the CDR1, CDR2 and CDR3 sequences of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11 or SEQ ID NO: 12. In particular examples, the CDR sequences are determined using the Kabat, IMGT or Paratome numbering schemes, or a combination of the Kabat, IMGT and Paratome numbering schemes.

In some embodiments, the CDR1, CDR2 and CD3 sequences of the antibody respectively comprise residues 31-35, 50-66 and 97-118 of SEQ ID NO: 1; residues 26-33, 51-58 and 97-119 of SEQ ID NO: 1; or residues 27-35, 47-62 and 98-118 of SEQ ID NO: 1. In some examples, the amino acid sequence of the antibody is at least 80%, at least 85%, at least 90%, at least 95%, at least 96%, at least 97%, at least 98% or at least 99% identical to SEQ ID NO: 1. In specific examples, the amino acid sequence of the antibody comprises or consists of SEQ ID NO: 1.

In some embodiments, the CDR1, CDR2 and CD3 sequences of the antibody respectively comprise residues 31-35, 50-66 and 97-105 of SEQ ID NO: 2; residues 26-33, 51-58 and 97-106 of SEQ ID NO: 2; or residues 27-35, 47-61 and 97-106 of SEQ ID NO: 2. In some examples, the amino acid sequence of the antibody is at least 80%, at least 85%, at least 90%, at least 95%, at least 96%, at least 97%, at least 98% or at least 99% identical to SEQ ID NO: 2. In specific examples, the amino acid sequence of the antibody comprises or consists of SEQ ID NO: 2.

In some embodiments, the CDR1, CDR2 and CD3 sequences of the antibody respectively comprise residues 31-35, 50-66 and 97-114 of SEQ ID NO: 3; residues 26-33, 51-58 and 97-115 of SEQ ID NO: 3; or residues 26-35, 50-61 and 98-114 of SEQ ID NO: 3. In some examples, the amino acid sequence of the antibody is at least 80%, at least 85%, at least 90%, at least 95%, at least 96%, at least 97%, at least 98% or at least 99% identical to SEQ ID NO: 3. In specific examples, the amino acid sequence of the antibody comprises or consists of SEQ ID NO: 3.

In some embodiments, the CDR1, CDR2 and CD3 sequences of the antibody respectively comprise residues 31-35, 50-65 and 96-110 of SEQ ID NO: 4; residues 26-33, 51-57 and 96-110 of SEQ ID NO: 4; or residues 27-35, 47-60 and 96-109 of SEQ ID NO: 4. In some examples, the amino acid sequence of the antibody is at least 80%, at least 85%, at least 90%, at least 95%, at least 96%, at least 97%, at least 98% or at least 99% identical to SEQ ID NO: 4. In specific examples, the amino acid sequence of the antibody comprises or consists of SEQ ID NO: 4.

In some embodiments, the CDR1, CDR2 and CD3 sequences of the antibody respectively comprise residues 27-30, 45-61 and 90-109 of SEQ ID NO: 5; residues 26-28, 46-53 and 90-110 of SEQ ID NO: 5; or residues 27-30, 43-55 and 90-110 of SEQ ID NO: 5. In some examples, the amino acid sequence of the antibody is at least 80%, at least 85%, at least 90%, at least 95%, at least 96%, at least 97%, at least 98% or at least 99% identical to SEQ ID NO: 5. In specific examples, the amino acid sequence of the antibody comprises or consists of SEQ ID NO: 5.

In some embodiments, the CDR1, CDR2 and CD3 sequences of the antibody respectively comprise residues 31-35, 50-65 and 96-111 of SEQ ID NO: 6; residues 26-33, 51-57 and 96-112 of SEQ ID NO: 6; or residues 27-35, 47-60 and 96-111 of SEQ ID NO: 6. In some examples, the amino acid sequence of the antibody is at least 80%, at least 85%, at least 90%, at least 95%, at least 96%, at least 97%, at least 98% or at least 99% identical to SEQ ID NO: 6. In specific examples, the amino acid sequence of the antibody comprises or consists of SEQ ID NO: 6.

In some embodiments, the CDR1, CDR2 and CD3 sequences of the antibody respectively comprise residues 31-35, 50-65 and 96-111 of SEQ ID NO: 7; residues 26-33, 51-57 and 96-112 of SEQ ID NO: 7; or residues 27-35, 47-60 and 96-111 of SEQ ID NO: 7. In some examples, the amino acid sequence of the antibody is at least 80%, at least 85%, at least 90%, at least 95%, at least 96%, at least 97%, at least 98% or at least 99% identical to SEQ ID NO: 7. In specific examples, the amino acid sequence of the antibody comprises or consists of SEQ ID NO: 7.

In some embodiments, the CDR1, CDR2 and CD3 sequences of the antibody respectively comprise residues 31-35, 50-65 and 96-111 of SEQ ID NO: 8; residues 26-33, 51-57 and 96-112 of SEQ ID NO: 8; or residues 27-35, 47-60 and 96-111 of SEQ ID NO: 8. In some examples, the amino acid sequence of the antibody is at least 80%, at least 85%, at least 90%, at least 95%, at least 96%, at least 97%, at least 98% or at least 99% identical to SEQ ID NO: 8. In specific examples, the amino acid sequence of the antibody comprises or consists of SEQ ID NO: 8.

In some embodiments, the CDR1, CDR2 and CD3 sequences of the antibody respectively comprise residues 31-35, 50-65 and 96-111 of SEQ ID NO: 9; residues 26-33, 51-57 and 96-112 of SEQ ID NO: 9; or residues 27-35, 47-60 and 96-111 of SEQ ID NO: 9. In some examples, the amino acid sequence of the antibody is at least 80%, at least 85%, at least 90%, at least 95%, at least 96%, at least 97%, at least 98% or at least 99% identical to SEQ ID NO: 9. In specific examples, the amino acid sequence of the antibody comprises or consists of SEQ ID NO: 9.

In some embodiments, the CDR1, CDR2 and CD3 sequences of the antibody respectively comprise residues 31-35, 50-65 and 96-113 of SEQ ID NO: 10; residues 26-33, 51-57 and 96-114 of SEQ ID NO: 10; or residues 27-35, 47-60 and 97-114 of SEQ ID NO: 10. In some examples, the amino acid sequence of the antibody is at least 80%, at least 85%, at least 90%, at least 95%, at least 96%, at least 97%, at least 98% or at least 99% identical to SEQ ID NO: 10. In specific examples, the amino acid sequence of the antibody comprises or consists of SEQ ID NO: 10.

In some embodiments, the CDR1, CDR2 and CD3 sequences of the antibody respectively comprise residues 30-34, 50-64 and 93-105 of SEQ ID NO: 11; residues 25-32, 50-56 and 93-104 of SEQ ID NO: 11; or residues 26-34, 46-59 and 93-105 of SEQ ID NO: 11. In some examples, the amino acid sequence of the antibody is at least 80%, at least 85%, at least 90%, at least 95%, at least 96%, at least 97%, at least 98% or at least 99% identical to SEQ ID NO: 11, or to residues 1-113 of SEQ ID NO: 11. In specific examples, the amino acid sequence of the antibody comprises or consists of SEQ ID NO: 11. In other specific examples, the amino acid sequence of the antibody comprises or consists of residues 1-113 of SEQ ID NO: 11.

In some embodiments, the CDR1, CDR2 and CD3 sequences of the antibody respectively comprise residues 32-35, 51-65 and 94-107 of SEQ ID NO: 12; residues 26-33, 51-57 and 94-107 of SEQ ID NO: 12; or residues 27-35, 47-60 and 94-108 of SEQ ID NO: 12. In some examples, the amino acid sequence of the antibody is at least 80%, at least 85%, at least 90%, at least 95%, at least 96%, at least 97%, at least 98% or at least 99% identical to SEQ ID NO: 12, or to residues 1-116 of SEQ ID NO: 12. In specific examples, the amino acid sequence of the antibody comprises or consists of SEQ ID NO: 12. In other specific examples, the amino acid sequence of the antibody comprises or consists of residues 1-116 of SEQ ID NO: 12.

In some embodiments, the antibody is a humanized antibody or a chimeric antibody.

Also provided herein are chimeric antigen receptors (CARs) that include a single-domain monoclonal antibody disclosed herein. In some embodiments, the CAR further includes a hinge region, a transmembrane domain, a costimulatory signaling moiety, a signaling domain, or any combination thereof. In specific non-limiting examples, the hinge region comprises a CD8a hinge region, the transmembrane domain comprises a CD8a transmembrane domain, the costimulatory signaling moiety comprises a 4-1BB signaling moiety and/or the signaling domain comprises a CD3ζ signaling domain.

Also provided herein are B7H3-specific antibodies modified to enable their use with a universal CAR system. In some embodiments, the B7H3-specific antibody is fused to one component of a specific binding pair. In some examples, the antibody is fused to a leucine zipper or biotin.

Further provided are cells expressing a B7H3-specific CAR. In some examples, the cell is a T lymphocyte, such as a CTL, or natural killer cell. CARs and CAR-expressing cells are further described in section IV.

Also provided herein are immunoconjugates that include a single-domain antibody disclosed herein and an effector molecule. In some embodiments, the effector molecule is a toxin, such as, but not limited to, *Pseudomonas* exotoxin or a variant thereof, such as PE38. In other embodiments, the effector molecule is a detectable label, such as, but not limited to, a fluorophore, an enzyme or a radioisotope. In other embodiments, the effector molecule is a photon absorber, such as IR700 Immunoconjugates comprising a photon absorber can be used for photoimmunotherapy. Immunoconjugates are further described in section V.

Further provided herein are antibody-drug conjugates (ADCs) that include a drug conjugated to a single-domain antibody disclosed herein. In some embodiments, the drug is a small molecule, for example an anti-microtubule agent, an anti-mitotic agent and/or a cytotoxic agent. ADCs are further described in section VI.

Also provided herein are multi-specific antibodies that include a single-domain antibody disclosed herein and at least one additional monoclonal antibody or antigen-binding fragment thereof. In some embodiments, the multi-specific antibody is a bispecific antibody. In other embodiments, the multi-specific antibody is a trispecific antibody. In some embodiments, the at least one additional monoclonal antibody or antigen binding fragment thereof specifically binds a component of the T cell receptor or a natural killer (NK) cell activating receptor. Multi-specific antibodies are further described in section VII.

Further provided herein are antibody-nanoparticle conjugates that include a nanoparticle conjugated to a single-domain antibody disclosed herein. In some embodiments, the nanoparticle comprises a polymeric nanoparticle, nanosphere, nanocapsule, liposome, dendrimer, polymeric micelle, or niosome. In some embodiments, the nanoparticle includes a cytotoxic agent. Antibody-nanoparticle conjugates are further described in section VIII.

Also provided herein are fusion proteins that include a single-domain antibody disclosed herein and a heterologous protein or peptide. In some embodiments, the heterologous protein is an Fc protein or a leucine zipper.

Further provided herein are nucleic acid molecules that encode an antibody, CAR, immunoconjugate, multiple-specific antibody or fusion protein disclosed herein. In some embodiments, the nucleic acid molecule is operably linked to a promoter. Vectors that include the disclosed nucleic acid molecules are also provided. Isolated cells that include a nucleic acid molecule are vector disclosed herein are further provided.

Also provided herein is a nucleic acid construct that expresses a CAR and a truncated human EGFR (huEGFRt). In some embodiments, the nucleic acid comprises in the 5' to 3' direction: a nucleic acid encoding a first granulocyte-macrophage colony stimulating factor receptor signal sequence (GMCSFRss); a nucleic acid encoding a B7H3-specific single-domain monoclonal antibody disclosed herein; a nucleic acid encoding an extracellular hinge region; a nucleic acid encoding a transmembrane domain; a nucleic acid encoding an intracellular co-stimulatory domain; a nucleic acid encoding a intracellular signaling domain; a nucleic acid encoding a self-cleaving 2A peptide; a nucleic acid encoding a second GMCSFRss; and a nucleic acid encoding a truncated human epidermal growth factor receptor (huEGFRt). In some examples, the nucleic acid further includes a human elongation factor 1α (EF1α) promoter sequence 5' of the nucleic acid encoding the first GMCSFRss. In some examples, the hinge region comprises a CD8α hinge region. In some examples, the transmembrane domain comprises a CD8α transmembrane domain. In some examples, the costimulatory signaling moiety comprises a 4-1BB signaling moiety. In some examples, the signaling domain comprises a CD3ζ signaling domain. In some examples, the amino acid sequence of the B7H3-specific antibody comprises any one of SEQ ID NOs: 1-12. Vectors comprising the nucleic acid constructs are also provided. In some embodiments, the vector is a lentiviral vector.

Further provided is an isolated cell co-expressing a B7H3-specific CAR disclosed herein and huEGFRt. In some examples, the cell is a CTL or a NK cell.

Compositions that include a pharmaceutically acceptable carrier and a single-domain monoclonal antibody, CAR, isolated cell (such as a CAR expressing cell, for example a CAR T cell or a CAR NK cell), immunoconjugate, ADC, multi-specific antibody, antibody-nanoparticle conjugate, or fusion protein disclosed herein are further provided by the present disclosure. Compositions and their uses are further described in section IX.

IV. Chimeric Antigen Receptors (CARs)

The disclosed nanobodies can also be used to produce CARs (also known as chimeric T cell receptors, artificial T cell receptors or chimeric immunoreceptors) and/or cytotoxic T lymphocytes (CTLs) or natural killer (NK) cells engineered to express CARs. Generally, CARs include a binding moiety, an extracellular hinge and spacer element, a transmembrane region and an endodomain that performs signaling functions (Cartellieri et al., *J Biomed Biotechnol* 2010:956304, 2010; Dai et al., *J Natl Cancer Inst* 108(7): djv439, 2016). In many instances, the binding moiety is an antigen binding fragment of a monoclonal antibody, such as a scFv, or a single-domain antibody. The spacer/hinge region typically includes sequences from IgG subclasses, such as IgG1, IgG4, IgD and CD8 domains. The transmembrane domain can be derived from a variety of different T cell proteins, such as CD3ζ, CD4, CD8 or CD28. Several different endodomains have been used to generate CARs. For example, the endodomain can consist of a signaling chain having an ITAM, such as CD3ζ or FcεRIγ. In some instances, the endodomain further includes the intracellular portion of at least one additional co-stimulatory domain, such as CD28, 4-1BB (CD137, TNFRSF9), OX-40 (CD134), ICOS, CD27 and/or DAP10.

CTLs, NK cells (or other immune cells) expressing CARs can be used to target a specific cell type, such as a B7H3-positive tumor cell. Thus, the nanobodies disclosed herein can be used to engineer CTLs or NK cells that express a CAR containing the B7H3-specific monoclonal antibody, thereby targeting the engineered CTLs or NK cells to B7H3-expressing tumor cells. Engineered T cells have previously been used for adoptive therapy for some types of cancer (see, for example, Park et al., *Mol Ther* 15(4):825-833, 2007). The use of T cells expressing CARs is more universal than standard CTL-based immunotherapy because CTLs expressing CARs are HLA unrestricted and can therefore be used for any patient having a tumor that expresses the target antigen.

Multispecific (such as bispecific) or bicistronic CARs are also contemplated by the present disclosure. In some embodiments, the multispecific or bispecific CAR includes a nanobody specific for B7H3 (such as any one of RWB12, RWG8, RWC4, RWB2, RWH5, RWD5, RWC3, RWG4, RWD9, RWH1, RFA1, and RFB1) and a monoclonal antibody specific for a different antigen, such as a T cell antigen. Similarly, a bicistronic CAR includes two CAR molecules expressed from the same construct where one CAR molecule is a B7H3-targeted CAR and the second CAR targets a second antigen. See, for example, Qin et al., *Blood* 130:810, 2017; and WO/2018/213337.

Accordingly, provided herein are CARs that include a B7H3-specific antibody, such as any one of the nanobodies disclosed herein. Also provided are isolated nucleic acid molecules and vectors encoding the CARs (including bispecific and bicistronic CARs), and host cells, such as CTLs or NK cells, expressing the CARs, bispecific CAR or bicistronic CARs. CTLs or NK cells expressing CARs comprised of a B7H3-specific monoclonal antibody can be used for the treatment of cancers that express B7H3. In some embodiments herein, the CAR is a bispecific CAR. In other embodiments herein, the CAR is a bicistronic CAR.

In some embodiments, the CAR includes a signal peptide sequence, for example, N-terminal to the antigen binding domain. The signal peptide sequence can be any suitable signal peptide sequence, such as a signal sequence from granulocyte-macrophage colony-stimulating factor receptor (GMCSFR), immunoglobulin light chain kappa, or IL-2. While the signal peptide sequence may facilitate expression of the CAR on the surface of the cell, the presence of the signal peptide sequence in an expressed CAR is not necessary in order for the CAR to function. Upon expression of the CAR on the cell surface, the signal peptide sequence may be cleaved off of the CAR. Accordingly, in some embodiments, the CAR lacks a signal peptide sequence.

In some embodiments, the CARs disclosed herein are expressed from a construct (such as from a lentivirus vector) that also expresses a truncated version of human EGFR (huEGFRt). The CAR and huEGFRt are separated by a self-cleaving peptide sequence (such as T2A) such that upon expression in a transduced cell, the CAR is cleaved from huEGFRt.

In some embodiments disclosed herein, the CAR constructs encode the following amino acid sequences, in the N-terminal to C-terminal direction:

The human epidermal growth factor receptor is comprised of four extracellular domains, a transmembrane domain and three intracellular domains. The EGFR domains are found in the following N-terminal to C-terminal order: Domain I—Domain II—Domain III—Domain IV—transmembrane (TM) domain—juxtamembrane domain—tyrosine kinase domain—C-terminal tail. Domain I and Domain III are leucine-rich domains that participate in ligand binding. Domain II and Domain IV are cysteine-rich domains and do not make contact with EGFR ligands. Domain II mediates formation of homo- or hetero-dimers with analogous domains from other EGFR family members, and Domain IV can form disulfide bonds with Domain II. The EGFR TM domain makes a single pass through the cell membrane and may play a role in protein dimerization. The intracellular domain includes the juxtamembrane domain, tyrosine kinase domain and C-terminal tail, which mediate EGFR signal transduction (Wee and Wang, *Cancers* 9(52), doi:10.3390/cancers9050052; Ferguson, *Annu Rev Biophys* 37:353-373, 2008; Wang et al., *Blood* 118(5):1255-1263, 2011).

A truncated version of human EGFR, referred to herein as "huEGFRt" includes only Domain III, Domain IV and the

```
GMCSFRss:
                                                           (SEQ ID NO: 27)
MLLLVTSLLLCELPHPAFLLIP

NdeI:
HM

Antigen-binding:
a B7H3-specific antibody (such as a nanobody disclosed herein)

SpeI:
TS

CD8α hinge:
                                                           (SEQ ID NO: 28)
TTTPAPRPPTPAPTIASQPLSLRPEACRPAAGGAVHTRGLDFACD CD8α TM:
                                                           (SEQ ID NO: 29)
IYIWAPLAGTCGVLLLSLVIT 4-1BB:
                                                           (SEQ ID NO: 30)
KRGRKKLLYIFKQPFMRPVQTTQEEDGCSCRFPEEEEGGCEL CD3ζ:
                                                           (SEQ ID NO: 31)
RVKFSRSADAPAYQQGQNQLYNELNLGRREEYDVLDKRRGRDPEMGGKPRRKNPQEGLY

NELQKDKMAEAYSEIGMKGERRRGKGHDGLYQGLSTATKDTYDALHMQALPPR

T2A:
                                                           (SEQ ID NO: 32)
EGRGSLLTCGDVEENPGP

GMCSFRss:
                                                           (SEQ ID NO: 27)
MLLLVTSLLLCELPHPAFLLIP huEGFRt:
                                                           (SEQ ID NO: 33)
RKVCNGIGIGEFKDSLSINATNIKHFKNCTSISGDLHILPVAFRGDSFTHTPPLDPQELDILKT

VKEITGFLLIQAWPENRTDLHAFENLEIIRGRTKQHGQFSLAVVSLNITSLGLRSLKEISDGD

VIISGNKNLCYANTINWKKLFGTSGQKTKIISNRGENSCKATGQVCHALCSPEGCWGPEPR

DCVSCRNVSRGRECVDKCNLLEGEPREFVENSECIQCHPECLPQAMNITCTGRGPDNCIQC

AHYIDGPHCVKTCPAGVMGENNTLVWKYADAGHVCHLCHPNCTYGCTGPGLEGCPTNG

PKIPSIATGMVGALLLLLVVALGIGLFM
```

TM domain. Thus, huEGFRt lacks Domain I, Domain II, and all three intracellular domains. huEGFRt is not capable of binding EGF and lacks signaling activity. However, this molecule retains the capacity to bind particular EGFR-specific monoclonal antibodies, such as FDA-approved cetuximab (PCT Publication No. WO 2011/056894, which is herein incorporated by reference).

Transduction of T cells (or NK cells) with a construct (such as a lentivirus vector) encoding both huEGFRt and a tumor antigen-specific CAR disclosed herein allows for selection of transduced T cells using labelled EGFR monoclonal antibody cetuximab (ERBITUX™). For example, cetuximab can be labeled with biotin, and transduced T cells can be selected using anti-biotin magnetic beads, which are commercially available (such as from Miltenyi Biotec). Co-expression of huEGFRt also allows for in vivo tracking of adoptively transferred CAR-expressing T cells (or NK cells). Furthermore, binding of cetuximab to T cells expressing huEGFRt induces cytotoxicity of ADCC effector cells, thereby providing a mechanism to eliminate transduced T cells in vivo (Wang et al., *Blood* 118(5):1255-1263, 2011), such as at the conclusion of therapy.

Also provided herein are B7H3-specific monoclonal antibodies (such as a nanobody disclosed herein) modified to enable their use with a universal CAR system. Universal CAR systems have been developed in order to increase CAR flexibility and expand their use to additional antigens. Currently, for each patient who receives CAR T cell therapy, autologous T cells must be cultured, expanded, and modified to express an antigen-specific CAR. This process is lengthy and expensive, limiting its use. Universal CARs are based on a system in which the signaling components of the CAR are split from the antigen-binding portion of the molecule, but come together using a "lock-key" system. For example, biotin-binding immune receptor (BBIR) CARs are comprised of an intracellular T cell signaling domain fused to an extracellular domain comprising avidin. Biotinylated antigen-specific (such as B7H3-specific) monoclonal antibodies can then bind the BBIR to direct T cells to tumor antigen-expressing cells. Another example is the split, universal and programmable (SUPRA) CAR system. In the SUPRA system, the CAR includes the intracellular signaling domains fused to an extracellular leucine zipper, which is paired with an antigen-specific monoclonal antibody fused to a cognate leucine zipper. For a review of universal CAR systems, see, for example, Zhao et al., *J Hematol Oncol* 11(1):132, 2018; and Cho et al., *Cell* 173:1426-1438, 2018. In some embodiments herein, the B7H3-specific monoclonal antibody is fused to one component of a specific binding pair. In some examples, the monoclonal antibody is fused to a leucine zipper or biotin.

Another type of universal CAR can be generated using a sortase enzyme. A sortase is a prokaryotic enzyme that modifies surface proteins by recognizing and cleaving a carboxyl-terminal sorting signal. Sortase catalyzes transpeptidation between a sortase recognition motif and a sortase acceptor motif. Thus, antigen-specific CARs can be generated by contacting an antigen-specific antibody fused to a sortase recognition motif with a portion of a CAR molecule that includes the intracellular signaling domain(s), a transmembrane region and an extracellular portion comprising a sortase acceptor motif. In the presence of the sortase enzyme, the two components become covalently attached to form a complete antigen-specific CAR. Accordingly, in some embodiments herein, a B7H3-specific monoclonal antibody is modified to include a sortase recognition motif (see, for example, PCT Publication No. WO 2016/014553).

V. Immunoconjugates

The disclosed single-domain monoclonal antibodies can be conjugated to a therapeutic agent or effector molecule Immunoconjugates include, but are not limited to, molecules in which there is a covalent linkage of a therapeutic agent to an antibody. A therapeutic agent is an agent with a particular biological activity directed against a particular target molecule or a cell bearing a target molecule. One of skill in the art will appreciate that therapeutic agents can include various drugs such as vinblastine, daunomycin and the like, cytotoxins such as native or modified Pseudomonas exotoxin or diphtheria toxin, encapsulating agents (such as liposomes) that contain pharmacological compositions, radioactive agents such as $^{125}I$, $^{32}P$, $^{14}C$, $^{3}H$ and $^{35}S$, photon absorbers such as IR700, and other labels, target moieties and ligands.

The choice of a particular therapeutic agent depends on the particular target molecule or cell, and the desired biological effect. Thus, for example, the therapeutic agent can be a cytotoxin that is used to bring about the death of a particular target cell (such as a tumor cell). Conversely, where it is desired to invoke a non-lethal biological response, the therapeutic agent can be conjugated to a non-lethal pharmacological agent or a liposome containing a non-lethal pharmacological agent.

With the therapeutic agents and antibodies described herein, one of skill can readily construct a variety of clones containing functionally equivalent nucleic acids, such as nucleic acids which differ in sequence but which encode the same effector moiety or antibody sequence. Thus, the present disclosure provides nucleic acids encoding antibodies and conjugates and fusion proteins thereof.

Effector molecules can be linked to an antibody of interest using any number of means known to those of skill in the art. Both covalent and noncovalent attachment means may be used. The procedure for attaching an effector molecule to an antibody varies according to the chemical structure of the effector. Polypeptides typically contain a variety of functional groups; such as carboxylic acid (COOH), free amine (—NH$_2$) or sulfhydryl (—SH) groups, which are available for reaction with a suitable functional group on an antibody to result in the binding of the effector molecule. Alternatively, the antibody is derivatized to expose or attach additional reactive functional groups. The derivatization may involve attachment of any of a number of known linker molecules. The linker can be any molecule used to join the antibody to the effector molecule. The linker is capable of forming covalent bonds to both the antibody and to the effector molecule. Suitable linkers are well-known to those of skill in the art and include, but are not limited to, straight or branched-chain carbon linkers, heterocyclic carbon linkers, or peptide linkers. Where the antibody and the effector molecule are polypeptides, the linkers may be joined to the constituent amino acids through their side groups (such as through a disulfide linkage to cysteine) or to the alpha carbon amino and carboxyl groups of the terminal amino acids.

In some circumstances, it is desirable to free the effector molecule from the antibody when the immunoconjugate has reached its target site. Therefore, in these circumstances, immunoconjugates will comprise linkages that are cleavable in the vicinity of the target site. Cleavage of the linker to release the effector molecule from the antibody may be prompted by enzymatic activity or conditions to which the immunoconjugate is subjected either inside the target cell or in the vicinity of the target site.

In view of the large number of methods that have been reported for attaching a variety of radiodiagnostic compounds, radiotherapeutic compounds, labels (such as enzymes or fluorescent molecules), drugs, toxins, and other agents to antibodies one skilled in the art will be able to determine a suitable method for attaching a given agent to an antibody or other polypeptide.

The antibodies disclosed herein can be derivatized or linked to another molecule (such as another peptide or protein). In general, the antibodies or portion thereof is derivatized such that the binding to the target antigen is not affected adversely by the derivatization or labeling. For example, the antibody can be functionally linked (by chemical coupling, genetic fusion, noncovalent association or otherwise) to one or more other molecular entities, such as another antibody (for example, a bispecific antibody or a diabody), a detection agent, a photon absorber, a pharmaceutical agent, and/or a protein or peptide that can mediate association of the antibody or antibody portion with another molecule (such as a streptavidin core region or a polyhistidine tag).

One type of derivatized antibody is produced by cross-linking two or more antibodies (of the same type or of different types, such as to create bispecific antibodies). Suitable crosslinkers include those that are heterobifunctional, having two distinctly reactive groups separated by an appropriate spacer (such as m-maleimidobenzoyl-N-hydroxysuccinimide ester) or homobifunctional (such as disuccinimidyl suberate). Such linkers are commercially available.

The antibody can be conjugated with a detectable marker; for example, a detectable marker capable of detection by ELISA, spectrophotometry, flow cytometry, microscopy or diagnostic imaging techniques (such as computed tomography (CT), computed axial tomography (CAT) scans, magnetic resonance imaging (MRI), nuclear magnetic resonance imaging NMRI), magnetic resonance tomography (MTR), ultrasound, fiberoptic examination, and laparoscopic examination). Specific, non-limiting examples of detectable markers include fluorophores, chemiluminescent agents, enzymatic linkages, radioactive isotopes and heavy metals or compounds (for example super paramagnetic iron oxide nanocrystals for detection by MRI). For example, useful detectable markers include fluorescent compounds, including fluorescein, fluorescein isothiocyanate, rhodamine, 5-dimethylamine-1-napthalenesulfonyl chloride, phycoerythrin, lanthanide phosphors and the like. Bioluminescent markers are also of use, such as luciferase, green fluorescent protein (GFP) and yellow fluorescent protein (YFP). An antibody or antigen binding fragment can also be conjugated with enzymes that are useful for detection, such as horseradish peroxidase, β-galactosidase, luciferase, alkaline phosphatase, glucose oxidase and the like. When an antibody or antigen binding fragment is conjugated with a detectable enzyme, it can be detected by adding additional reagents that the enzyme uses to produce a reaction product that can be discerned. For example, when the agent horseradish peroxidase is present the addition of hydrogen peroxide and diaminobenzidine leads to a colored reaction product, which is visually detectable. An antibody or antigen binding fragment may also be conjugated with biotin, and detected through indirect measurement of avidin or streptavidin binding. It should be noted that the avidin itself can be conjugated with an enzyme or a fluorescent label.

An antibody may be labeled with a magnetic agent, such as gadolinium. Antibodies can also be labeled with lanthanides (such as europium and dysprosium), and manganese. Paramagnetic particles such as superparamagnetic iron oxide are also of use as labels. An antibody may also be labeled with a predetermined polypeptide epitopes recognized by a secondary reporter (such as leucine zipper pair sequences, binding sites for secondary antibodies, metal binding domains, epitope tags). In some embodiments, labels are attached by spacer arms of various lengths to reduce potential steric hindrance.

An antibody can also be labeled with a radiolabeled amino acid. The radiolabel may be used for both diagnostic and therapeutic purposes. For instance, the radiolabel may be used to detect expression of a target antigen by x-ray, emission spectra, or other diagnostic techniques. Examples of labels for polypeptides include, but are not limited to, the following radioisotopes or radionucleotides: $^{3}H$, $^{14}C$, $^{15}N$, $^{35}S$, $^{90}Y$, $^{99}Tc$, $^{111}In$, $^{125}I$, $^{131}I$.

An antibody disclosed herein can also be conjugated to a photon absorber. In some embodiments, the photon absorber is a phthalocyanine dye, such as, but not limited to, IRDye® 700DX (also known as "IR700"). Antibody-photoabsorber conjugates can be used for photoimmunotherapy.

An antibody can also be derivatized with a chemical group such as polyethylene glycol (PEG), a methyl or ethyl group, or a carbohydrate group. These groups may be useful to improve the biological characteristics of the antibody, such as to increase serum half-life or to increase tissue binding.

Toxins can be employed with the monoclonal antibodies described herein to produce immunotoxins. Exemplary toxins include ricin, abrin, diphtheria toxin and subunits thereof, as well as botulinum toxins A through F. These toxins are readily available from commercial sources (for example, Sigma Chemical Company, St. Louis, MO). Contemplated toxins also include variants of the toxins described herein (see, for example, see, U.S. Pat. Nos. 5,079,163 and 4,689,401). In one embodiment, the toxin is *Pseudomonas* exotoxin (PE) (U.S. Pat. No. 5,602,095). As used herein "*Pseudomonas* exotoxin" refers to a full-length native (naturally occurring) PE or a PE that has been modified. Such modifications can include, but are not limited to, elimination of domain Ia, various amino acid deletions in domains Ib, II and III, single amino acid substitutions and the addition of one or more sequences at the carboxyl terminus (for example, see Siegall et al., *J. Biol. Chem.* 264:14256-14261, 1989).

PE employed with the monoclonal antibodies described herein can include the native sequence, cytotoxic fragments of the native sequence, and conservatively modified variants of native PE and its cytotoxic fragments. Cytotoxic fragments of PE include those which are cytotoxic with or without subsequent proteolytic or other processing in the target cell. Cytotoxic fragments of PE include PE40, PE38, and PE35. For additional description of PE and variants thereof, see for example, U.S. Pat. Nos. 4,892,827; 5,512,658; 5,602,095; 5,608,039; 5,821,238; and 5,854,044; U.S. Patent Application Publication No. 2015/0099707; PCT Publication Nos. WO 99/51643 and WO 2014/052064; Pai et al., *Proc. Natl. Acad. Sci. USA* 88:3358-3362, 1991; Kondo et al., *J. Biol. Chem.* 263:9470-9475, 1988; Pastan et al., *Biochim. Biophys. Acta* 1333: C1-C6, 1997.

Also contemplated herein are protease-resistant PE variants and PE variants with reduced immunogenicity, such as, but not limited to PE-LR, PE-6X, PE-8X, PE-LR/6X and PE-LR/8X (see, for example, Weldon et al., *Blood* 113(16): 3792-3800, 2009; Onda et al., *Proc Natl Acad Sci USA* 105(32):11311-11316, 2008; and PCT Publication Nos. WO 2007/016150, WO 2009/032954 and WO 2011/032022, which are herein incorporated by reference).

In some examples, the PE is a variant that is resistant to lysosomal degradation, such as PE-LR (Weldon et al., i Blood 113(16):3792-3800, 2009; PCT Publication No. WO 2009/032954). In other examples, the PE is a variant designated PE-LR/6X (PCT Publication No. WO 2011/032022). In other examples, the PE variant is PE with reducing immunogenicity. In yet other examples, the PE is a variant designated PE-LR/8M (PCT Publication No. WO 2011/032022).

Modification of PE may occur in any previously described variant, including cytotoxic fragments of PE (for example, PE38, PE-LR and PE-LR/8M). Modified PEs may include any substitution(s), such as for one or more amino acid residues within one or more T-cell epitopes and/or B cell epitopes of PE, or deletion of one or more T-cell and/or B-cell epitopes (see, for example, U.S. Patent Application Publication No. 2015/0099707).

Contemplated forms of PE also include deimmunized forms of PE, for example versions with domain II deleted (for example, PE24). Deimmunized forms of PE are described in, for example, PCT Publication Nos. WO 2005/052006, WO 2007/016150, WO 2007/014743, WO 2007/031741, WO 2009/32954, WO 2011/32022, WO 2012/154530, and WO 2012/170617.

The antibodies described herein can also be used to target any number of different diagnostic or therapeutic compounds to cells expressing B7H3 on their surface. Thus, an antibody of the present disclosure can be attached directly or via a linker to a drug that is to be delivered directly to cells expressing cell-surface B7H3. This can be done for therapeutic, diagnostic or research purposes. Therapeutic agents include such compounds as nucleic acids, proteins, peptides, amino acids or derivatives, glycoproteins, radioisotopes, photon absorbers, lipids, carbohydrates, or recombinant viruses. Nucleic acid therapeutic and diagnostic moieties include antisense nucleic acids, derivatized oligonucleotides for covalent cross-linking with single or duplex DNA, and triplex forming oligonucleotides.

Alternatively, the molecule linked to an antibody can be an encapsulation system, such as a nanoparticle, liposome or micelle that contains a therapeutic composition such as a drug, a nucleic acid (for example, an antisense nucleic acid), or another therapeutic moiety that is preferably shielded from direct exposure to the circulatory system. Means of preparing liposomes attached to antibodies are well known to those of skill in the art (see, for example, U.S. Pat. No. 4,957,735; Connor et al., *Pharm. Ther.* 28:341-365, 1985).

Antibodies described herein can also be covalently or non-covalently linked to a detectable label. Detectable labels suitable for such use include any composition detectable by spectroscopic, photochemical, biochemical, immunochemical, electrical, optical or chemical means. Useful labels include magnetic beads, fluorescent dyes (for example, fluorescein isothiocyanate, Texas red, rhodamine, green fluorescent protein, and the like), radiolabels (for example, $^3$H, $^{125}$I, $^{35}$S, $^{14}$C, or $^{32}$P), enzymes (such as horseradish peroxidase, alkaline phosphatase and others commonly used in an ELISA), and colorimetric labels such as colloidal gold or colored glass or plastic (such as polystyrene, polypropylene, latex, and the like) beads.

Means of detecting such labels are well known to those of skill in the art. Thus, for example, radiolabels may be detected using photographic film or scintillation counters, fluorescent markers may be detected using a photodetector to detect emitted illumination. Enzymatic labels are typically detected by providing the enzyme with a substrate and detecting the reaction product produced by the action of the enzyme on the substrate, and colorimetric labels are detected by simply visualizing the colored label.

VI. Antibody-Drug Conjugates (ADCs)

ADCs are compounds comprised of a tumor antigen-specific antibody (such as a single-domain antibody or antigen-binding fragment of an immunoglobulin) and a drug, typically a cytotoxic agent, such as an anti-microtubule agent or cross-linking agent. Because ADCs are capable of specifically targeting cancer cells, the drug can be much more potent than agents used for standard chemotherapy. The most common cytotoxic drugs currently used with ADCs have an $IC_{50}$ that is 100- to 1000-fold more potent than conventional chemotherapeutic agents. Common cytotoxic drugs include anti-microtubule agents, such as maytansinoids and auristatins (such as auristatin E and auristatin F). Other cytotoxins for use with ADCs include pyrrolobenzodiazepines (PBDs), which covalently bind the minor groove of DNA to form interstrand crosslinks. In many instances, ADCs comprise a 1:2 to 1:4 ratio of antibody to drug (Bander, *Clinical Advances in Hematology & Oncology* 10(8; suppl 10):3-7, 2012).

The antibody and drug can be linked by a cleavable or non-cleavable linker. However, in some instances, it is desirable to have a linker that is stable in the circulation to prevent systemic release of the cytotoxic drug that could result in significant off-target toxicity. Non-cleavable linkers prevent release of the cytotoxic agent before the ADC is internalized by the target cell. Once in the lysosome, digestion of the antibody by lysosomal proteases results in the release of the cytotoxic agent (Bander, *Clinical Advances in Hematology & Oncology* 10(8; suppl 10):3-7, 2012).

One method for site-specific and stable conjugation of a drug to a monoclonal antibody is via glycan engineering. Monoclonal antibodies have one conserved N-linked oligosaccharide chain at the Asn297 residue in the CH2 domain of each heavy chain (Qasba et al., *Biotechnol Prog* 24:520-526, 2008). Using a mutant β1,4-galactosyltransferase enzyme (Y289L-Gal-T1; U.S. Patent Application Publication Nos. 2007/0258986 and 2006/0084162, herein incorporated by reference), 2-keto-galactose is transferred to free GlcNAc residues on the antibody heavy chain to provide a chemical handle for conjugation.

The oligosaccharide chain attached to monoclonal antibodies can be classified into three groups based on the terminal galactose residues—fully galactosylated (two galactose residues; IgG-G2), one galactose residue (IgG-G1) or completely degalactosylated (IgG-G0). Treatment of a monoclonal antibody with β1,4-galactosidase converts the antibody to the IgG-G0 glycoform. The mutant β1,4-galactosyltransferase enzyme is capable of transferring 2-keto-galactose or 2-azido-galactose from their respective UDP derivatives to the GlcNAc residues on the IgG-G1 and IgG-G0 glycoforms. The chemical handle on the transferred sugar enables conjugation of a variety of molecules to the monoclonal antibody via the glycan residues (Qasba et al., *Biotechnol Prog* 24:520-526, 2008).

Provided herein are ADCs that include a drug (such as a cytotoxic agent) conjugated to a monoclonal antibody that binds (such as specifically binds) B7H3. In some embodiments, the drug is a small molecule. In some examples, the drug is a cross-linking agent, an anti-microtubule agent and/or anti-mitotic agent, or any cytotoxic agent suitable for mediating killing of tumor cells. Exemplary cytotoxic agents include, but are not limited to, a PBD, an auristatin, a maytansinoid, dolastatin, calicheamicin, nemorubicin and its derivatives, PNU-159682, anthracycline, vinca alkaloid, taxane, trichothecene, CC1065, camptothecin, elinafide, a combretastain, a dolastatin, a duocarmycin, an enediyne, a geldanamycin, an indolino-benzodiazepine dimer, a puromycin, a tubulysin, a hemiasterlin, a spliceostatin, or a pladienolide, as well as stereoisomers, isosteres, analogs, and derivatives thereof that have cytotoxic activity.

In some embodiments, the ADC comprises a pyrrolobenzodiazepine (PBD). The natural product anthramycin (a PBD) was first reported in 1965 (Leimgruber et al., *J Am Chem Soc,* 87:5793-5795, 1965; Leimgruber et al., *J Am Chem Soc,* 87:5791-5793, 1965). Since then, a number of PBDs, both naturally-occurring and synthetic analogues, have been reported (Gerratana, *Med Res Rev* 32(2):254-293, 2012; and U.S. Pat. Nos. 6,884,799; 7,049,311; 7,067,511; 7,265,105; 7,511,032; 7,528,126; and 7,557,099). As one example, PBD dimers recognize and bind to specific DNA sequences, and have been shown to be useful as cytotoxic agents. PBD dimers have been conjugated to antibodies and the resulting ADC shown to have anti-cancer properties (see, for example, US 2010/0203007). Exemplary linkage sites on the PBD dimer include the five-membered pyrrolo ring, the tether between the PBD units, and the N10-C11 imine group (see WO 2009/016516; US 2009/304710; US 2010/047257; US 2009/036431; US 2011/0256157; and WO 2011/130598).

In some embodiments, the ADC comprises an antibody conjugated to one or more maytansinoid molecules. Maytansinoids are derivatives of maytansine, and are mitotic inhibitors which act by inhibiting tubulin polymerization. Maytansine was first isolated from the east African shrub *Maytenus serrata* (U.S. Pat. No. 3,896,111). Subsequently, it was discovered that certain microbes also produce maytansinoids, such as maytansinol and C-3 maytansinol esters (U.S. Pat. No. 4,151,042). Synthetic maytansinoids are disclosed, for example, in U.S. Pat. Nos. 4,137,230; 4,248,870; 4,256,746; 4,260,608; 4,265,814; 4,294,757; 4,307,016; 4,308,268; 4,308,269; 4,309,428; 4,313,946; 4,315,929; 4,317,821; 4,322,348; 4,331,598; 4,361,650; 4,364,866; 4,424,219; 4,450,254; 4,362,663; and 4,371,533.

In some embodiments, the ADC includes an antibody conjugated to a dolastatin or auristatin, or an analog or derivative thereof (see U.S. Pat. Nos. 5,635,483; 5,780,588; 5,767,237; and 6,124,431). Auristatins are derivatives of the marine mollusk compound dolastatin-10. Dolastatins and auristatins have been shown to interfere with microtubule dynamics, GTP hydrolysis, and nuclear and cellular division (Woyke et al., *Antimicrob Agents and Chemother* 45(12): 3580-3584, 2001) and have anticancer (U.S. Pat. No. 5,663, 149) and antifungal activity (Pettit et al., *Antimicrob Agents Chemother* 42:2961-2965, 1998). Exemplary dolastatins and auristatins include, but are not limited to, dolastatin 10, auristatin E, auristatin F, auristatin EB (AEB), auristatin EFP (AEFP), MMAD (Monomethyl Auristatin D or monomethyl dolastatin 10), MMAF (Monomethyl Auristatin F or N-methylvaline-valine-dolaisoleuine-dolaproine-phenylalanine), MMAE (Monomethyl Auristatin E or N-methylvaline-valine-dolaisoleuine-dolaproine-norephedrine), 5-benzoylvaleric acid-AE ester (AEVB), and other auristatins (see, for example, U.S. Publication No. 2013/0129753).

In some embodiments, the ADC comprises an antibody conjugated to one or more calicheamicin molecules. The calicheamicin family of antibiotics, and analogues thereof, are capable of producing double-stranded DNA breaks at sub-picomolar concentrations (Hinman et al., *Cancer Res* 53:3336-3342, 1993; Lode et al., *Cancer Res* 58:2925-2928, 1998). Exemplary methods for preparing ADCs with a calicheamicin drug moiety are described in U.S. Pat. Nos. 5,712,374; 5,714,586; 5,739,116; and 5,767,285.

In some embodiments, the ADC comprises an anthracycline. Anthracyclines are antibiotic compounds that exhibit cytotoxic activity. It is believed that anthracyclines can operate to kill cells by a number of different mechanisms, including intercalation of the drug molecules into the DNA of the cell thereby inhibiting DNA-dependent nucleic acid synthesis; inducing production of free radicals which then react with cellular macromolecules to cause damage to the cells; and/or interactions of the drug molecules with the cell membrane. Non-limiting exemplary anthracyclines include doxorubicin, epirubicin, idarubicin, daunomycin, daunorubicin, doxorubicin, epirubicin, nemorubicin, valrubicin and mitoxantrone, and derivatives thereof. For example, PNU-159682 is a potent metabolite (or derivative) of nemorubicin (Quintieri et al., *Clin Cancer Res* 11(4):1608-1617, 2005). Nemorubicin is a semisynthetic analog of doxorubicin with a 2-methoxymorpholino group on the glycoside amino of doxorubicin (Grandi et al., *Cancer Treat Rev* 17:133, 1990; Ripamonti et al., *Br J Cancer* 65:703-707, 1992).

In some embodiments, the ADC can further include a linker. In some examples, the linker is a bifunctional or multifunctional moiety that can be used to link one or more drug moieties to an antibody to form an ADC. In some embodiments, ADCs are prepared using a linker having reactive functionalities for covalently attaching to the drug and to the antibody. For example, a cysteine thiol of an antibody can form a bond with a reactive functional group of a linker or a drug-linker intermediate to make an ADC.

In some examples, a linker has a functionality that is capable of reacting with a free cysteine present on an antibody to form a covalent bond. Exemplary linkers with such reactive functionalities include maleimide, haloacetamides, α-haloacetyl, activated esters such as succinimide esters, 4-nitrophenyl esters, pentafluorophenyl esters, tetrafluorophenyl esters, anhydrides, acid chlorides, sulfonyl chlorides, isocyanates, and isothiocyanates.

In some examples, a linker has a functionality that is capable of reacting with an electrophilic group present on an antibody. Examples of such electrophilic groups include, but are not limited to, aldehyde and ketone carbonyl groups. In some cases, a heteroatom of the reactive functionality of the linker can react with an electrophilic group on an antibody and form a covalent bond to an antibody unit. Non-limiting examples include hydrazide, oxime, amino, hydrazine, thiosemicarbazone, hydrazine carboxylate and arylhydrazide. In some examples, the linker is a cleavable linker, which facilitates release of the drug.

Examples of cleavable linkers include acid-labile linkers (for example, comprising hydrazone), protease-sensitive linkers (for example, peptidase-sensitive), photolabile linkers, and disulfide-containing linkers (Chari et al., *Cancer Res* 52:127-131, 1992; U.S. Pat. No. 5,208,020).

The ADCs disclosed herein can be used for the treatment of a B7H3-positive cancer alone or in combination with another therapeutic agent and/or in combination with any standard therapy for the treatment of cancer (such as surgical resection of the tumor, chemotherapy or radiation therapy).

VII. Multi-Specific Antibodies

Multi-specific antibodies are recombinant proteins comprised of two or more monoclonal antibodies (such as single-domain antibodies) or antigen-binding fragments of two or more different monoclonal antibodies. For example, bispecific antibodies are comprised of antigen-binding fragments of two different monoclonal antibodies. Thus, bispecific antibodies bind two different antigens and trispecific antibodies bind three different antigens. Multi-specific antibodies can be used for cancer immunotherapy by simultaneously targeting, for example, both CTLs (such as a CTL receptor component such as CD3) or effector natural killer (NK) cells, and at least one tumor antigen. The B7H3-specific single-domain monoclonal antibodies disclosed herein can be used to generate multi-specific (such as bispecific or trispecific) antibodies that target both B7H3 and CTLs, or target both B7H3 and NK cells, thereby providing a means to treat B7H3-expressing cancers.

Bi-specific T-cell engagers (BiTEs) are a type of bispecific monoclonal antibody that are fusions of a first monoclonal antibody (such as a scFv or a single-domain antibody) that targets a tumor antigen (such as B7H3) and a second antibody that binds T cells, such as CD3 on T cells. In some embodiments herein, one of the binding moieties of the BiTE is specific for B7H3.

Bi-specific killer cell engagers (BiKEs) are a type of bispecific monoclonal antibody that are fusions of a first monoclonal antibody (such as a scFv or single-domain antibody) that targets a tumor antigen (such as B7H3) and a second scFv that binds a NK cell activating receptor, such as CD16.

Provided herein are multi-specific, such as trispecific or bispecific, monoclonal antibodies comprising a B7H3-specific monoclonal antibody. In some embodiments, the multi-specific monoclonal antibody further comprises a monoclonal antibody that specifically binds a component of the T cell receptor, such as CD3. In other embodiments, the multi-specific monoclonal antibody further comprises a monoclonal antibody that specifically binds a NK cell activating receptor, such as CD16, Ly49, or CD94. Also provided are isolated nucleic acid molecules and vectors encoding the multi-specific antibodies, and host cells comprising the nucleic acid molecules or vectors. Multi-specific antibodies comprising a B7H3-specific antibody can be used for the treatment of cancers that express B7H3. Thus, provided herein are methods of treating a subject with cancer by selecting a subject with a cancer that expresses B7H3, and administering to the subject a therapeutically effective amount of the B7H3-targeting multi-specific antibody.

VIII. Antibody-Nanoparticle Conjugates

The monoclonal antibodies disclosed herein can be conjugated to a variety of different types of nanoparticles to deliver cytotoxic agents or other anti-cancer agents directly to tumor cells via binding of the antibody to B7H3 expressed on the surface of tumor cells. The use of nanoparticles reduces off-target side effects and can also improve drug bioavailability and reduce the dose of a drug required to achieve a therapeutic effect. Nanoparticle formulations can be tailored to suit the drug that is to be carried or encapsulated within the nanoparticle. For example, hydrophobic molecules can be incorporated inside the core of a nanoparticle, while hydrophilic drugs can be carried within an aqueous core protected by a polymeric or lipid shell. Examples of nanoparticles include, but at not limited to, nanospheres, nanocapsules, liposomes, dendrimers, polymeric micelles, niosomes, and polymeric nanoparticles (Fay and Scott, *Immunotherapy* 3(3):381-394, 2011).

Liposomes are common types of nanoparticles used for drug delivery. An antibody conjugated to a liposome is often referred to as an "immunoliposome." The liposomal component of an immunoliposome is typically a lipid vesicle of one or more concentric phospholipid bilayers. In some cases, the phospholipids are composed of a hydrophilic head group and two hydrophobic chains to enable encapsulation of both hydrophobic and hydrophilic drugs. Conventional liposomes are rapidly removed from the circulation via macrophages of the reticuloendothelial system (RES). To generate long-circulating liposomes, the composition, size and charge of the liposome can be modulated. The surface of the liposome may also be modified, such as with a glycolipid or sialic acid. For example, the inclusion of polyethylene glycol (PEG) significantly increases circulation half-life. Liposomes for use as drug delivery agents, including for preparation of immunoliposomes, have been described in the art (see, for example, Paszko and Senge, *Curr Med Chem* 19(31)5239-5277, 2012; Immordino et al., *Int J Nanomedicine* 1(3):297-315, 2006; U.S. Patent Application Publication Nos. 2011/0268655; 2010/00329981).

Niosomes are non-ionic surfactant-based vesicles having a structure similar to liposomes. The membranes of niosomes are composed only of nonionic surfactants, such as polyglyceryl-alkyl ethers or N-palmitoylglucosamine Niosomes range from small, unilamellar to large, multilamellar particles. These nanoparticles are monodisperse, water-soluble, chemically stable, have low toxicity, are biodegradable and non-immunogenic, and increase bioavailability of encapsulated drugs.

Dendrimers include a range of branched polymer complexes. These nanoparticles are water-soluble, biocompatible and are sufficiently non-immunogenic for human use. Generally, dendrimers consist of an initiator core, surrounded by a layer of a selected polymer that is grafted to the core, forming a branched macromolecular complex. Dendrimers are typically produced using polymers such as poly(amidoamine) or poly(L-lysine). Dendrimers have been used for a variety of therapeutic and diagnostic applications, including for the delivery of DNA, RNA, bioimaging contrast agents and chemotherapeutic agents.

Polymeric micelles are composed of aggregates of amphiphilic co-polymers (consisting of both hydrophilic and hydrophobic monomer units) assembled into hydrophobic cores, surrounded by a corona of hydrophilic polymeric chains exposed to the aqueous environment. In many cases, the polymers used to prepare polymeric micelles are heterobifunctional copolymers composed of a hydrophilic block of PEG, poly(vinyl pyrrolidone) and hydrophobic poly(L-lactide) or poly(L-lysine) that forms the particle core. Polymeric micelles can be used to carry drugs that have poor solubility. These nanoparticles have been used to encapsulate a number of anti-cancer drugs, including doxorubicin and camptothecin. Cationic micelles have also been developed to carry DNA or RNA molecules.

Polymeric nanoparticles include both nanospheres and nanocapsules. Nanospheres consist of a solid matrix of polymer, while nanocapsules contain an aqueous core. The formulation selected typically depends on the solubility of the therapeutic agent to be carried/encapsulated; poorly water-soluble drugs are more readily encapsulated within a nanospheres, while water-soluble and labile drugs, such as DNA and proteins, are more readily encapsulated within nanocapsules. The polymers used to produce these nanoparticles include, for example, poly(acrylamide), poly(ester), poly(alkylcyanoacrylates), poly(lactic acid) (PLA), poly (glycolic acids) (PGA), and poly(D,L-lactic-co-glycolic acid) (PLGA).

Antibodies can be conjugated to a suitable nanoparticle according to standard methods known in the art. For example, conjugation can be either covalent or non-covalent. In some embodiments in which the nanoparticle is a liposome, the antibody is attached to a sterically stabilized, long circulation liposome via a PEG chain. Coupling of antibodies or antibody fragments to a liposome can also involve thioester bonds, for example by reaction of thiols and maleimide groups. Cross-linking agents can be used to create sulfhydryl groups for attachment of antibodies to nanoparticles (Paszko and Senge, *Curr Med Chem* 19(31) 5239-5277, 2012).

IX. Compositions and Methods of Use

Compositions are provided that include one or more of the disclosed monoclonal antibodies that bind (for example specifically bind) B7H3 in a carrier. Compositions comprising ADCs, CARs (and CTLs or other cells comprising CARs), multi-specific (such as bispecific or trispecific) antibodies, antibody-nanoparticle conjugates, immunoliposomes and immunoconjugates are also provided. The compositions can be prepared in unit dosage form for administration to a subject. The amount and timing of administration are at the discretion of the treating clinician to achieve the desired outcome. The antibody, ADC, CAR, CAR-expressing cell, multi-specific antibody, antibody-nanoparticle conjugate, immunoliposome or immunoconjugate can be formulated for systemic or local (such as intra-tumor) administration. In one example, the antibody is formulated for parenteral administration, such as intravenous administration.

The compositions for administration can include a solution of the antibody, ADC, CAR, CAR-expressing cell (such as a CTL), multi-specific (such as bispecific or trispecific) antibody, antibody-nanoparticle conjugate, immunoliposome or immunoconjugate in a pharmaceutically acceptable carrier, such as an aqueous carrier. A variety of aqueous carriers can be used, for example, buffered saline and the like. These solutions are sterile and generally free of undesirable matter. These compositions may be sterilized by conventional, well known sterilization techniques. The compositions may contain pharmaceutically acceptable auxiliary substances as required to approximate physiological conditions such as pH adjusting and buffering agents, toxicity adjusting agents and the like, for example, sodium acetate, sodium chloride, potassium chloride, calcium chloride, sodium lactate and the like. The concentration of antibody in these formulations can vary widely, and will be selected primarily based on fluid volumes, viscosities, body weight and the like in accordance with the particular mode of administration selected and the subject's needs.

A typical pharmaceutical composition for intravenous administration includes about 0.1 to 10 mg of antibody (or ADC, CAR, multi-specific antibody, antibody-nanoparticle conjugate, or immunoconjugate) per subject per day. Dosages from 0.1 up to about 100 mg per subject per day may be used, particularly if the agent is administered to a secluded site and not into the circulatory or lymph system, such as into a body cavity or into a lumen of an organ. Actual methods for preparing administrable compositions will be known or apparent to those skilled in the art and are described in more detail in such publications as *Remington: The Science and Practice of Pharmacy*, The University of the Sciences in Philadelphia, Editor, Lippincott, Williams, & Wilkins, Philadelphia, PA, 21$^{st}$ Edition (2005).

The monoclonal antibodies disclosed herein can also be administered by other routes, including via inhalation, oral, topical or intraocular. In some examples, the monoclonal antibody (or conjugate thereof) is administered via fine-needle.

Antibodies (or other therapeutic molecules) may be provided in lyophilized form and rehydrated with sterile water before administration, although they are also provided in sterile solutions of known concentration. The antibody solution is then added to an infusion bag containing 0.9% sodium chloride, USP, and in some cases administered at a dosage of from 0.5 to 15 mg/kg of body weight. Considerable experience is available in the art in the administration of antibody drugs, which have been marketed in the U.S. since the approval of RITUXAN™ in 1997. Antibodies, ADCs, CARs (or CAR-expressing cells), multi-specific (such as bispecific or trispecific) antibodies, antibody-nanoparticle conjugates, immunoliposomes or immunoconjugates can be administered by slow infusion, rather than in an intravenous push or bolus. In one example, a higher loading dose is administered, with subsequent, maintenance doses being administered at a lower level. For example, an initial loading dose of 4 mg/kg may be infused over a period of some 90 minutes, followed by weekly maintenance doses for 4-8 weeks of 2 mg/kg infused over a 30-minute period if the previous dose was well tolerated.

Controlled release parenteral formulations can be made as implants, oily injections, or as particulate systems. For a broad overview of protein delivery systems see, Banga, A. J., *Therapeutic Peptides and Proteins: Formulation, Processing, and Delivery Systems*, Technomic Publishing Company, Inc., Lancaster, PA, (1995). Particulate systems include, for example, microspheres, microparticles, microcapsules, nanocapsules, nanospheres, and nanoparticles. Microcapsules contain the therapeutic protein, such as a cytotoxin or a drug, as a central core. In microspheres the therapeutic is dispersed throughout the particle. Particles, microspheres, and microcapsules smaller than about 1 μm are generally referred to as nanoparticles, nanospheres, and nanocapsules, respectively. Capillaries have a diameter of approximately 5 μm so that only nanoparticles are administered intravenously. Microparticles are typically around 100 μm in diameter and are administered subcutaneously or intramuscularly. See, for example, Kreuter, J., *Colloidal Drug Delivery Systems*, J. Kreuter, ed., Marcel Dekker, Inc., New York, NY, pp. 219-342 (1994); and Tice & Tabibi, *Treatise on Controlled Drug Delivery*, A. Kydonieus, ed., Marcel Dekker, Inc. New York, NY, pp. 315-339, (1992).

Polymers can be used for ion-controlled release of the antibody-based compositions disclosed herein. Various degradable and nondegradable polymeric matrices for use in controlled drug delivery are known in the art (Langer, *Accounts Chem. Res.* 26:537-542, 1993). For example, the block copolymer, polaxamer 407, exists as a viscous yet mobile liquid at low temperatures but forms a semisolid gel at body temperature. It has been shown to be an effective vehicle for formulation and sustained delivery of recombinant interleukin-2 and urease (Johnston et al., *Pharm. Res.* 9:425-434, 1992; and Pec et al., *J. Parent. Sci. Tech.* 44(2):58-65, 1990). Alternatively, hydroxyapatite has been used as a microcarrier for controlled release of proteins (Ijntema et al., *Int. J. Pharm.* 112:215-224, 1994). In yet another aspect, liposomes are used for controlled release as well as drug targeting of the lipid-capsulated drug (Betageri et al., *Liposome Drug Delivery Systems*, Technomic Publishing Co., Inc., Lancaster, PA (1993)). Numerous additional systems for controlled delivery of therapeutic proteins are known (see U.S. Pat. Nos. 5,055,303; 5,188,837; 4,235,871; 4,501,728; 4,837,028; 4,957,735; 5,019,369; 5,055,303; 5,514,670; 5,413,797; 5,268,164; 5,004,697; 4,902,505; 5,506,206; 5,271,961; 5,254,342 and 5,534,496).

A. Therapeutic Methods

The antibodies, compositions, CARs (and cells, such as CTLs, expressing CARs), ADCs, multi-specific (such as bispecific or trispecific) antibodies, antibody-nanoparticle conjugates, immunoliposomes and immunoconjugates disclosed herein can be administered to slow or inhibit the growth of tumor cells or inhibit the metastasis of tumor cells, such as B7H3-positive solid tumor. In these applications, a therapeutically effective amount of a composition is administered to a subject in an amount sufficient to inhibit growth, replication or metastasis of cancer cells, or to inhibit a sign or a symptom of the cancer. Suitable subjects may include those diagnosed with a solid tumor that expresses B7H3, such as, but not limited to a liver cancer (such as hepatocellular carcinoma), a pancreatic cancer, a kidney cancer, a bladder cancer, a cervical cancer, an esophageal cancer, a prostate cancer, a breast cancer, an ovarian cancer, a colon cancer, a lung cancer, a brain cancer (such as neuroblastoma or glioblastoma), a pediatric cancer (such as osteosarcoma, neuroblastoma, rhabdomyosarcoma or Ewing's sarcoma), melanoma or mesothelioma.

Provided herein is a method of treating a B7H3-positive cancer in a subject by administering to the subject a therapeutically effective amount of a B7H3-specific antibody, immunoconjugate, CAR (or cell expressing a CAR), ADC, multi-specific (such as bispecific or trispecific) antibody, antibody-nanoparticle conjugate, immunoliposome or composition disclosed herein. Also provided herein is a method of inhibiting tumor growth or metastasis of a B7H3-positive cancer in a subject by administering to the subject a therapeutically effective amount of a B7H3-specific antibody, immunoconjugate, CAR (such as a cell expressing a CAR), ADC, multi-specific (such as bispecific or trispecific) antibody, antibody-nanoparticle conjugate, immunoliposome or composition disclosed herein. In some embodiments, the B7H3-positive cancer is a liver cancer (such as hepatocellular carcinoma), a pancreatic cancer, a kidney cancer, a bladder cancer, a cervical cancer, an esophageal cancer, a prostate cancer, a breast cancer, an ovarian cancer, a colon cancer, a lung cancer, a brain cancer (such as neuroblastoma or glioblastoma), a pediatric cancer (such as osteosarcoma, neuroblastoma, rhabdomyosarcoma or Ewing's sarcoma), melanoma or mesothelioma.

A therapeutically effective amount of a B7H3-specific monoclonal antibody, ADC, CAR (for example a CTL expressing a CAR), multi-specific (such as bispecific or trispecific) antibody, immunoconjugate, immunoliposome or composition disclosed herein will depend upon the severity of the disease, the type of disease, and the general state of the patient's health. A therapeutically effective amount of the antibody-based composition is that which provides either subjective relief of a symptom(s) or an objectively identifiable improvement as noted by the clinician or other qualified observer.

In one example, a B7H3-specific antibody provided herein is conjugated to IR700, and photoimmunotherapy is used to treat the B7H3-positive cancer. For example, such a method can include administering to the subject with a B7H3-positive cancer a therapeutically effective amount of one or more B7H3-specific antibody-IR700 conjugates, wherein the B7H3-specific antibody specifically binds to B7H3 on the cancer cell. Following administration of the conjugate, the cancer is irradiated at a wavelength of 660 to 740 nm (such as 660 to 710 nm, for example, 680 nm) and at a dose of at least 1 J cm$^{-2}$, thereby treating the B7H3-positive cancer in the subject. In some examples, the B7H3-positive cancer is irradiated at a wavelength of 660 to 740 nm (such as 660 to 710 nm, for example, 680 nm) at a dose of at least 1 J cm$^{-2}$ (such as at least 1 J cm$^2$, at least 4 J cm$^{-2}$, at least 10 J $_{cm}$$^{-2}$, at least 50 J cm$^{-2}$, or at least 100 J cm$^2$) thereby treating the tumor in the subject. In some examples, multiple rounds of treatment are performed, such as 2, 3, 4, 5, 6, 7, 8, 9 or 10 treatment cycles. In particular examples, a therapeutically effective dose of a B7H3-specific antibody-IR700 conjugates is at least 0.5 milligram per 60 kilogram (mg/kg), at least 5 mg/60 kg, at least 10 mg/60 kg, at least 20 mg/60 kg, at least 30 mg/60 kg, at least 50 mg/60 kg, for example 0.5 to 50 mg/60 kg, such as a dose of 1 mg/60 kg, 2 mg/60 kg, 5 mg/60 kg, 20 mg/60 kg, or 50 mg/60 kg, for example when administered iv. In another example, a therapeutically effective dose of a B7H3-specific antibody-IR700 conjugates is at least 10 µg/kg, such as at least 100 µg/kg, at least 500 µg/kg, or at least 500 µg/kg, for example 10 µg/kg to 1000 µg/kg, such as a dose of 100 µg/kg, 250 µg/kg, about 500 µg/kg, 750 µg/kg, or 1000 µg/kg, for example when administered intratumorally or i.p. In one example, a therapeutically effective dose of B7H3-specific antibody-IR700 conjugates is at least 1 µg/ml, such as at least 500 µg/ml, such as between 20 µg/m1 to 100 µg/ml, such as 10 µg/ml, 20 µg/ml, 30 µg/ml, 40 µg/ml, 50 µg/ml, 60 µg/ml, 70 µg/ml, 80 µg/ml, 90 µg/ml or 100 µg/ml administered in topical solution.

Administration of the B7H3-specific antibodies, ADCs, CARs (or CAR-expressing cell), immunoconjugates, multi-specific antibodies, antibody-nanoparticle conjugates, immunoliposomes and compositions disclosed herein can also be accompanied by administration of other anti-cancer agents or therapeutic treatments (such as surgical resection of a tumor). Any suitable anti-cancer agent can be administered in combination with the antibodies, compositions and immunoconjugates disclosed herein. Exemplary anti-cancer agents include, but are not limited to, chemotherapeutic agents, such as, for example, mitotic inhibitors, alkylating agents, anti-metabolites, intercalating antibiotics, growth factor inhibitors, cell cycle inhibitors, enzymes, topoisomerase inhibitors, anti-survival agents, biological response modifiers, anti-hormones (e.g. anti-androgens) and anti-angiogenesis agents. Other anti-cancer treatments include radiation therapy and other antibodies that specifically target cancer cells (e.g., a biologic).

Non-limiting examples of alkylating agents include nitrogen mustards (such as mechlorethamine, cyclophosphamide, melphalan, uracil mustard or chlorambucil), alkyl sulfonates (such as busulfan), nitrosoureas (such as carmustine, lomustine, semustine, streptozocin, or dacarbazine).

Non-limiting examples of antimetabolites include folic acid analogs (such as methotrexate), pyrimidine analogs (such as 5-FU or cytarabine), and purine analogs, such as mercaptopurine or thioguanine.

Non-limiting examples of natural products include vinca alkaloids (such as vinblastine, vincristine, or vindesine), epipodophyllotoxins (such as etoposide or teniposide), antibiotics (such as dactinomycin, daunorubicin, doxorubicin, bleomycin, plicamycin, or mitomycin C), and enzymes (such as L-asparaginase).

Non-limiting examples of miscellaneous agents include platinum coordination complexes (such as cis-diamine-dichloroplatinum II also known as cisplatin), substituted ureas (such as hydroxyurea), methyl hydrazine derivatives (such as procarbazine), and adrenocrotical suppressants (such as mitotane and aminoglutethimide).

Non-limiting examples of hormones and antagonists include adrenocorticosteroids (such as prednisone), progestins (such as hydroxyprogesterone caproate, medroxyprogesterone acetate, and magestrol acetate), estrogens (such as diethylstilbestrol and ethinyl estradiol), antiestrogens (such as tamoxifen), and androgens (such as testerone proprionate and fluoxymesterone). Examples of the most commonly used chemotherapy drugs include Adriamycin, Alkeran, Ara-C, BiCNU, Busulfan, CCNU, Carboplatinum, Cisplatinum, Cytoxan, Daunorubicin, DTIC, 5-FU, Fludarabine, Hydrea, Idarubicin, Ifosfamide, Methotrexate, Mithramycin, Mitomycin, Mitoxantrone, Nitrogen Mustard, Taxol (or other taxanes, such as docetaxel), Velban, Vincristine, VP-16, while some more newer drugs include Gemcitabine (Gemzar), Herceptin, Irinotecan (Camptosar, CPT-11), Leustatin, Navelbine, Rituxan STI-571, Taxotere, Topotecan (Hycamtin), Xeloda (Capecitabine), Zevelin and calcitriol.

Non-limiting examples of immunomodulators that can be used include AS-101 (Wyeth-Ayerst Labs.), bropirimine (Upjohn), gamma interferon (Genentech), GM-CSF (granulocyte macrophage colony stimulating factor; Genetics Institute), IL-2 (Cetus or Hoffman-LaRoche), human immune globulin (Cutter Biological), IMREG (from Imreg of New Orleans, La.), SK&F 106528, and TNF (tumor necrosis factor; Genentech).

Non-limiting examples of biologics that can be used in combination with the disclosed B7H3-specific antibodies, ADCs, CARs (or CAR-expressing cell), immunoconjugates, multi-specific antibodies, antibody-nanoparticle conjugates, immunoliposomes include therapeutic monoclonal antibodies, for example, one or more of 3F8, Abagovomab, Adecatumumab, Afutuzumab, Alacizumab , Alemtuzumab, Altumomab pentetate, Anatumomab mafenatox, Apolizumab, Arcitumomab, Bavituximab, Bectumomab, Belimumab, Besilesomab, Bevacizumab, Bivatuzumab mertansine, Blinatumomab, Brentuximab vedotin, Cantuzumab mertansine, Capromab pendetide, Catumaxomab, CC49, Cetuximab, Citatuzumab bogatox, Cixutumumab, Clivatuzumab tetraxetan, Conatumumab, Dacetuzumab, Detumomab, Ecromeximab, Eculizumab, Edrecolomab, Epratuzumab, Ertumaxomab, Etaracizumab, Farletuzumab, Figitumumab, Galiximab, Gemtuzumab ozogamicin, Girentuximab, Glembatumumab vedotin, Ibritumomab tiuxetan, Igovomab, Imciromab, Intetumumab, Inotuzumab ozogamicin, Ipilimumab, Iratumumab, Labetuzumab, Lexatumumab, Lintuzumab, Lorvotuzumab mertansine, Lucatumumab, Lumiliximab, Mapatumumab, Matuzumab, Mepolizumab, Metelimumab, Milatuzumab, Mitumomab, Morolimumab, Nacolomab tafenatox, Naptumomab estafenatox, Necitumumab, Nimotuzumab, Nofetumomab merpentan, Ofatumumab, Olaratumab, Oportuzumab monatox, Oregovomab, Panitumumab, Pemtumomab, Pertuzumab, Pintumomab, Pritumumab, Ramucirumab, Rilotumumab, Rituximab, Robatumumab, Satumomab pendetide, Sibrotuzumab, Sonepcizumab, Tacatuzumab tetraxetan, Taplitumomab paptox, Tenatumomab, TGN1412, Ticilimumab (tremelimumab), Tigatuzumab, TNX-650, Trastuzumab, Tremelimumab, Tucotuzumab celmoleukin, Veltuzumab, Volociximab, Votumumab, and Zalutumumab. In some examples, the therapeutic antibody specifically binds and antagonizes PD-1 or PD-L1, such as one or more of Atezolizumab, MPDL3280A, BNS-936558 (Nivolumab), Pembrolizumab, Pidilizumab, CT011, AMP-224, AMP-514, MEDI-0680, BMS-936559, BMS935559, MEDI-4736, MPDL-3280A, MSB-0010718C, MGA-271, Indoximod, Epacadostat, BMS-986016, MEDI-4736, MEDI-4737, MK-4166, BMS-663513, PF-05082566 (PF-2566), Lirilumab, and Durvalumab.

In some examples, the additional therapeutic agent administered is a T cell agonist, such as an agonist of 4-1BB (CD137), OX40, and/or GITR. In one example, the additional therapeutic agent administered is an OX40 agonist, such as an antibody, such as a monoclonal antibody (mAb) (e.g., PF-04518600, MEDI-6469, MEDI-0562, MEDI-6383, MOXR-0916, BMS 986178, or GSK3174998). In some examples, the additional therapeutic agent administered is a 4-1BB agonist, such as a 4-1BB agonist antibody, such as a mAb. Specific agonist mAbs that can be used with the disclosed methods include PF-05082566 (utomilumab), and BMS-663513 (Urelumab). In one example, a 4-1BB agonist is a 4-1BB ligand (4-1BBL), such as a natural 4-1BBL (such as the human 4-1IBBL) or a streptavidinated 4-1BBL (SA-4-1BBL) complex. In some examples, the additional therapeutic agent administered is a GITR (glucocorticoid-induced tumor necrosis factor (TNF) receptor, or TNFRSF18) agonist, such as a GITR agonist antibody, such as a mAb. Specific GITR agonist mAbs that can be used with the disclosed methods include DTA-1, TRX518, MK-4166, MK-1248, AMG 228, INCAGN01876, GWN323 (from Novartis), CK-302 (from Checkpoint Therapeutics) and BMS-986156. In one example, a GITR agonist is a GITR ligand (GITRL), such as a natural GITRL or a multivalent GITR ligand fusion protein. In one example, the GITR agonist is MEDI1873, a hexameric GITRL molecule with a human IgG1 Fc domain. In some examples, the additional therapeutic agent administered is an immunotherapy. Non-limiting examples of immunomodulators that can be used include AS-101 (Wyeth-Ayerst Labs.), bropirimine (Upjohn), gamma interferon (Genentech), GM-CSF (granulocyte macrophage colony stimulating factor; Genetics Institute), IL-2 (Cetus or Hoffman-LaRoche), human immune globulin (Cutter Biological), IMREG (from Imreg of New Orleans, La.), SK&F 106528, and TNF (tumor necrosis factor; Genentech).

In one example the additional therapy is surgical treatment, for example surgical resection of the cancer or a portion of it. Another example of a treatment is radiotherapy, for example administration of radioactive material or energy (such as external beam therapy) to the tumor site to help eradicate the tumor or shrink it prior to surgical resection.

B. Methods for Diagnosis and Detection

Methods are provided herein for detecting B7H3 protein in vitro or in vivo. For example, the disclosed monoclonal antibodies can be used for in vivo tumor imaging. To use the disclosed antibodies as diagnostic reagents in vivo, the antibodies are labelled with a detectable moiety, such as a radioisotope, fluorescent label, or positron emitting radionuclides. As one example, the monoclonal antibodies disclosed herein can be conjugated to a positron emitting radionuclide for use in positron emission tomography (PET); this diagnostic process is often referred to as immunoPET. While full length antibodies can make good immunoPET agents, their biological half-life necessitates waiting several days prior to imaging, which increases associated non-target radiation doses. Smaller, single domain antibodies/nanobodies have biological half-lives amenable to same day imaging.

In other instances, B7H3 expression is detected in a biological sample. The sample can be any sample, including, but not limited to, tissue from biopsies, autopsies and pathology specimens. Biological samples also include sections of tissues, for example, frozen sections taken for histological purposes. Biological samples further include body fluids, such as blood, serum, plasma, sputum, spinal fluid or urine. In some examples, the sample is a serum sample containing exosomes. A biological sample is typically obtained from a mammal, such as a human or non-human primate.

Provided herein is a method of determining if a subject has a B7H3-positive cancer by contacting a sample from the subject with a B7H3-specific monoclonal antibody disclosed herein; and detecting binding of the antibody to the sample. An increase in binding of the antibody to the sample as compared to binding of the antibody to a control sample identifies the subject as having a B7H3-positive cancer.

In another embodiment, provided is a method of confirming a diagnosis of a B7H3-positive cancer in a subject by contacting a sample from a subject diagnosed with a B7H3-positive cancer with a B7H3-specific monoclonal antibody disclosed herein; and detecting binding of the antibody to the sample. An increase in binding of the antibody to the sample as compared to binding of the antibody to a control sample confirms the diagnosis of a B7H3-positive cancer in the subject.

In some examples of the disclosed methods, the monoclonal antibody is directly labeled.

In other examples, the methods further include contacting a second antibody (a detection antibody) that specifically binds the monoclonal antibody with the sample; and detecting the binding of the second antibody. An increase in binding of the second antibody to the sample as compared to binding of the second antibody to a control sample detects a B7H3-positive cancer in the subject or confirms the diagnosis of a B7H3-positive cancer in the subject.

In some cases, the cancer is a liver cancer (such as hepatocellular carcinoma), a pancreatic cancer, a kidney cancer, a bladder cancer, a cervical cancer, an esophageal cancer, a prostate cancer, a breast cancer, an ovarian cancer, a colon cancer, a lung cancer, a brain cancer (such as neuroblastoma or glioblastoma), a pediatric cancer (such as osteosarcoma, neuroblastoma, rhabdomyosarcoma or Ewing's sarcoma), melanoma or mesothelioma.

In some examples, the control sample is a sample from a subject without cancer. In particular examples, the sample is a blood or tissue sample.

In some embodiments of the methods of diagnosis and detection, the antibody that binds (for example specifically binds) B7H3 is directly labeled with a detectable label. In another embodiment, the antibody that binds (for example, specifically binds) B7H3 (the first antibody) is unlabeled and a second antibody or other molecule that can bind the antibody that specifically binds B7H3 is labeled. As is well known to one of skill in the art, a second antibody is chosen that is able to specifically bind the specific species and class of the first antibody. For example, if the first antibody is a human IgG, then the secondary antibody may be an anti-human-IgG. Other molecules that can bind to antibodies include, without limitation, Protein A and Protein G, both of which are available commercially.

Suitable labels for the antibody or secondary antibody include various enzymes, prosthetic groups, fluorescent materials, luminescent materials, magnetic agents and radioactive materials. Non-limiting examples of suitable enzymes include horseradish peroxidase, alkaline phosphatase, beta-galactosidase, or acetylcholinesterase. Non-limiting examples of suitable prosthetic group complexes include streptavidin/biotin and avidin/biotin. Non-limiting examples of suitable fluorescent materials include umbelliferone, fluorescein, fluorescein isothiocyanate, rhodamine, dichlorotriazinylamine fluorescein, dansyl chloride or phycoerythrin. A non-limiting exemplary luminescent material is luminol; a non-limiting exemplary a magnetic agent is gadolinium, and non-limiting exemplary radioactive labels include $^{125}$I, $^{131}$I, $^{35}$S or $^3$H.

In an alternative embodiment, B7H3 can be assayed in a biological sample by a competition immunoassay utilizing B7H3 protein standards labeled with a detectable substance and an unlabeled antibody that specifically binds B7H3. In this assay, the biological sample, the labeled B7H3 protein standards and the antibody that specifically bind B7H3 are combined and the amount of labeled B7H3 protein standard bound to the unlabeled antibody is determined. The amount of B7H3 in the biological sample is inversely proportional to the amount of labeled B7H3 protein standard bound to the antibody that specifically binds B7H3.

The immunoassays and methods disclosed herein can be used for a number of purposes. In one embodiment, the antibody that specifically binds may be used to detect the production of B7H3 in cells in cell culture. In another embodiment, the antibody can be used to detect the amount of B7H3 in a biological sample, such as a tissue sample, or a blood or serum sample. In some examples, the B7H3 is cell-surface B7H3. In other examples, the B7H3 protein is soluble (for example, in a cell culture supernatant or in a body fluid sample, such as a blood or serum sample).

In one embodiment, a kit is provided for detecting B7H3 in a biological sample, such as a blood sample or tissue sample. For example, to confirm a cancer diagnosis in a subject, a biopsy can be performed to obtain a tissue sample for histological examination. Kits for detecting a polypeptide will typically comprise a monoclonal antibody that specifically binds B7H3, such as any of the monoclonal antibodies disclosed herein. In a further embodiment, the antibody is labeled (for example, with a fluorescent, radioactive, or an enzymatic label).

In one embodiment, a kit includes instructional materials disclosing means of use of an antibody that binds B7H3. The instructional materials may be written, in an electronic form (such as a computer diskette or compact disk) or may be visual (such as video files). The kits may also include additional components to facilitate the particular application for which the kit is designed. Thus, for example, the kit may additionally contain means of detecting a label (such as enzyme substrates for enzymatic labels, filter sets to detect fluorescent labels, appropriate secondary labels such as a secondary antibody, or the like). The kits may additionally include buffers and other reagents routinely used for the practice of a particular method. Such kits and appropriate contents are well known to those of skill in the art.

In one embodiment, the diagnostic kit comprises an immunoassay. Although the details of the immunoassays may vary with the particular format employed, the method of detecting B7H3 in a biological sample generally includes the steps of contacting the biological sample with an antibody which specifically reacts, under immunologically reactive conditions, to B7H3. The antibody is allowed to specifically bind under immunologically reactive conditions to form an immune complex, and the presence of the immune complex (bound antibody) is detected directly or indirectly.

The antibodies disclosed herein can also be utilized in immunoassays, such as, but not limited to radioimmunoassays (RIAs), ELISA, or immunohistochemical assays. The antibodies can also be used for fluorescence activated cell sorting (FACS). FACS employs a plurality of color channels, low angle and obtuse light-scattering detection channels, and impedance channels, among other more sophisticated levels of detection, to separate or sort cells (see U.S. Pat. No. 5,061,620). Any of the monoclonal antibodies that bind B7H3, as disclosed herein, can be used in these assays. Thus, the antibodies can be used in a conventional immunoassay, including, without limitation, an ELISA, an RIA, FACS, tissue immunohistochemistry, Western blot or immunoprecipitation.

The following examples are provided to illustrate certain particular features and/or embodiments. These examples should not be construed to limit the disclosure to the particular features or embodiments described.

EXAMPLES

Example 1

Materials and Methods

This example describes the materials and experimental procedures used for the studies described in Example 2.

Cell Lines

Eight carcinoma cell lines (Hep3B, HepG2, IMR32, MC38-B7H3+, A431, IMR32-B7H3 KO, and MC38-B7H3 KO) were cultured in DMEM medium (Invitrogen, Carlsbad, CA) supplemented with 10% fetal bovine serum (HyClone, Logan, UT), 1% L-glutamine, and 1% penicillin-streptomycin (Invitrogen) and incubated in 5% $CO_2$ with a balance of air at 37° C. Neuroblastoma cell line NBEB was cultured in RPMI-1640 medium with the same supplement as DMEM. The media were refreshed twice a week.

Protein Expression and Purification

The extracellular domain of B7H3 (GenBank accession number NP_001019907, amino acids 29-466; SEQ ID NO: 13) was fused with hFc tag. The B7H3-hFc was expressed in 293F cells. An hFc tag control, IAB-hFc (Kaneko et al., *J Biol Chem*, 284, 3739-3749, 2009), was produced in the same way. Protein purification was accomplished using a protein A column (GE Healthcare). Rabbit VH domain antibodies were expressed in *E. coli* in a VH-His-FLAG fusion manner The 6× His tag was used for Nickel column (GE Healthcare) affinity purification, and the FLAG tag was used in protein binding assay by ELISA and cell binding assay by flow cytometry.

DNA Oligos and Construction of the Rabbit VH Phage Library

To amplify the rabbit VH cDNA fragment, forward and reverse primers that anneal to the 5' and 3' ends of VH cDNA were synthesized according to the literature (Peng et al., *J Mol Biol*, 429, 2954-2973, 2017). The primers are listed in Table 1, with the underlined nucleotides corresponding to the SfiI restriction enzyme site.

TABLE 1

Primers for construction of the rabbit VH phage library

| Primer | Sequence | SEQ ID NO: |
|---|---|---|
| VH-F1 | gaggagttGGCCCAGGCGGCCCAGTCGGTGGAGGAGTCCRGG | 14 |
| VH-F2 | gaggagttGGCCCAGGCGGCCCAGTCAGTGAAGGAGTCCGAG | 15 |
| VH-F3 | gaggagttGGCCCAGGCGGCCCAGTCGYTGGAGGAGTCCGGG | 16 |
| VH-F4 | gaggagttGGCCCAGGCGGCCCAGGAGCAGCTGGAGGAGTCCGGG | 17 |
| VH-F5 | gaggagttGGCCCAGGCGGCCCAGGAGCAGCTGAAGGAGTCCGG | 18 |
| VH-F6 | gaggagttGGCCCAGGCGGCCCAGRAGCAGCTGGTGGAGTCCGG | 19 |
| VH-F7 | gaggagttGGCCCAGGCGGCCCAGGAGCAGCAGAAGGAGTCCGGG | 20 |
| VH-F8 | gaggagttGGCCCAGGCGGCCCAGTCGCTGGAGGAGTCCAGG | 21 |
| VH-F9 | gaggagttGGCCCAGGCGGCCCAGTCGCTGGGGGAGTCCAGG | 22 |
| VH-F10 | gaggagttGGCCCAGGCGGCCCAGACAGTGAAGGAGTCCGAG | 23 |
| VH-F11 | gaggagttGGCCCAGGCGGCCCAGTCGCTGGAGGAATTCGGG | 24 |
| VH-R1 | gaggagttTGGCCGGCCTGGCCTGARGAGAYGGTGACCAGGGTGCC | 25 |
| VH-R2 | gaggagttTGGCCGGCCTGGCCTGAAGAGACGGTGACGAGGGTCCC | 26 |

Rabbit VH cDNA were synthesized from the total RNA isolated from immunized spleen using Invitrogen™ SuperScript™ IV First-Strand Synthesis kit according to the manufacturer's instruction (ThermoFisher, Cat. #18091050). Each forward primer was paired with one of the two reverse primers (R1 or R2), and 22 combinations of forward/reverse primers were used to amplify the VH cDNA fragments. The PCR products were gel-purified and digested with restriction enzyme SfiI (NEB, Cat. #R0123S), followed by ligation with pComb3x plasmid that had been pre-digested with the same enzyme. Ten micrograms of the ligation products were used to transform 0.6 ml of E. coli TG1 competent cells (Lucigen, Cat. #60502-2) by electroporation according to the manufacturer's instruction. The transformed TG1 cells were recovered for 45 minutes at 37° C., shaking at 150 rpm, then inoculated into 1L of 2×YT media and cultured for one additional hour at 37° C., shaking at 250 rpm. Thereafter, $1 \times 10^{10}$ helper phage M13K07 (NEB, Cat. #N0315S) were added to the cell culture, and incubation continued at 37° C. for 4 hours. The cell culture was centrifuged at 3300 g for 30 minutes to pellet the cell debris, and the supernatant that contained the phage particles was collected and mixed with 3/10 volume of PEG 8000/NaCl solution (20% PEG in 2.5 M NaCl solution, autoclaved before using). The phage/PEG solution mixture was incubated on ice for 4 hours and centrifuged at 3300 g for 30 minutes. The final phage pellet was resuspended in 100 ml of PBS buffer containing 20% glycerol, aliquoted in 1 ml volume size and stored at −80° C.

Phage Panning Method

Phage panning was carried out using immobilized B7H3-hFc protein. To exclude hFc tag binders, IAB-hFc control was also immobilized in parallel. ELISA plates (96-well) were coated with B7H3-hFc and IAB-hFc proteins (100 µg/mL in PBS), 50 µl/well, and incubated at 37° C. for 1 hour. After dumping the coated protein solution, the plate and phage solution were pre-blocked by mixing with PBS buffer containing 2% BSA, and incubated at 37° C. for 30 minutes. After dumping the blocking buffer, pre-blocked phage solution was added to the IAB-hFc plate to deplete hFc binders by incubating at 37° C. for 1 hour. Thereafter, the unbound phage solution was transferred to the B7H3-hFc plate and incubated at 37° C. for 1 hour. B7H3 specific phage binders were eluted from the plate by incubating with pH 2.0 citric acid buffer and were immediately neutralized with pH 8.0 Tris-HCl buffer. The eluted output phage was re-amplified by re-infection of fresh TG1 cells, and the re-amplified phage was used as the input for the next round of panning After three rounds of panning, single colonies were randomly picked from the output phage infected TG1 cells and monoclonal phage ELISA was conducted to identify B7H3 specific binders.

Phage ELISA

An ELISA plate (96-well) was coated with B7H3-hFc and IAB-hFc tag control. After blocking with PBS buffer containing 2% BSA, fifty microliters of pre-blocked phage solution was added to the plate and incubated at 37° C. for 30 minutes. After the plate was washed twice with PBS buffer containing 0.05% Tween20, phage binding was detected by HRP-conjugated anti-M13 antibody (Sinobiological, Cat.#11973-MM05T-H).

For antibody binding ELISA, different concentrations of antibody (1:2 serial dilutions starting from 100 µg/mL) were incubated on the B7H3-hFc coated plate as mentioned above, and antibody binding was detected by HRP-conjugated anti-FLAG mouse monoclonal antibody M2 (Sigma, Cat. #A8592).

Flow Cytometry Method

Cells were harvested by detaching with trypsin-EDTA (ThermoFisher, Cat. #25200114), centrifuged to form pellet, and resuspended in ice-cold PBS. One million cells per ml were incubated with 10 µg/mL of B7H3 domain antibodies. Antibody binding was detected by APC-conjugated anti-FLAG mouse monoclonal antibody (Biolegend, Cat. 637308). The fluorescence associated with the live cells was measured using a FACS Calibur (BD Biosciences, Franklin Lakes, NJ).

Statistical Analysis

All statistical analyses were conducted using GraphPad Prism (GraphPad Software, Inc., La Jolla, CA).

Example 2: Generation of Rabbit Nanobodies to B7H3 via Protein Immunization and Phage Display This example describes the selection and characterization of two B7H3-specific rabbit single-domain VH monoclonal antibodies.

Preparation of Recombinant B7H3 Protein

Figure 1B:
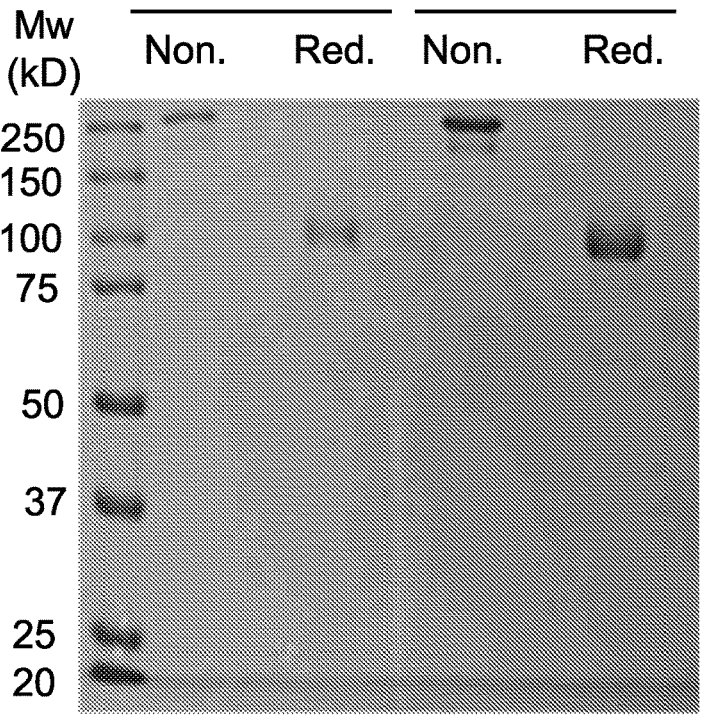
FIG. 1B: SDS-PAGE analysis of purified B7H3-hFc. One or five micrograms of purified B7H3-hFc, non-reduced (Non.) or reduced (Red.) by beta-mercaptoethanol, were separated on an 8% SDS-PAGE gel. Protein bands were visualized by Coomassie blue R-250 staining.

The extracellular domain (ECD) of B7H3 (NP_001019907, amino acid 29-466; SEQ ID NO: 13) was fused with human IgG1 Fc, and expressed in HEK293 cells in a secretory manner After being purified on a protein A column, and the purity was checked by running on SDS-PAGE (FIG. 1). The theoretical size of the reduced B7H3-hFc is about 75 kD, with apparent migration position of about 100 kD on the gel, probably due to glycosylation since B7H3 has six N-glycosylation sites. The transient expression level of B7H3-hFc is extremely low, about 0.5 mg/L.

Immunization of Rabbits with Recombinant B7H3-hFc

Figure 2A:
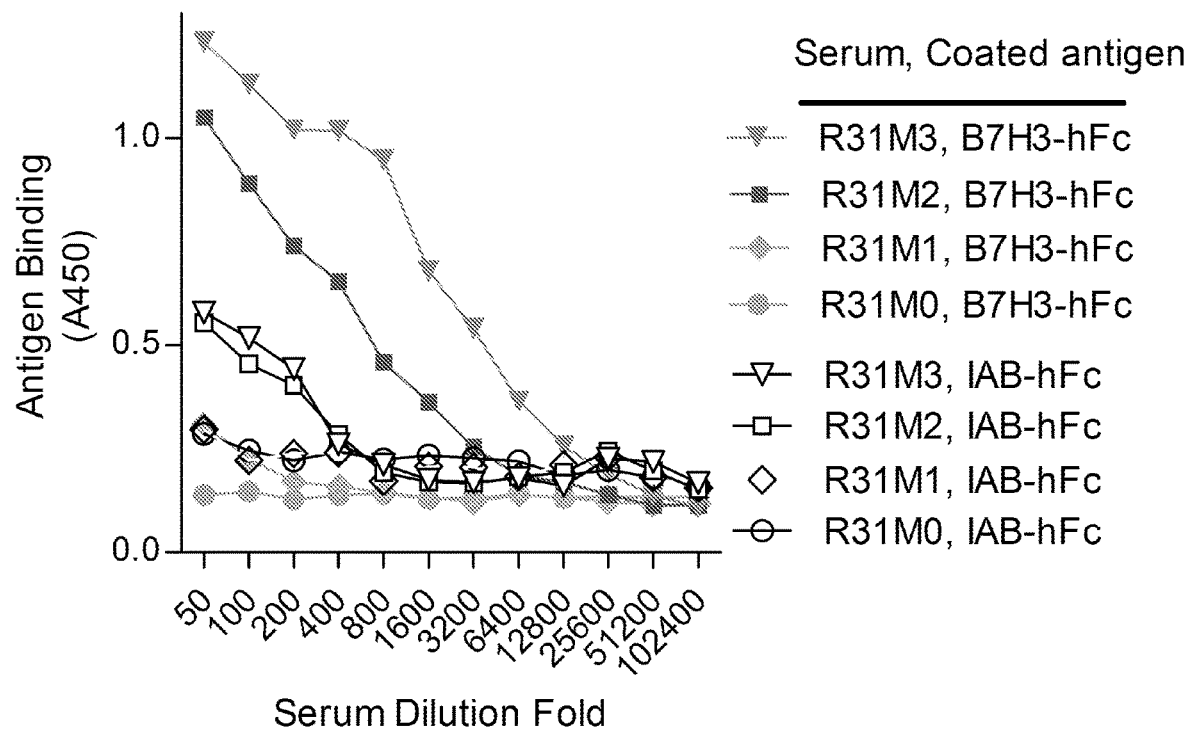
FIGS. 2A-2B: Titering of B7H3-hFc immunized rabbit sera and confirmation of its cell binding.
Figure 2B:
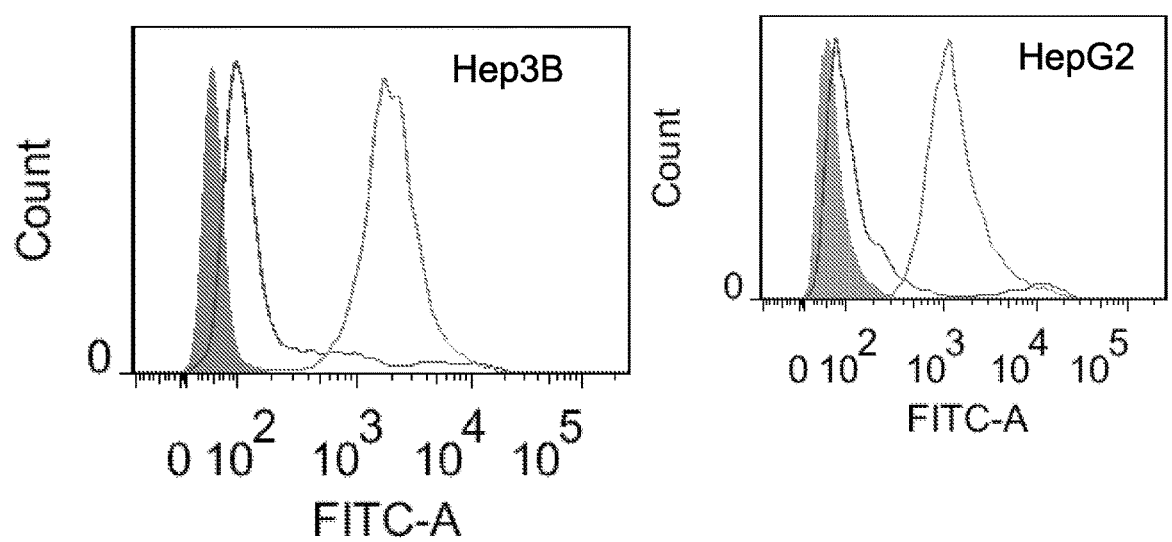

One hundred micrograms of B7H3-hFc in PBS buffer was mixed with equal volume of Freund's adjuvant, and injected intramuscularly into female New Zealand White rabbits. After three immunizations with an interval of 14 days, the titer of anti-B7H3-hFc was measured by ELISA, using IAB-hFc as hFc control (FIG. 2A). IAB is a fragment of mesothelin (Q13421, amino acid 296-359) (Kaneko et al., *J Biol Chem*, 284, 3739-3749, 2009). The serum of the second (M2) and third (M3) immunization clearly showed increased binding to B7H3-hFc compared to IAB-hFc tag control. Cell binding activity of the polyclonal serum was checked by flowcytometry (FIG. 2B). The polyclonal serum of the final immunization showed clear cell binding to hepatocellular carcinoma cell lines Hep3B and HepG2, which are B7H3 positive (Wang et al., *Cancer Invest*, 32, 262-271, 2014; Qiu et al., *Clin Chim Acta*, 485, 103-105, 2018), while the serum of the pre-immunization had extremely low background binding. The results of both ELISA and flow cytometry indicated that B7H3 had good immunogenicity in rabbit even though this protein is highly conservative, especially between human and rabbit.

Screening of B7H3 Specific Binders

After confirmation of the successful immunization, the spleens of the immunized rabbits were harvested, and the VH gene fragments were cloned using degenerate primers (Peng et al., *J Mol Biol*, 429, 2954-2973, 2017), followed by ligation with phage display vector pComb3x. Ten micrograms of the ligations were used to transform TG1 competent cells by electroporation, and a VH library was made with a size of $7 \times 10^9$ individual clones. Both the library phage production and the following antigen panning were carried out at 37° C.

The panning was performed on immobilized B7H3-hFc. Both B7-H6-hFc and IAB-hFc were coated on the 96-well ELISA plate, and B7H3 specific phage particles were enriched by being pre-absorbed on IAB-hFc coated plate and then captured on B7H3-hFc coated plate. After three rounds of panning, monoclonal phage ELISA was performed to identify B7H3 specific binders. Of the 96 randomly picked clones, 41 were B7H3 specific binders, and sequencing analysis identified two representative binders, named RFA1 and RFB1 (FIG. 3A). These two binders shared very similar germline sequences that were also similar with a VH from rabbit anti-hypusine mAb (deposited in GenBank structure database, PDB#5DUB).

Figure 3B:
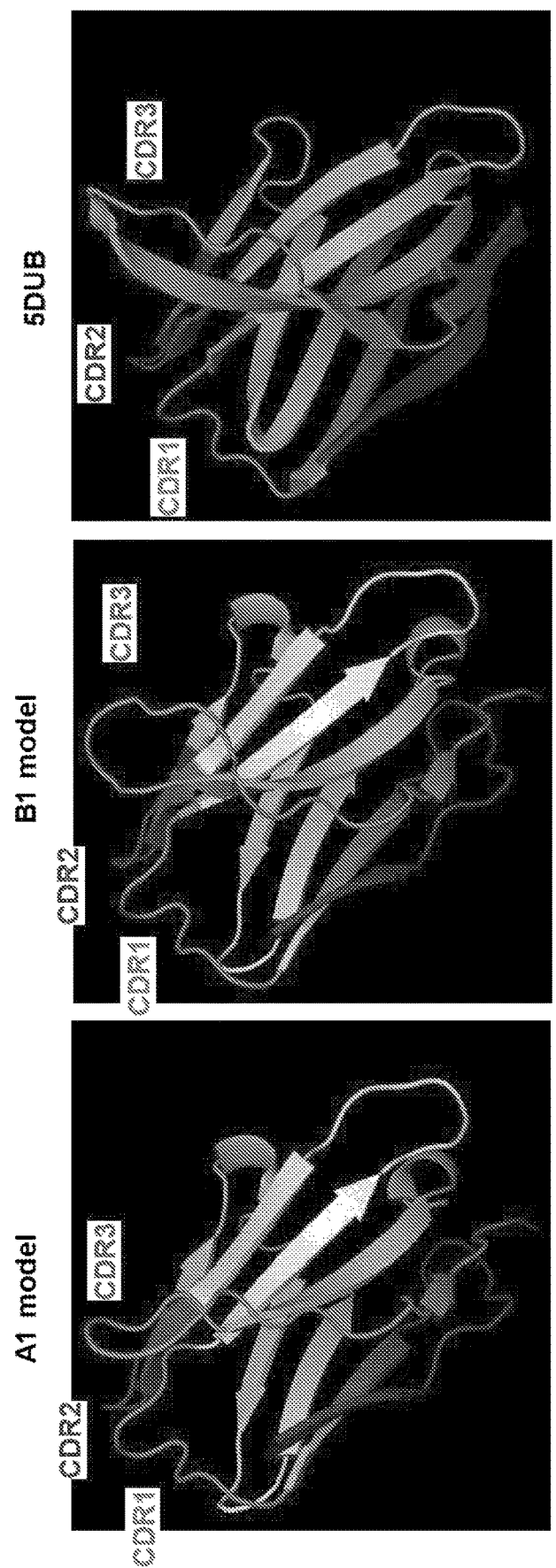

Structure modeling of A1 and B1 using on-line tools showed that they may have similar CDR1 and CDR2 loop conformations, which were also similar to the crystal structure of a rabbit anti-hypusine VH (PDB#5DUB), but their CDR3 loops appeared different (FIG. 3B).

Binding Properties of the B7H3 Binders

Figure 4A:
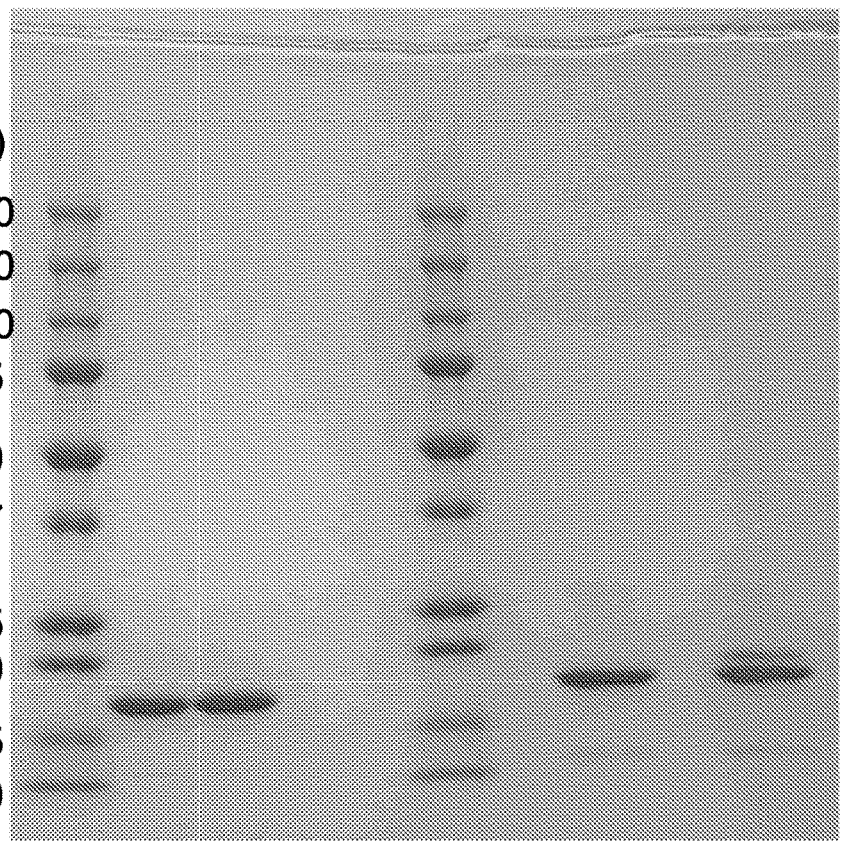
Figure 4B:
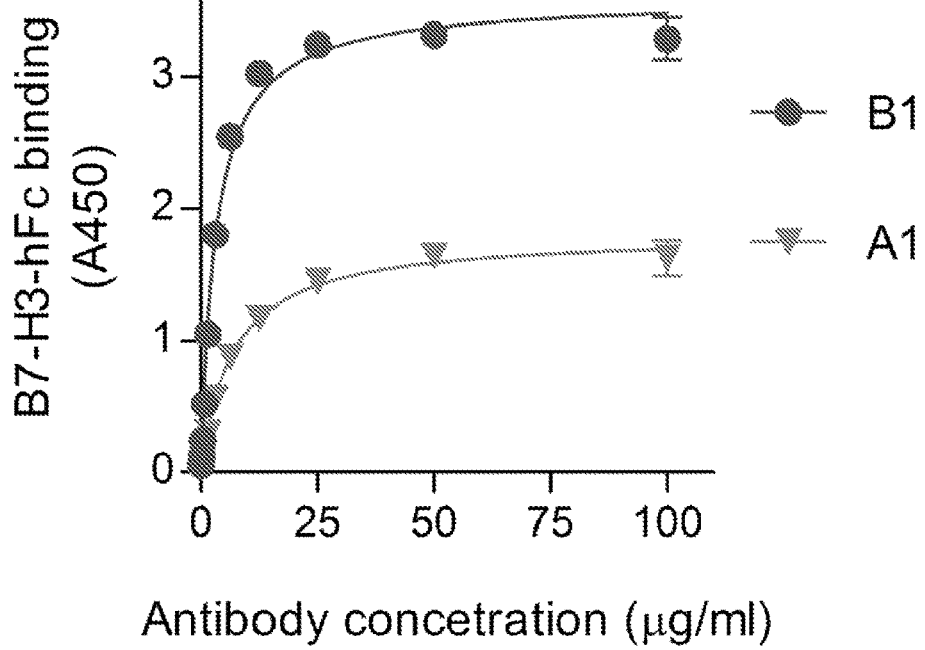
Figure 4C:
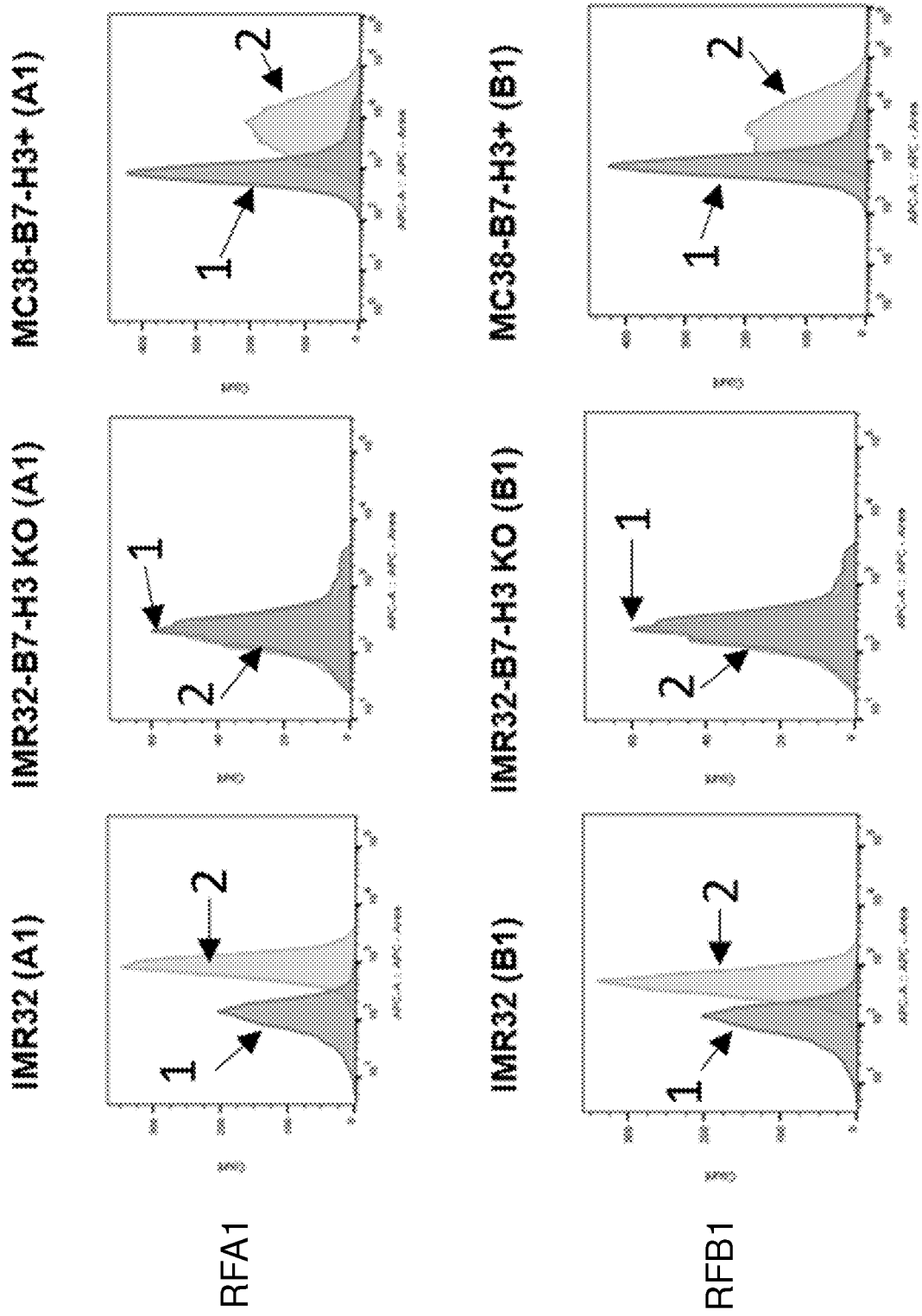

The VH coding sequences of binders A1 and B1 were fused with His-FLAG tag at their C-termini and cloned into an E. coli expression vector. Soluble VH domains were purified by one step Ni-affinity chromatography following a lab protocol (Feng et al., Antib Ther, 2, 1-11, 2019). The purified yield was 2 mg/L (A1) and 10 mg/L fermentation (B1) respectively. The purity was high as being separated on SDS-PAGE (FIG. 4A). The protein binding affinity of RFA1 and RFB1 was measured by ELISA, and the calculated EC50 values were 403 nM (A1) and 189 nM (B1) (FIG. 4B), which are relatively low but common for a VH only domain antibody. The cell binding capability was also tested by flow cytometry (FIGS. 4C-4D), which showed that the A1 and B1 binders had good cell binding for B7H3-positive cell lines (IMR32, MC38-B7H3+, A431, and NBEB), but not B7H3 knockout cell lines IMR32-B7H3 KO, MC38-B7H3 KO.

Therapeutic Applications

Rabbit is an outstanding resource for generating excellent monoclonal antibodies used as research tools, diagnostics, and for therapeutic purposes (Weber et al., Exp Mol Med, 49, e305, 2017). There are several major advantages for using rabbit antibodies. First, rabbit is phylogenetically more distant from human than mouse, and therefore conserved proteins that are poorly immunogenic in mice may have better immunogenicity in rabbits (Popkov et al., J Mol Biol, 325, 325-335, 2003). Second, rabbit monoclonal antibodies generally have high affinity and specificity, with the affinity range of 20-200 pM (Weber et al., Exp Mol Med, 49, e305, 2017; Landry et al., J Immunol Methods, 417, 86-96, 2015). Third, rabbit monoclonal antibody can be successfully humanized (Zhang and Ho, MAbs, 9, 419-429, 2017), therefore immunogenicity should not be a barrier for its therapeutic applications. Despite the many advantages, only a few rabbit monoclonal antibodies have been investigated for clinical applications.

Although whole rabbit monoclonal antibodies have been widely used for many years as excellent research reagents, the potential advantages of rabbit VH domain antibodies have not been exploited. Recently a group demonstrated that high affinity rabbit VH domain antibodies can be generated by a low temperature (i.e. 16° C.) phage display method (Shinozaki et al., Sci Rep, 7, 5794, 2017), which will greatly accelerate the studies of rabbit VH domain antibodies. However, the low temperature phage display method tends to enrich a significant portion of unstable and hard-to-express binders, which may require significant effort to improve the physicochemical properties, especially the expression and thermostability (Shinozaki et al., J Biosci Bioeng, 125, 654-661, 2018). The current study investigated the possibility of screening thermo-stable and well-expressed binders using high temperature phage display method.

As a proof-of-concept, B7H3 was chosen as a target. B7H3 is over-expressed in many cancer types and it can inhibit T-cell activation, therefore B7H3 is regarded as an important immune check point member of the B7 and CD28 families (Picarda et al., Clin Cancer Res, 22, 3425-3431, 2016). It is also broadly overexpressed in many solid tumors, making it a therapeutic target (Seaman et al., Cancer Cell, 31, 501-515 e508, 2017). The extracellular domain of B7H3 was expressed in 293F cells, although the expression level was very low (<0.5 mg/L). Although B7H3 is highly conserved among human, mouse, and rabbit, the recombinant B7H3-hFc protein had adequate immunogenicity in rabbits, as indicated by the immunized polyclonal sera that can bind both recombinant protein and B7H3 positive cells. A high temperature (37° C.) phage display method was used to make the rabbit VH phage library particles and to perform the panning. Two representative binders that have a moderate affinity for B7H3 protein and B7H3 positive cancer cells were obtained. The RFA1 and RFB1 binders have good cell binding for B7H3-positive cells, but not B7H3 knockout cells. This study demonstrated that rabbit VH domain antibodies with moderate affinity and expression level can be generated by phage display at regular temperature (37° C.). Taking account of the important role of B7H3 in regulating T cell function, the two B7H3 domain antibodies generated can be used for cancer immunotherapy applications.

Figure 5:
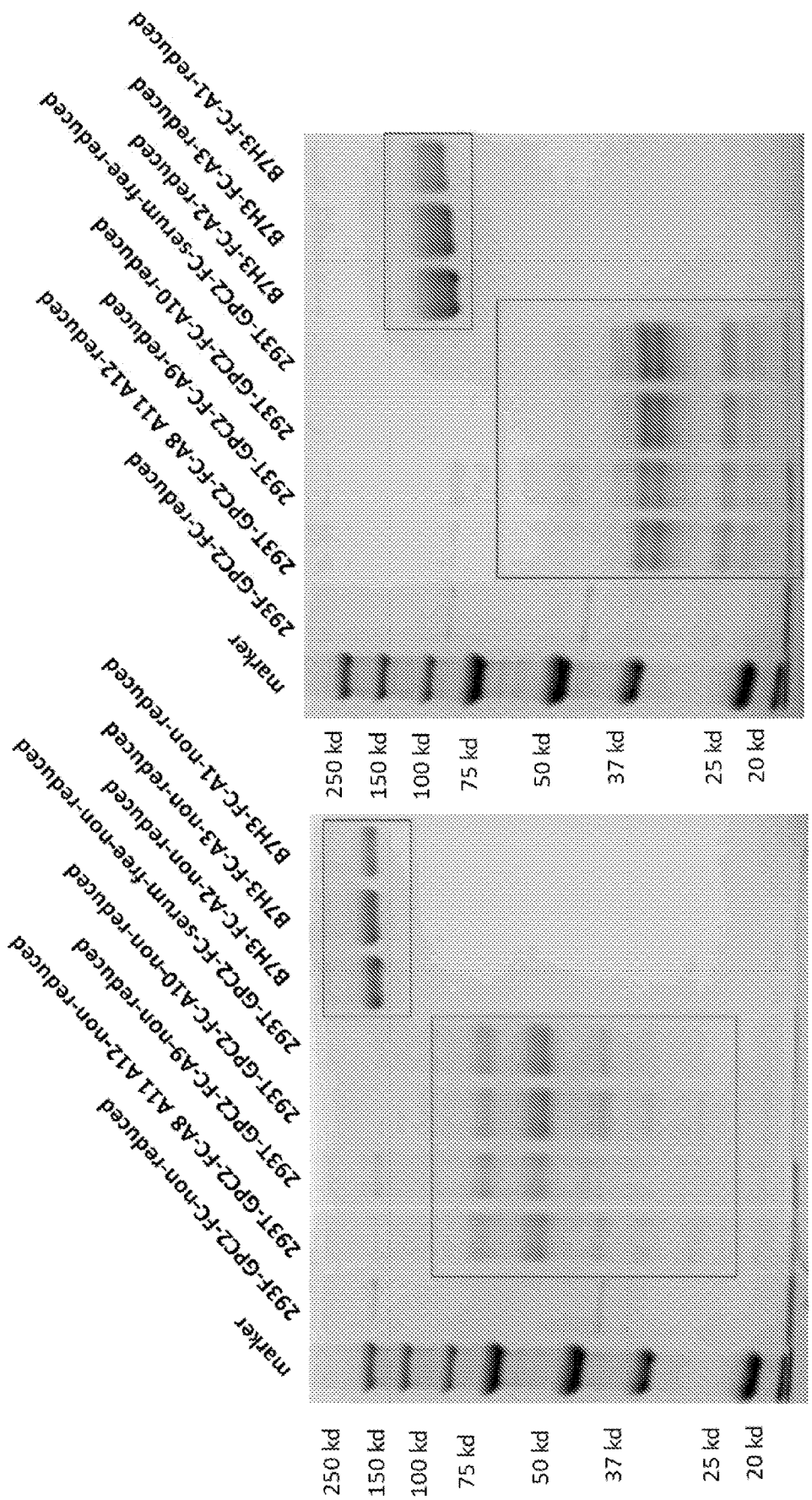
FIG. 5: Production of B7H3-Fc fusion protein in HEK-293 cells. The recombinant B7H3-Fc fusion protein was expressed in HEK-293 cells and purified on a Protein A column (GE Healthcare) using an AKTA Explorer (GE Healthcare). The purified B7H3-Fc fusion protein was over 99% pure as shown on a SDA-PAGE gel, and had a molecular weight of 154 kDa under a non-reduced condition (left) and 77 kDa under a reduced condition (right). The yield of B7H3-Fc was 2 mg/L. Glypican 2 (GPC2)-Fc was used as a control protein.

Example 3: Isolation of Camel Nanobodies Targeting B7H3 (CD276) by Phage Display This example describes selection of ten camel $V_HH$ nanobodies from phage display libraries and characterization of their binding properties. Also described are chimeric antigen receptors comprised of the $V_HH$ nanobodies Phage Panning on Eight Camel $V_HH$ Libraries for B7H3 Binders A B7H3-Fc fusion protein was produced to select for B7H3 binders. The recombinant B7H3-Fc fusion protein was expressed in HEK-293 cells and purified on a Protein A column (GE Healthcare) using an AKTA Explorer (GE Healthcare). The purified B7H3-Fc fusion protein was over 99% pure as shown on a SDA-PAGE gel, and had a molecular weight of 154 kDa under a non-reduced condition and 77 kDa under a reduced condition (FIG. 5). The yield of B7H3-Fc was 2 mg/L.

Figure 6:
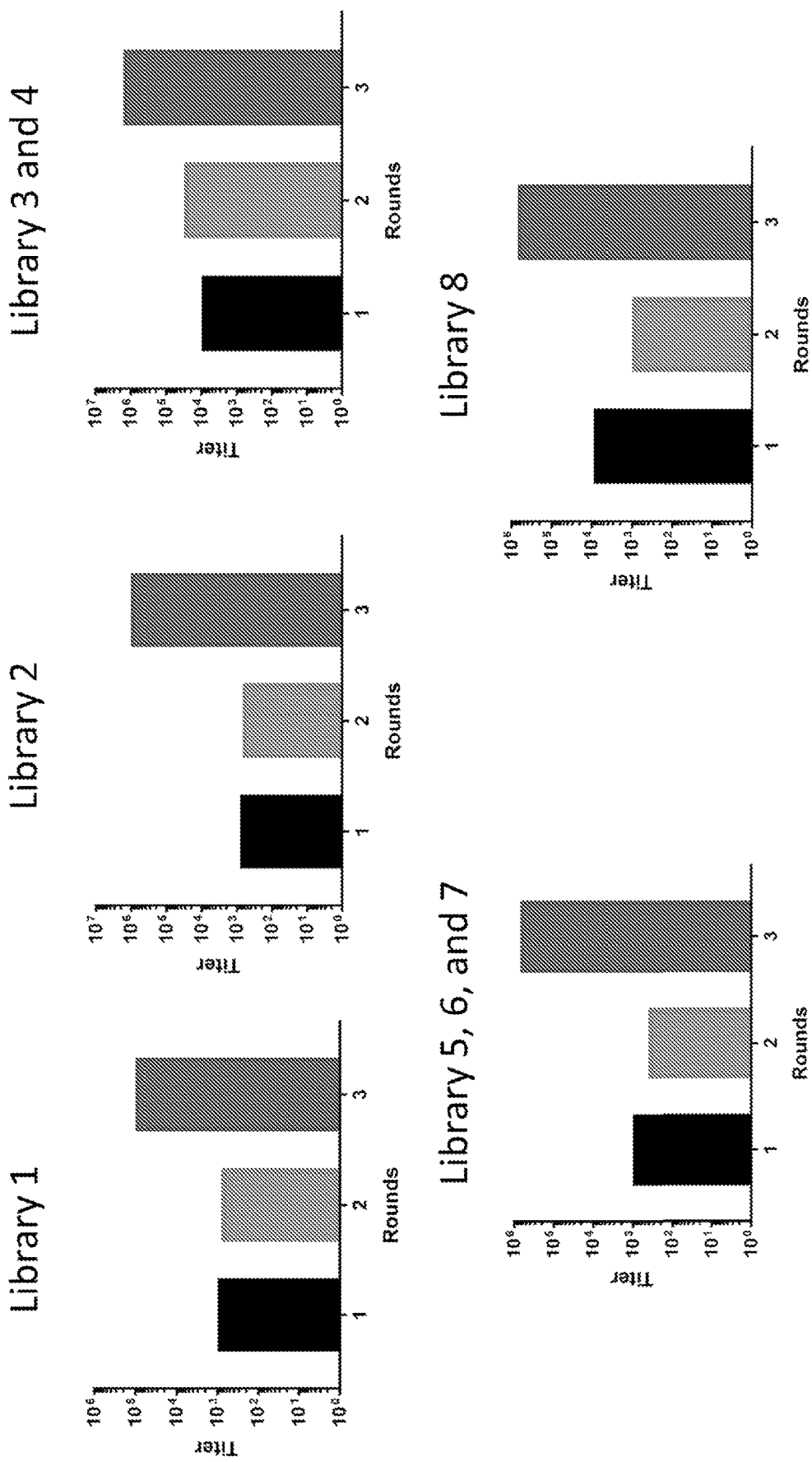
FIG. 6: Phage panning on eight camel $V_HH$ libraries for B7H3 binders. Phage panning on recombinant B7H3-Fc protein was conducted for 3 rounds using eight $V_HH$ single domain antibody libraries made from eight individual camels (*Camelus dromedaries*). The phage titer from each round is shown in the figure. The increase of phage titers in the $3^{rd}$ round of phage panning indicated enrichment of high affinity $V_HH$ binders to B7H3.

Phage panning on recombinant B7H3-Fc protein was conducted for 3 rounds using eight $V_HH$ single domain antibody libraries made from eight individual camels (Camelus dromedaries). The phage titer from each round is shown in FIG. 6. The increase of phage titers in the $3^{rd}$ round of phage panning indicated enrichment of high affinity $V_HH$ binders to B7H3. Phage binding on B7H3-Fc was also evaluated by ELISA; the results are shown in Table 2. All of the selected phage could bind to B7H3-Fc, but not to IgG control.

TABLE 2

Selected phage binding on B7H3-Fc by ELISA

| Phage | B7H3-Fc | IgG |
|---|---|---|
| RWA12 | 2.50985 | 0.1147 |
| RWB2 | 2.54615 | 0.0777 |

TABLE 2-continued

Selected phage binding on B7H3-Fc by ELISA

| Phage | B7H3-Fc | IgG |
|---|---|---|
| RWH5 | 2.88595 | 0.06665 |
| RWB12 | 2.4812 | 0.1637 |
| RWG8 | 2.5186 | 0.10125 |
| RWD5 | 2.4972 | 0.0685 |
| RWC3 | 2.422 | 0.08885 |
| RWG4 | 2.1349 | 0.10345 |
| RWD9 | 2.43255 | 0.07875 |
| RWC4 | 2.6597 | 0.07775 |
| RWH1 | 2.75015 | 0.13615 |

Binding of selected B7H3-specific phage to monkey, mouse, rat and human B7H3 was tested by ELISA. As shown in Table 3, nine of the selected phages could bind to monkey B7H3, five phages could bind to mouse B7H3, nine phages could bind to rat B7H3, and eight phages could bind to human B7H3 (bold numbers indicate positive binding).

TABLE 3

Cross-species binding of selected B7H3 phage by ELISA

| Nanobody | Monkey | Mouse | Rat | Human | Non-relevant antigen |
|---|---|---|---|---|---|
| RWA12 | 2.4321 | 0.0693 | 2.5233 | 2.4312 | 0.132866667 |
| RWB2 | 0.5782 | 1.0528 | 0.9811 | 2.5281 | 0.068366667 |
| RWH5 | 2.2212 | 1.8958 | 2.3675 | 2.6701 | 0.057433333 |
| RWB12 | 2.3071 | 1.7129 | 2.0702 | 2.7355 | 0.059666667 |
| RWG8 | 2.4277 | 2.4724 | 2.4365 | 2.6674 | 0.0659 |
| RWD5 | 0.2668 | 0.0819 | 0.8712 | 2.1256 | 0.0583 |
| RWC3 | 0.2278 | 0.0759 | 0.7381 | 2.1403 | 0.065433333 |
| RWG4 | 0.1904 | 0.0665 | 0.2924 | 1.7249 | 0.1396 |
| RWD9 | 0.2366 | 0.0782 | 0.7776 | 2.2122 | 0.1126 |
| RWC4 | 1.5397 | 0.3663 | 0.7968 | 2.4956 | 0.0764 |
| RWH1 | 0.0706 | 0.0738 | 0.0951 | 2.0343 | 0.0608 |
| PBS | 0.0633 | 0.085 | 0.0927 | 0.0485 | 0.072966667 |

Figure 7A:
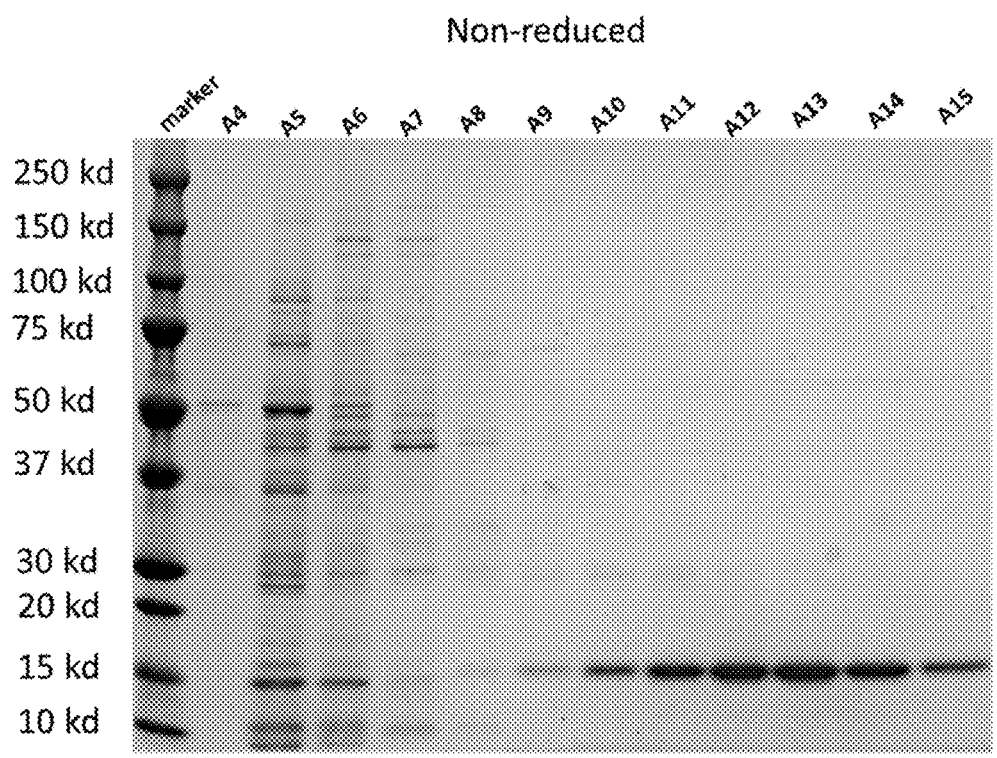
FIGS. 7A-7B: Purification of the RWC4 $V_HH$ nanobody.
Figure 7B:
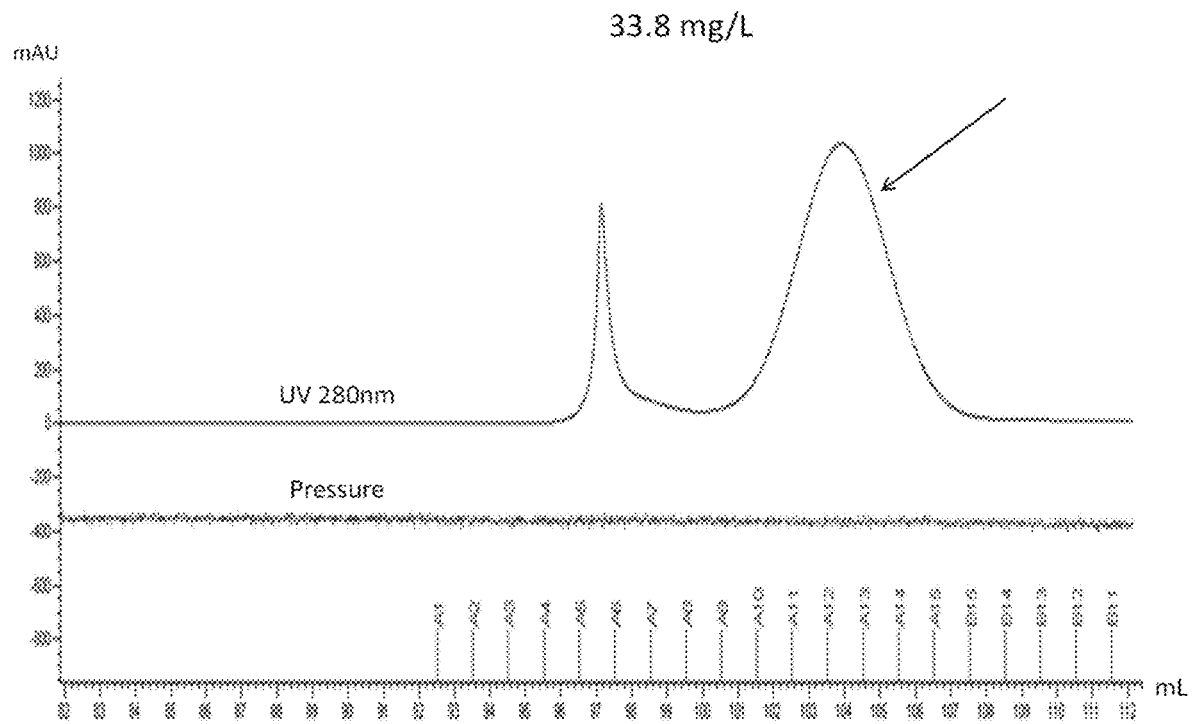
Figure 8A:
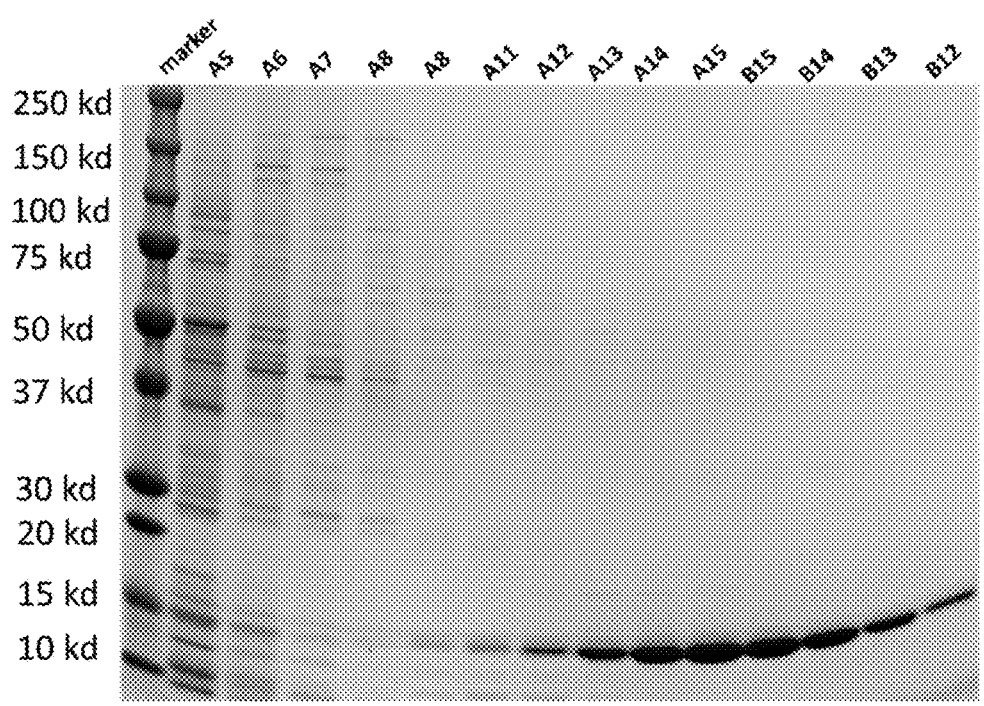
FIGS. 8A-8B: Purification of the RWG8 $V_HH$ nanobody.
Figure 8B:
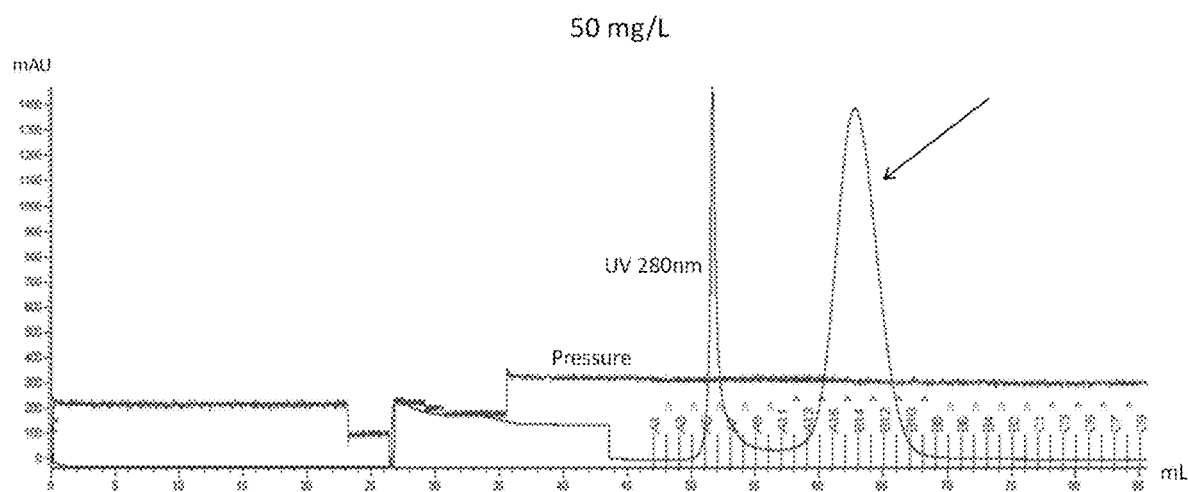
Figure 9A:
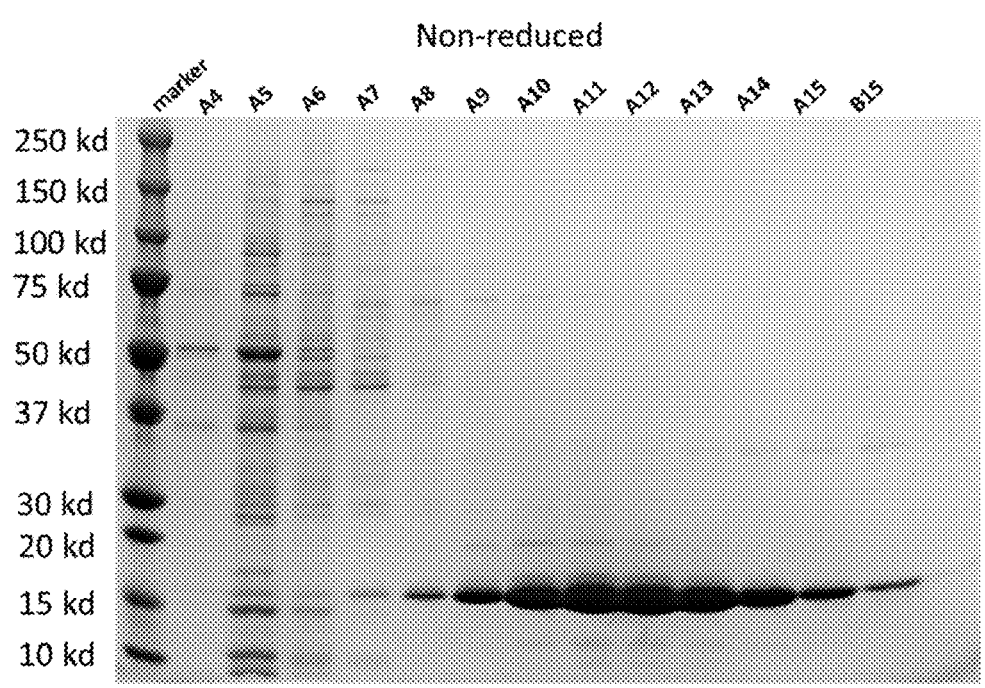
FIGS. 9A-9B: Purification of the RWB12 $V_HH$ nanobody.
Figure 9B:
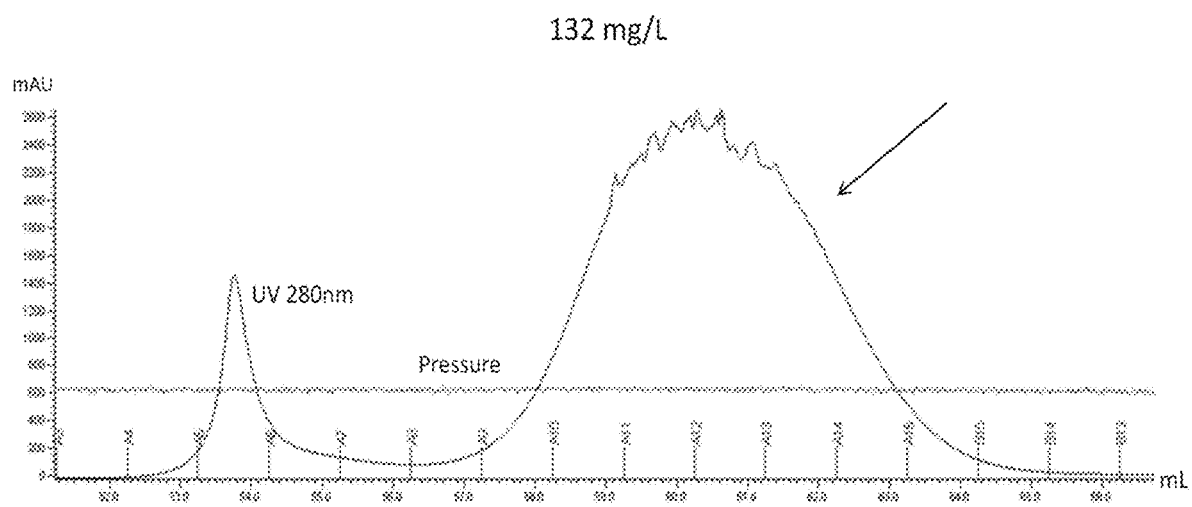

$V_HH$ Purification and Binding $V_HH$ nanobodies were purified from the selected phage. Purification of the RWC4, RWG8 and RWB12 nanobodies is shown in FIGS. 7-9. $V_HH$ camel nanobody fractions eluted from the AKTA Explorer (GE Healthcare) were subjected to SDS-PAGE (see FIGS. 7A, 8A and 9A). Chromatographs of the nanobodies eluted from a nickel column (GE Healthcare) on the AKTA Explorer (GE Healthcare) are shown in FIGS. 7B, 8B and 9B. The yields of RWC4, RWG8 and RWB12 were 33.8 mg/L, 50 mg/L and 132 mg/L, respectively.

Binding of the selected $V_HH$ nanobodies on hB7H3-Fc, hB7H3-His, mouse B7H3-His, monkey B7H3-His and rat B7H3-His fusion proteins was measured by ELISA. Results are shown in Table 4 and FIG. 22. Except for RWB2, the $V_HH$s were capable of binding to the B7H3-Fc and B7H3-His fusion proteins. RWG8 exhibited cross-reactivity to mouse B7H3 (FIG. 22). In addition, RWA12 exhibited cross-reactivity with PBS and PD-L1; the remaining $V_HH$s did not cross-react to PDL1 (Table 5).

TABLE 4

Selected VHHs binding on B7H3-fusion protein by ELISA

| VhH | hB7H3-Fc | hB7H3-His | Monkey B7H3-His | Rat B7H3-His | Non-relevant antigen |
|---|---|---|---|---|---|
| RWH1 | 2.594 | 2.6469 | 1.2967 | 0.1341 | 0.1309 |
| RWH5 | 0.2128 | 0.3736 | 0.09795 | 0.30495 | 0.07635 |
| RWG8 | 0.6408 | 1.03935 | 0.117 | 0.06955 | 0.0562 |
| RWB12 | 0.56795 | 0.6859 | 0.1644 | 0.0574 | 0.04945 |
| RWC4 | 2.0192 | 2.4388 | 0.28845 | 0.158 | 0.0719 |
| RWA12 | 2.1821 | 2.40585 | 2.02145 | 1.99375 | 1.42755 |
| RWG4 | 2.5413 | 2.55455 | 1.8126 | 1.49675 | 0.0541 |
| RWB2 | 0.0884 | 0.152 | 0.07985 | 0.0986 | 0.11535 |
| RWC3 | 2.34075 | n.d. | n.d. | n.d. | n.d. |
| RWD5 | 2.3737 | n.d. | n.d. | n.d. | n.d. |
| RWD9 | 0.49865 | n.d. | n.d. | n.d. | n.d. |
| PBS | 0.064 | 0.0697 | 0.07795 | 0.13435 | 0.08595 |

TABLE 5

Cross-reaction of selected B7H3 binders on PD-L1 by ELISA

| VhH | PD-L1 | PBS |
|---|---|---|
| RWA12 | 0.9937 | 0.444 |
| RWH1 | 0.0753 | 0.04645 |
| RWH5 | 0.08255 | 0.0478 |
| RWG8 | 0.0715 | 0.05055 |
| RWB2 | 0.0522 | 0.0423 |
| RWG4 | 0.0614 | 0.0474 |
| RWC4 | 0.04305 | 0.04855 |
| RWB12 | 0.04545 | 0.0475 |
| RWC3 | 0.0454 | 0.04985 |
| RWD9 | 0.0438 | 0.05345 |
| RWD5 | 0.04705 | 0.0585 |
| PBS | 0.04565 | 0.07345 |

Binding of Selected B7H3-Targeted $V_HH$s to B7H3-Expressing Cells

Figure 10A:
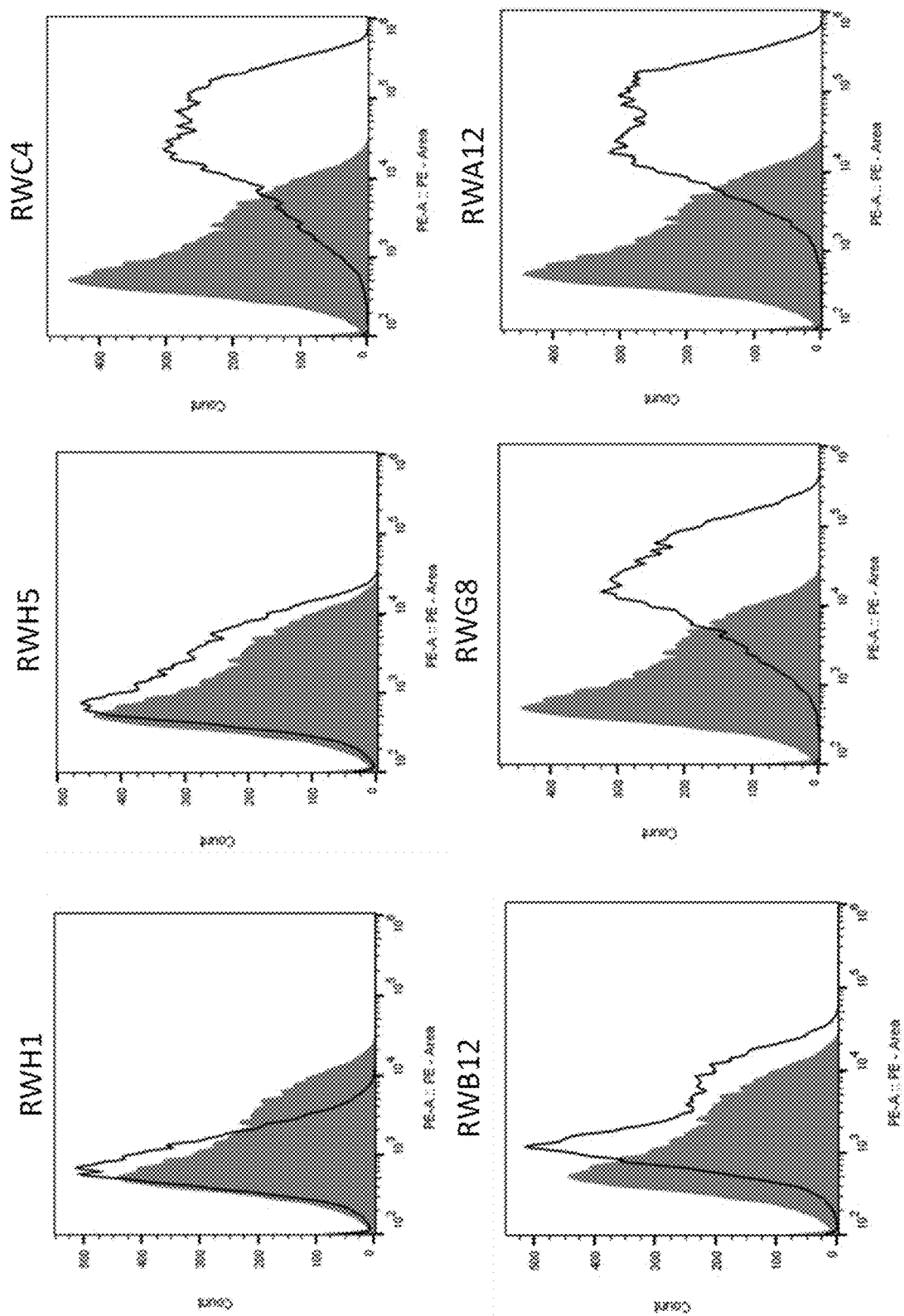
FIGS. 10A-10B: Binding of select B7H3-targeted $V_HH$ nanobodies to NBEB neuroblastoma cells. Binding of the B7H3-specific nanobodies was evaluated by FACS analysis. Six of the tested antibodies (RWC4, RWB12, RWG8, RWA12, RWG4 and RWD5) were capable of binding NBEB cells.
Figure 10B:
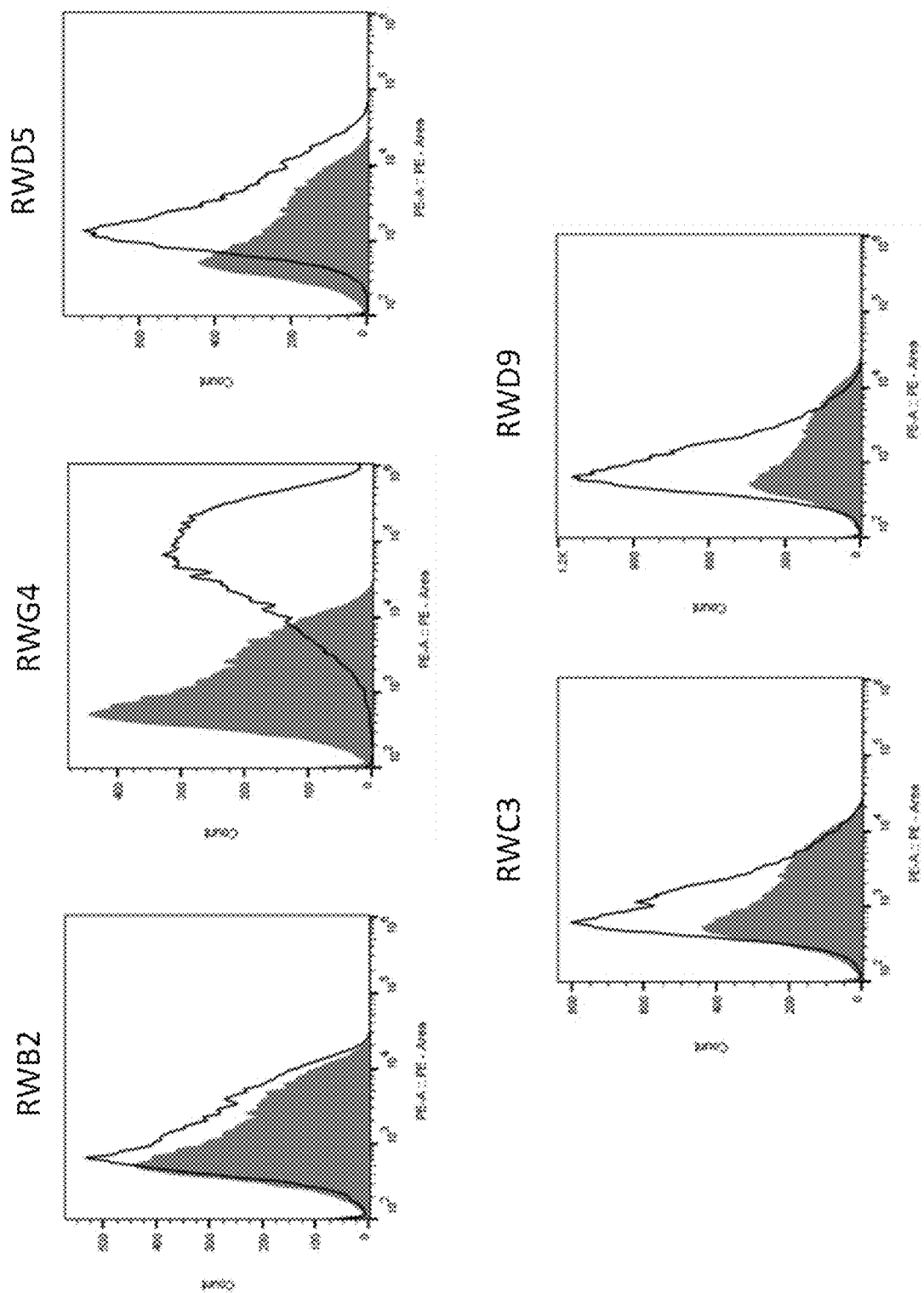

Binding of select B7H3-targeted $V_HH$ nanobodies to NBEB neuroblastoma cells was evaluated by FACS analysis (FIGS. 10A-10B). Six of the tested antibodies (RWC4, RWB12, RWG8, RWA12, RWG4 and RWD5) were capable of binding NBEB cells.

Figure 11A:
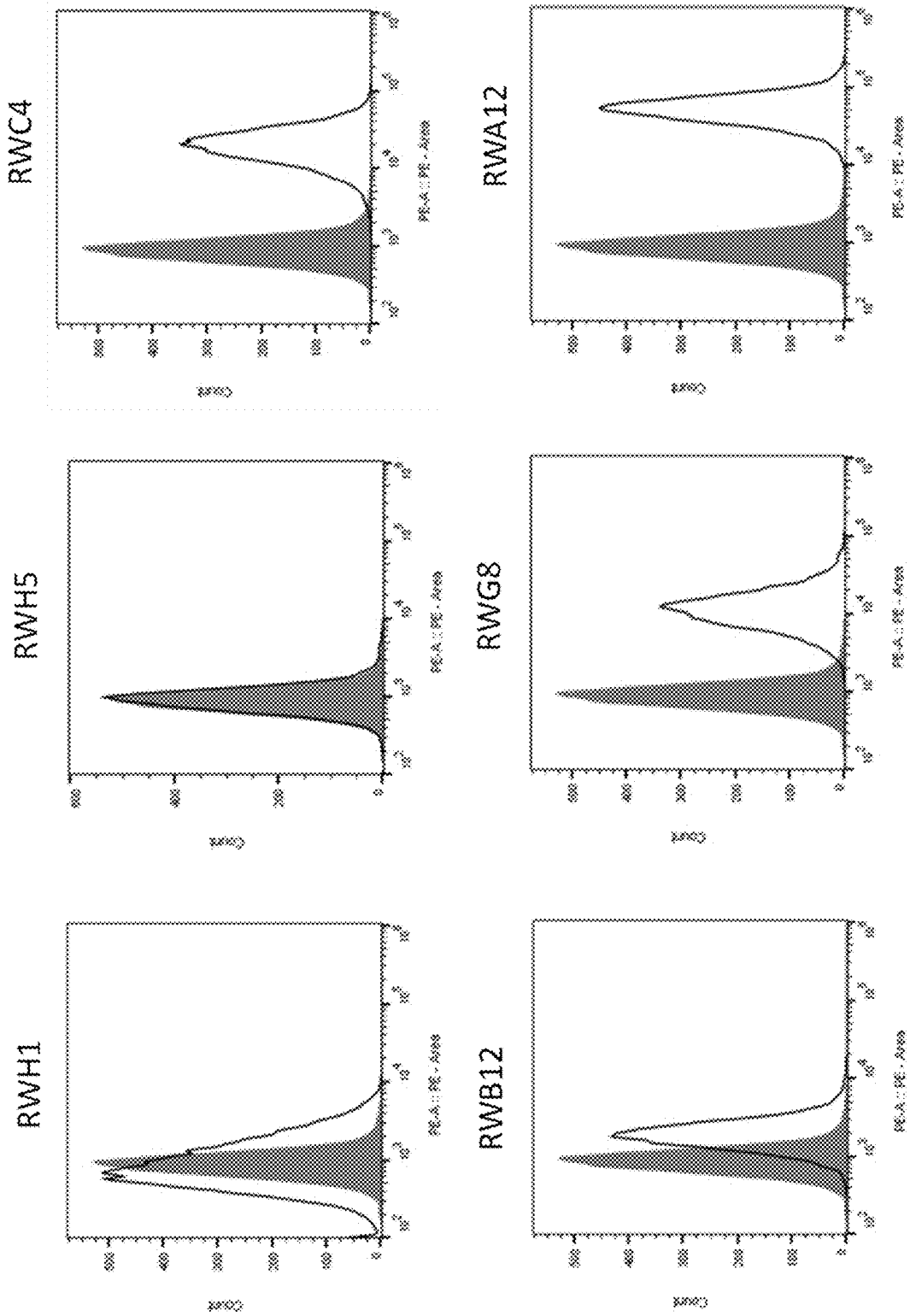
FIGS. 11A-11B: Binding of select B7H3-targeted $V_HH$ nanobodies to A431 epidermoid carcinoma cells. Binding of the B7H3-specific nanobodies was evaluated by FACS analysis. Six of the tested antibodies (RWC4, RWB12, RWG8, RWA12, RWG4 and RWD5) were capable of binding A431 cells.
Figure 11B:
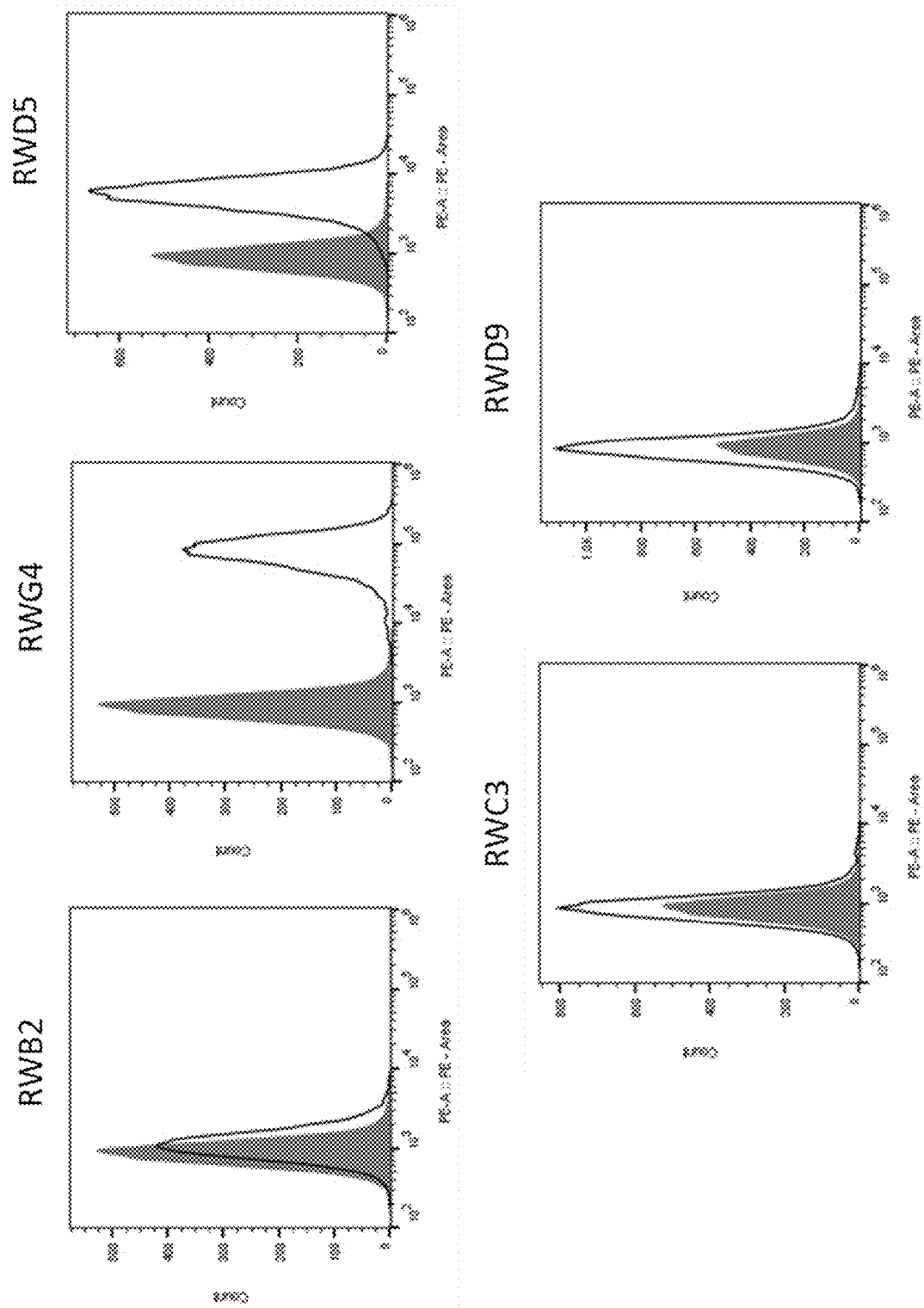

Binding of select B7H3-targeted $V_HH$ nanobodies to A431 epidermoid carcinoma cells was evaluated by FACS analysis (FIGS. 11A-11B). Six of the tested antibodies (RWC4, RWB12, RWG8, RWA12, RWG4 and RWD5) were capable of binding A431 cells.

Five of the B7H3-targeted antibodies (RWC4, RWB12, RWG8, RWG4 and RWD5) were also evaluated for their ability to bind MC38-CD276+ and MC38-CD276KO cells. All tested antibodies bound to B7H3-positive cells, but not to B7H3-negative cells (see Table 6).

TABLE 6

Cell binding ability summary of 5 V$_H$Hs

| MC38-CD276+ | Positive rates | | | | MC38-CD276KO | Positive rates | |
|---|---|---|---|---|---|---|---|
| | 50 μg/ml | 10 μg/ml | 2 μg/ml | 0.5 μg/ml | | 50 μg/ml | 10 μg/ml |
| RWC4 | 98.80% | 98.30% | 84.70% | 14.40% | RWC4 | 0.17% | 0.24% |
| RWB12 | 12% | 4.16% | 0.18% | 0.23% | RWB12 | 0.37% | 0.19% |
| RWG8 | 26.50% | 4.68% | 0.31% | 0.10% | RWG8 | 0.76% | 0.25% |
| RWG4 | 91.50% | 85.80% | 23.40% | 1.25% | RWG4 | 0.13% | 0.06% |
| RWD5 | 88.90% | 44.90% | 1.44% | 0.19% | RWD5 | 0.56% | 0.12% |

Binding Kinetics

The association/dissociation properties of RWC4 and RWG4 were measured on the Octet system (Creative Biolabs) using either recombinant human B7H3-Fc protein or recombinant mouse B7H3-His protein.

Figure 12:
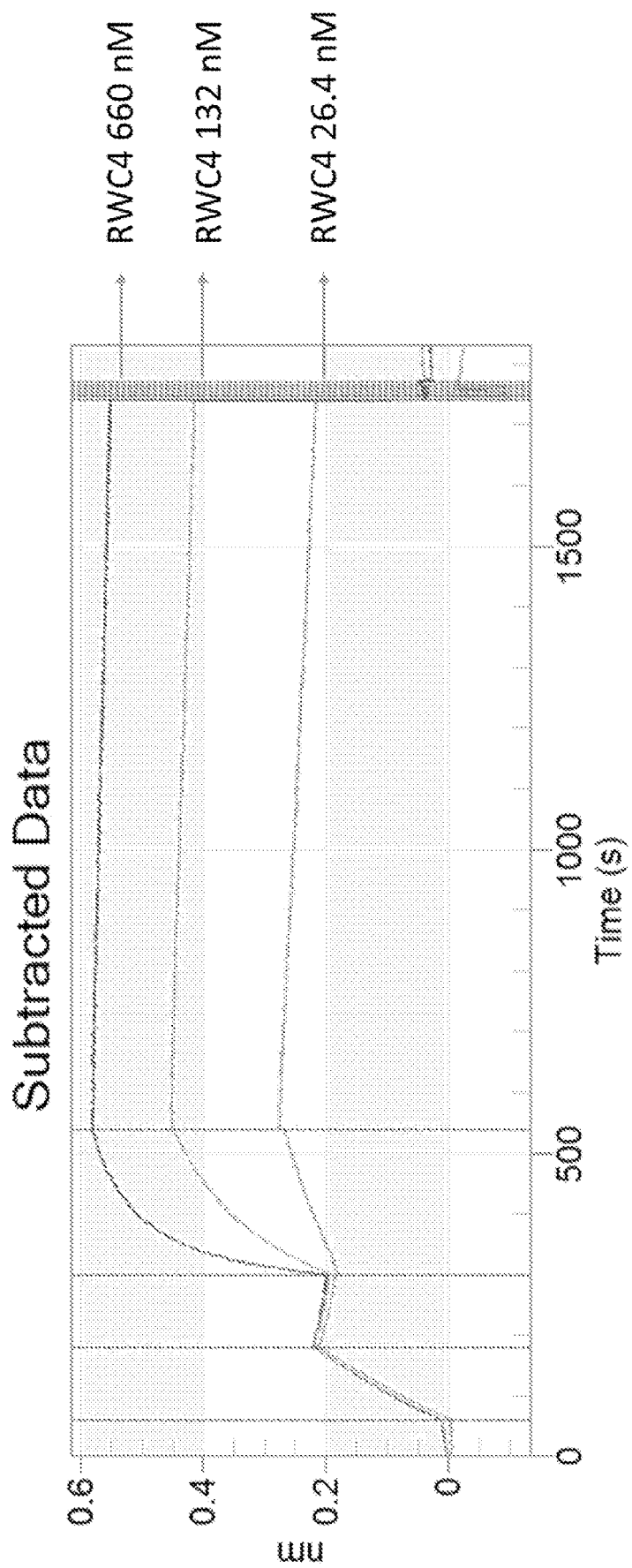
FIG. 12: Kinetics of RWC4 on human B7H3-Fc. The association/dissociation properties of RWC4 were measured on the Octet system (Creative Biolabs) using recombinant human B7H3-Fc protein. $K_D$ of RWC4=3.8 nM, $K_{on}$ of RWC4=2.65×10$^4$, and $K_{dis}$ of RWC4=1.01×10$^{-4}$.

The kinetics of RWC4 binding to human B7H3-Fc is shown in FIG. 12 and summarized in Table 7. The $K_D$ of RWC4 on human-B7H3-Fc was $3.8 \times 10^{-9}$.

TABLE 7

Kinetics of RWC4 on human B7H3-Fc

| nM | $K_D$ (M) | $k_{on}$ (1/Ms) | $k_{dis}$ (1/s) |
|---|---|---|---|
| 660 | $3.8 \times 10^{-9}$ | $2.65 \times 10^{4}$ | $1.01 \times 10^{-4}$ |
| 132 | $3.8 \times 10^{-9}$ | $2.65 \times 10^{4}$ | $1.01 \times 10^{-4}$ |
| 26.4 | $3.8 \times 10^{-9}$ | $2.65 \times 10^{4}$ | $1.01 \times 10^{-4}$ |

Figure 13:
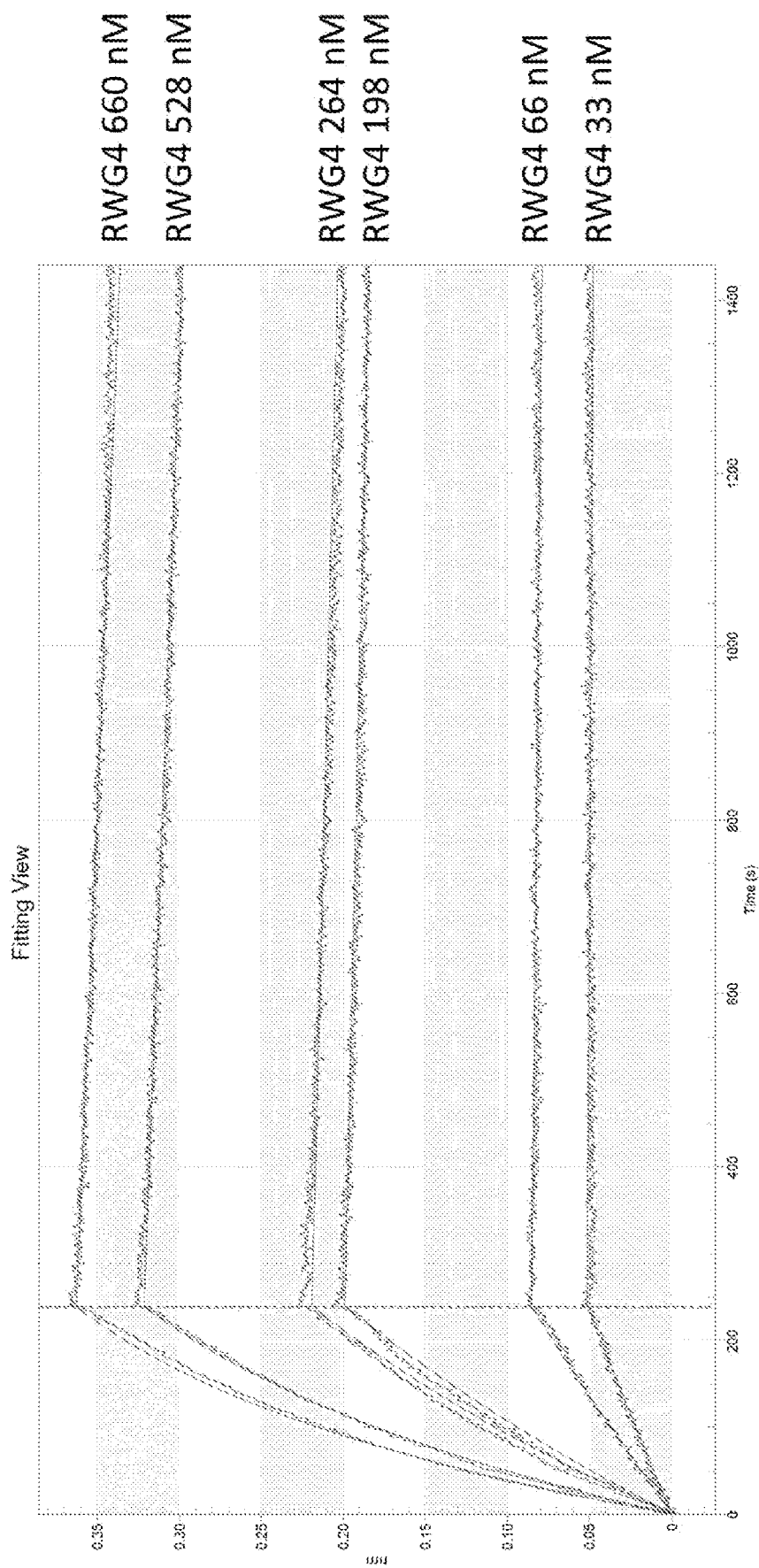
FIG. 13: Kinetics of RWG4 on human B7H3-Fc. The association/dissociation properties of RWG4 were measured on the Octet system (Creative Biolabs) using recombinant human B7H3-Fc protein. $K_D$ of RWG4=6.94 nM, $K_{on}$ of RWG4=9.13×10$^3$, and $K_{dis}$ of RWG4=6.34×10$^{-5}$.

The kinetics of RWG4 on human B7H3-Fc is shown in FIG. 13 and summarized in Table 8. The $K_D$ of RWG4 on human-B7H3-Fc was $6.94 \times 10^{-9}$.

TABLE 8

Kinetics of RWG4 on human B7H3-Fc

| nM | $K_D$ (M) | $k_{on}$ (1/Ms) | $k_{dis}$ (1/s) |
|---|---|---|---|
| 660 | $6.94 \times 10^{-9}$ | $9.13 \times 10^{3}$ | $6.34 \times 10^{-5}$ |
| 528 | $6.94 \times 10^{-9}$ | $9.13 \times 10^{3}$ | $6.34 \times 10^{-5}$ |
| 264 | $6.94 \times 10^{-9}$ | $9.13 \times 10^{3}$ | $6.34 \times 10^{-5}$ |
| 198 | $6.94 \times 10^{-9}$ | $9.13 \times 10^{3}$ | $6.34 \times 10^{-5}$ |
| 66 | $6.94 \times 10^{-9}$ | $9.13 \times 10^{3}$ | $6.34 \times 10^{-5}$ |
| 33 | $6.94 \times 10^{-9}$ | $9.13 \times 10^{3}$ | $6.34 \times 10^{-5}$ |

Expression of B7H3 on Various Cancer Cells Lines

Several cancer cell lines were evaluated for expression of B7H3 by FACS. Expression was detected on fourteen cell lines, but not on two cell lines with a B7H3 (CD276) knockout (see Table 9).

TABLE 9

B7H3-expressing Cell Summary

| Cell lines (cancer types) | B7H3 expression |
|---|---|
| A431 (human epidermoid carcinoma) | + |
| NBEB (human neuroblastoma) | + |
| IMR5 (human neuroblastoma) | + |
| MC-38-CD276+ (murine colon adenocarcinoma cells) | + |
| MC-38-CD276KO (murine colon adenocarcinoma cells) | − |
| IMR32 (human neuroblastoma) | + |
| IMR32-CD276KO (human neuroblastoma) | − |
| H9 (human cutaneous T lymphocyte) | + |
| EKVX (Human Lung Adenocarcinoma) | + |
| LAN-1 (human neuroblastoma) | + |

TABLE 9-continued

B7H3-expressing Cell Summary

| Cell lines (cancer types) | B7H3 expression |
|---|---|
| H2269 (human melanoma) | + |
| C55 | + |
| Miaca2 | + |
| OVCAR8 (human ovarian cancer) | + |
| BXPC-3 (adenocarcinoma) | + |

Generation of B7H3 Targeted CARs

First, PCR was performed to amplify the nanobody sequence, the backbone of the plasmid Pwpt and the PCR product were respectively digested with NdeI and SpeI, the digested backbone was ligated with the digested PCR product. After transformation, bacteria were selected on ampicillin plates.

Figure 14A:
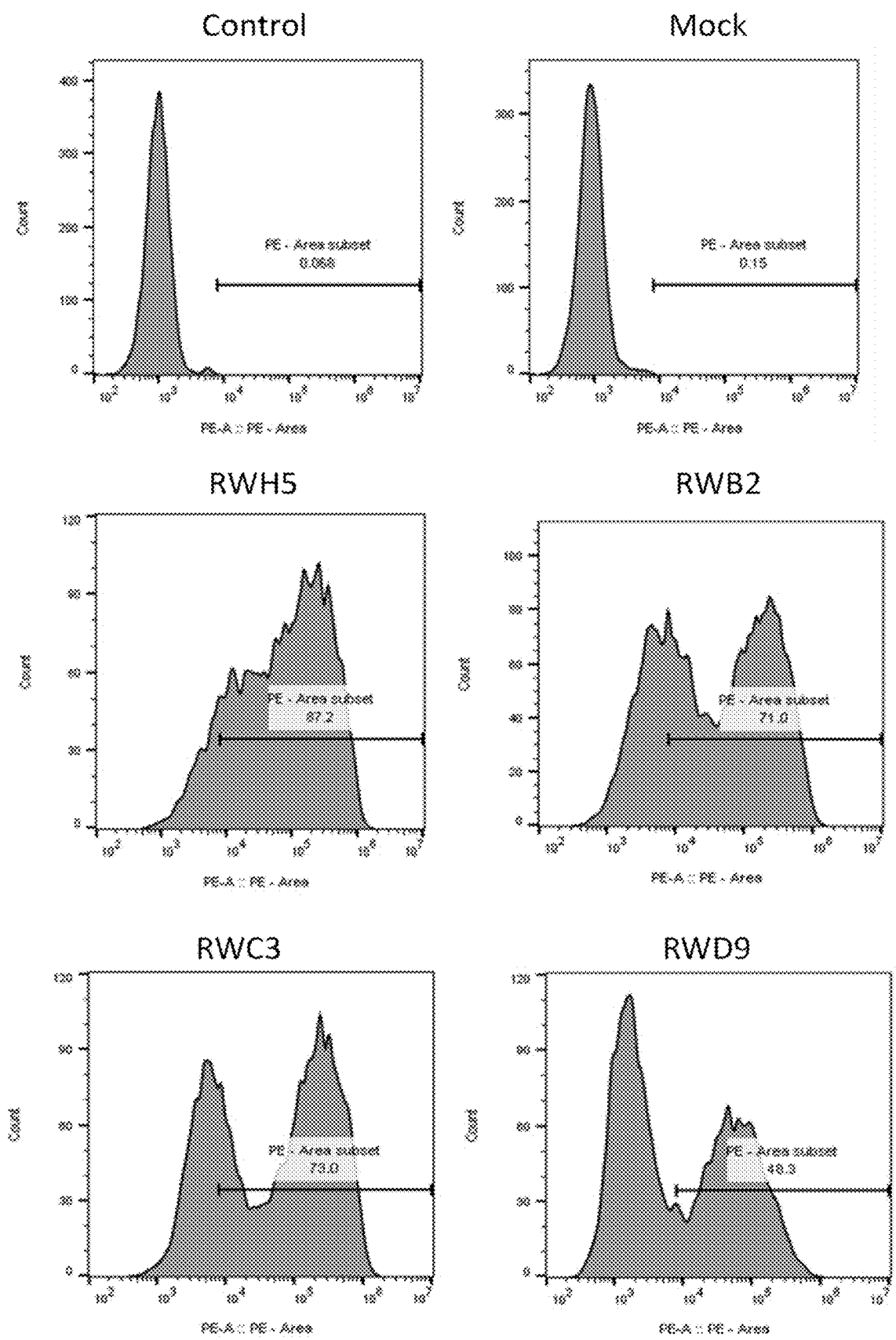
FIGS. 14A-14B: T cell transfection efficiency of lentivirus expressing B7H3-targeted CARs. Transfection efficiency was measured by FACS.
Figure 14B:
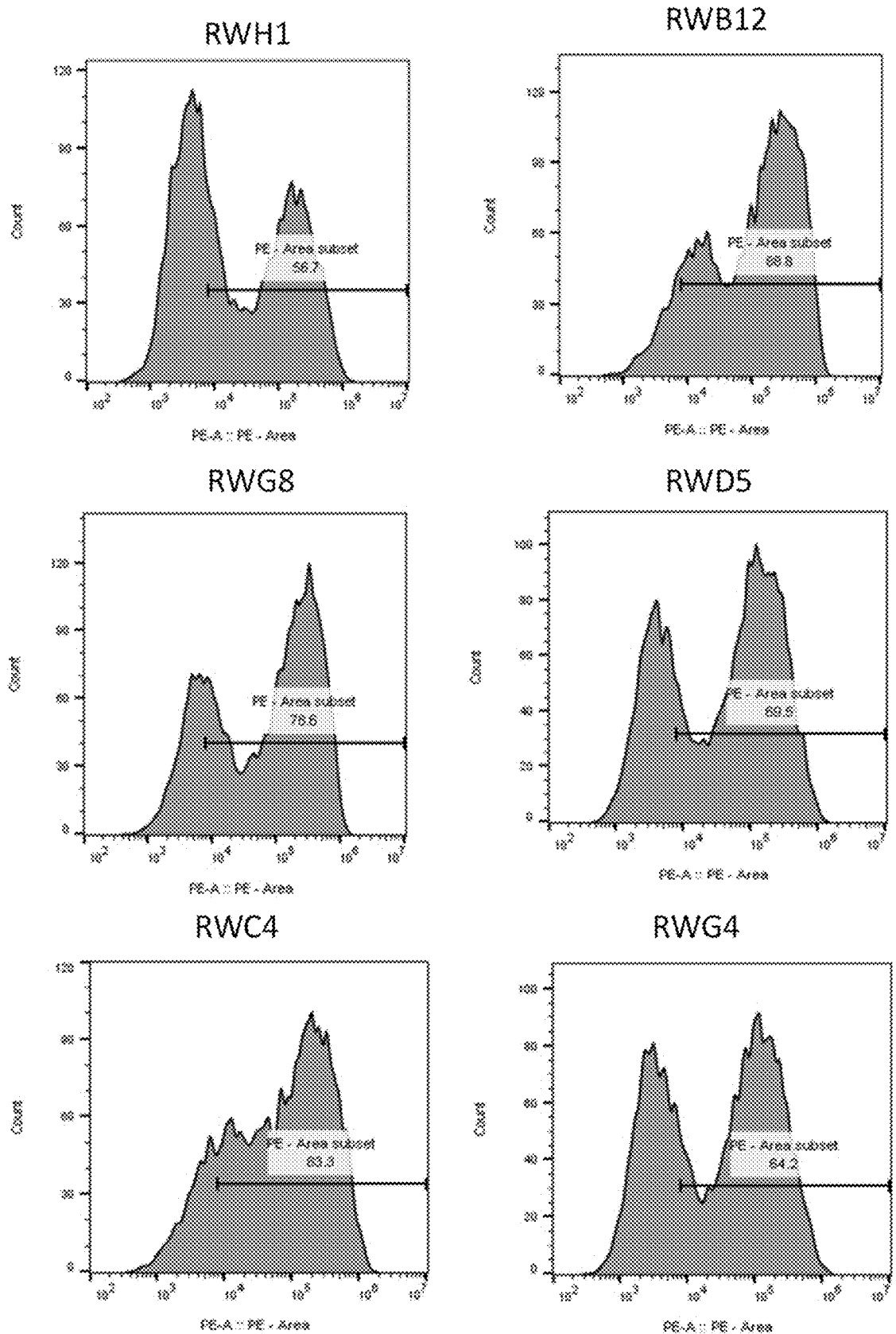

T cell transfection efficiency of lentivirus expressing B7H3 targeted CARs was measured by FACS. The results are shown in FIGS. 14A-14B and Table 10.

TABLE 10

Transfection efficiency of CAR-T cells

| CAR-T | Transfection efficiency |
|---|---|
| Mock | 0.15% |
| RWH5 | 87.2% |
| RWB2 | 71% |
| RWC3 | 73% |
| RWD9 | 48.3% |
| RWH1 | 56.7% |
| RWB12 | 88.8% |
| RWG8 | 78.6% |
| RWD5 | 69.5% |
| RWC4 | 83.3% |
| RWG4 | 64.2% |

Cytotoxicity of CAR-T Cells Targeting B7H3

Figure 15A:
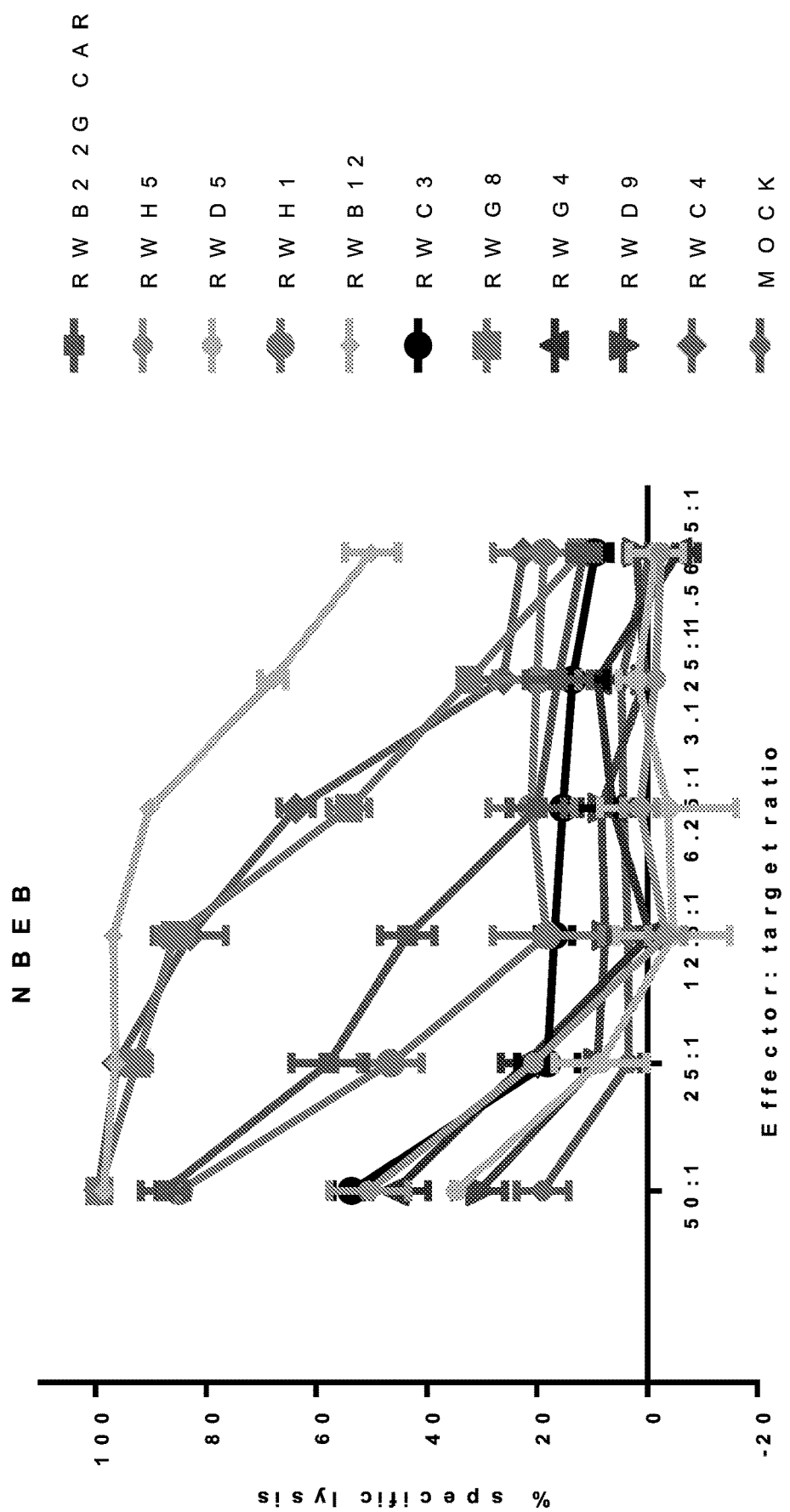
Figure 15C:
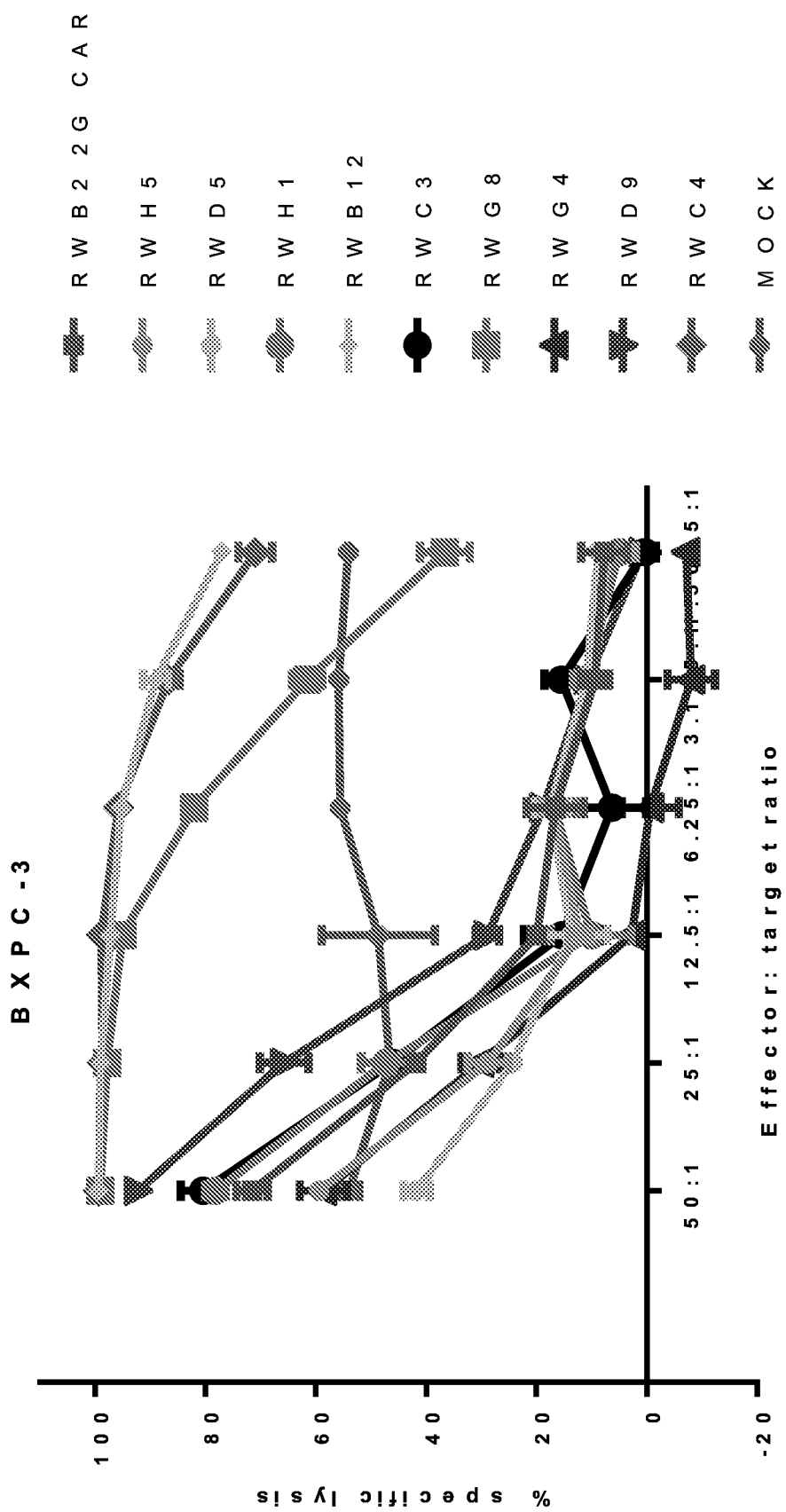
Figure 15D:
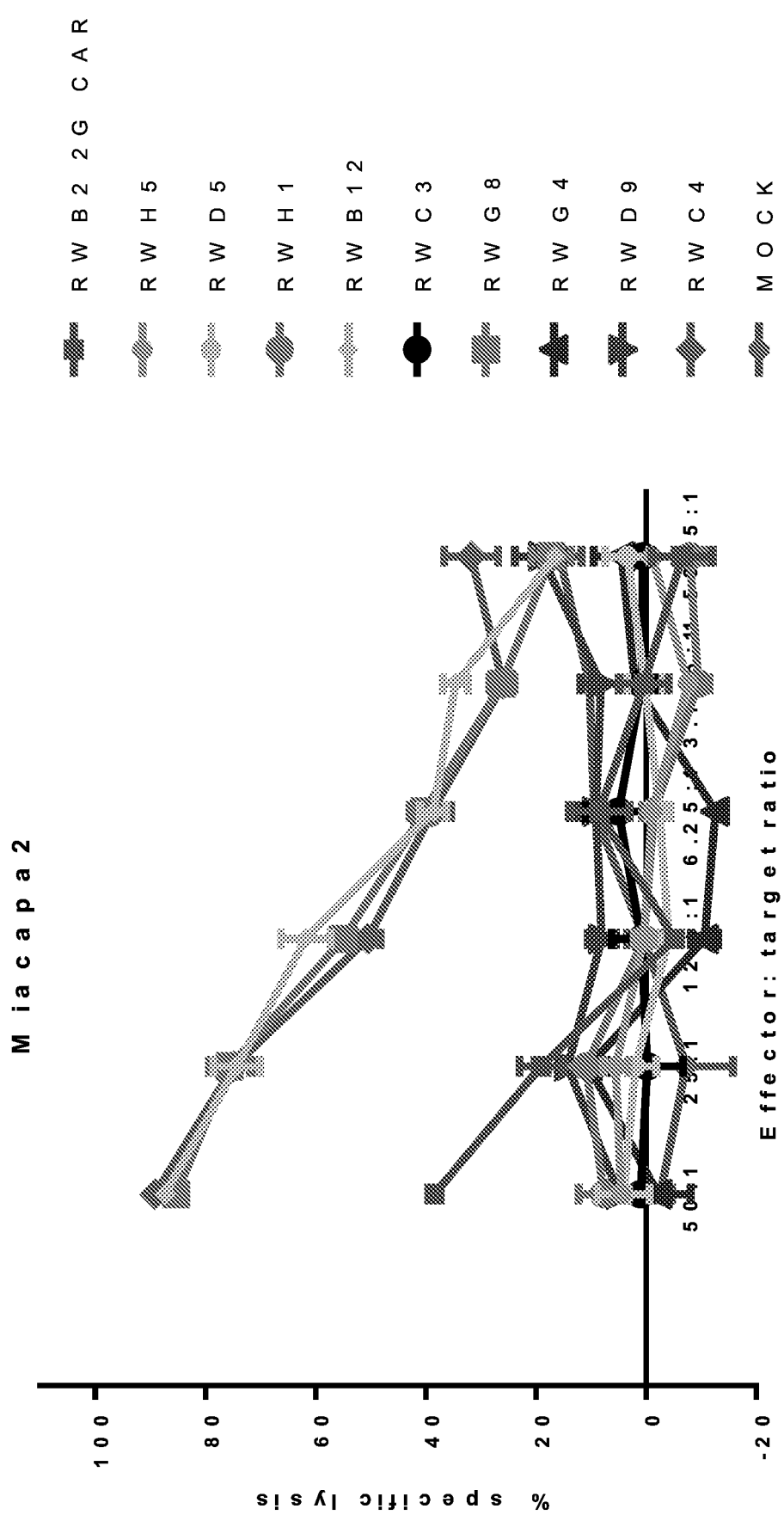

B7H3-target CAR-T cells were tested for cytotoxicity against B7H3-positive and B7H3 knockout cells. FIG. 15 shows the results of a cytotoxicity assay using B7H3-positive human neuroblastoma NBEB cells (FIG. 15A), human neuroblastoma LAN-1 cells (FIG. 15B), human adenocarcinoma BXPC-3 cells (FIG. 15C), and human pancreas carcinoma Miacapa2 cells (FIG. 15D). In this assay, RWB12, RWG8 and RWC4 CAR-T cells were the most effective for inducing specific lysis.

Figure 16B:
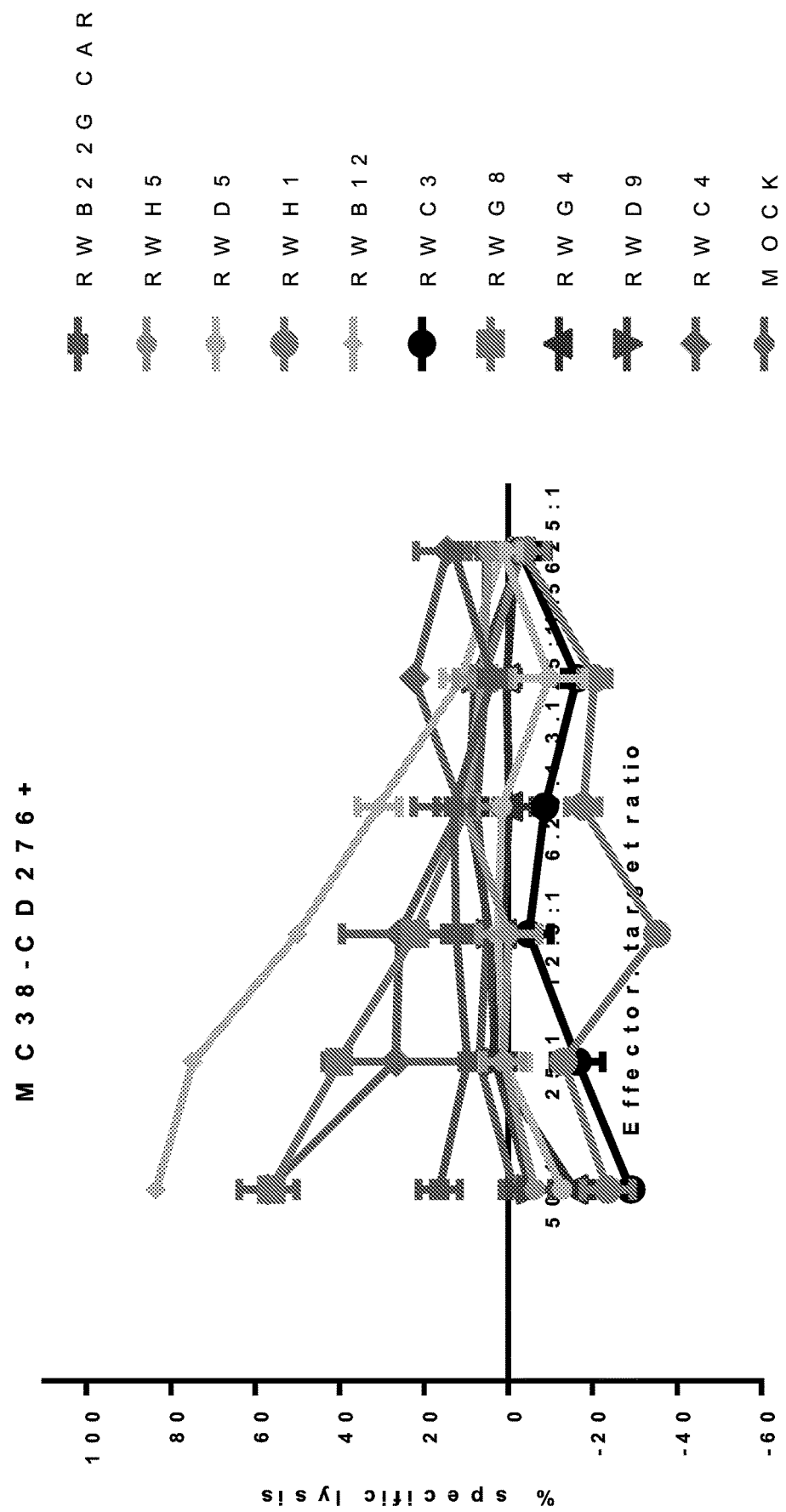
Figure 16C:
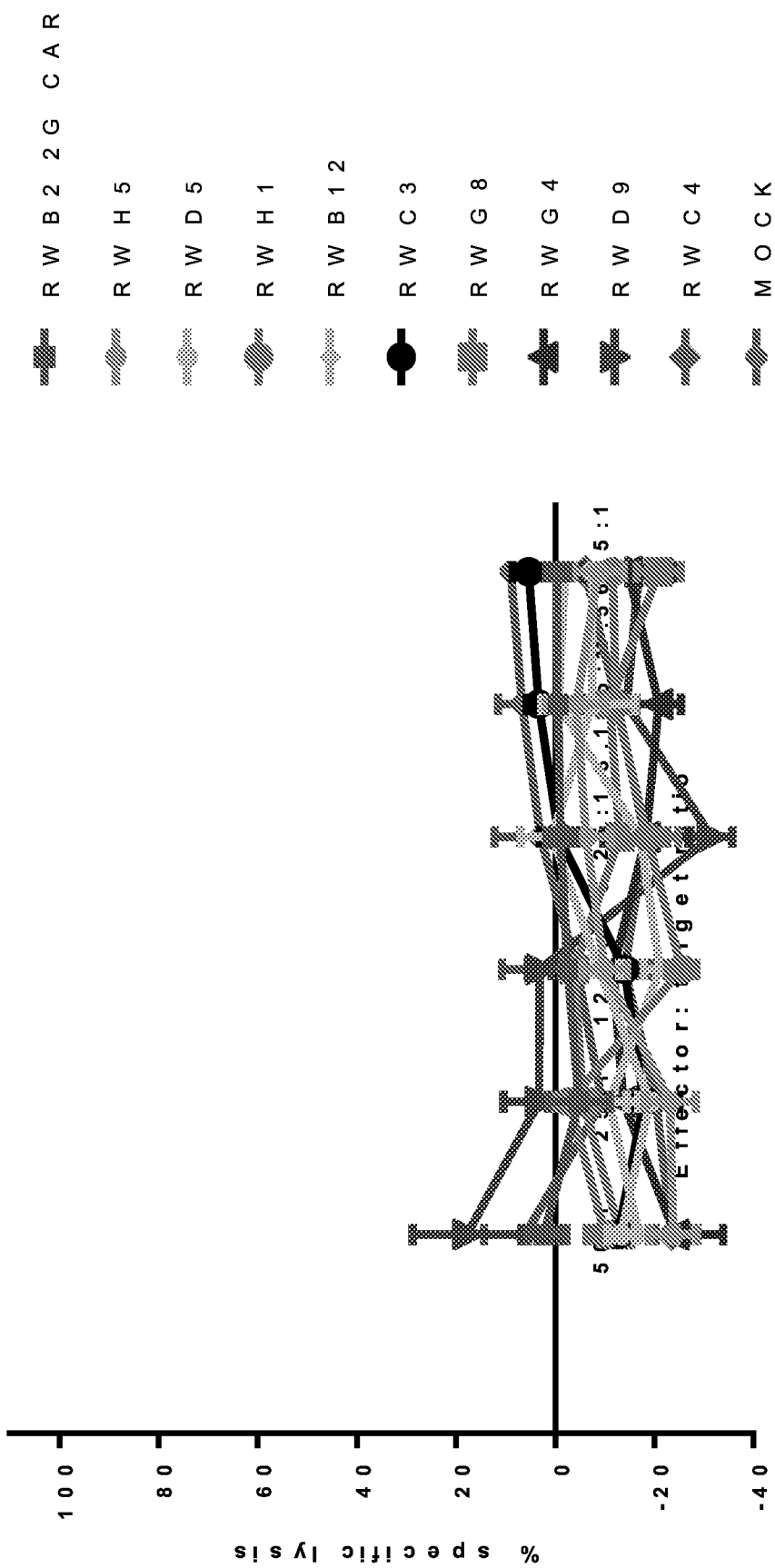

In a second assay, cytotoxicity of CAR-T cells targeting B7H3 in B7H3-positive and B7H3-knockout cells was evaluated. FIG. 16 shows the results of a cytotoxicity assay using human neuroblastoma IMR32 cells (FIG. 16A), murine colon adenocarcinoma MC38-CD276$^+$ cells (FIG. 16B), human neuroblastoma IMR32-CD276$^{-/-}$ cells (FIG.

Figure 16D:
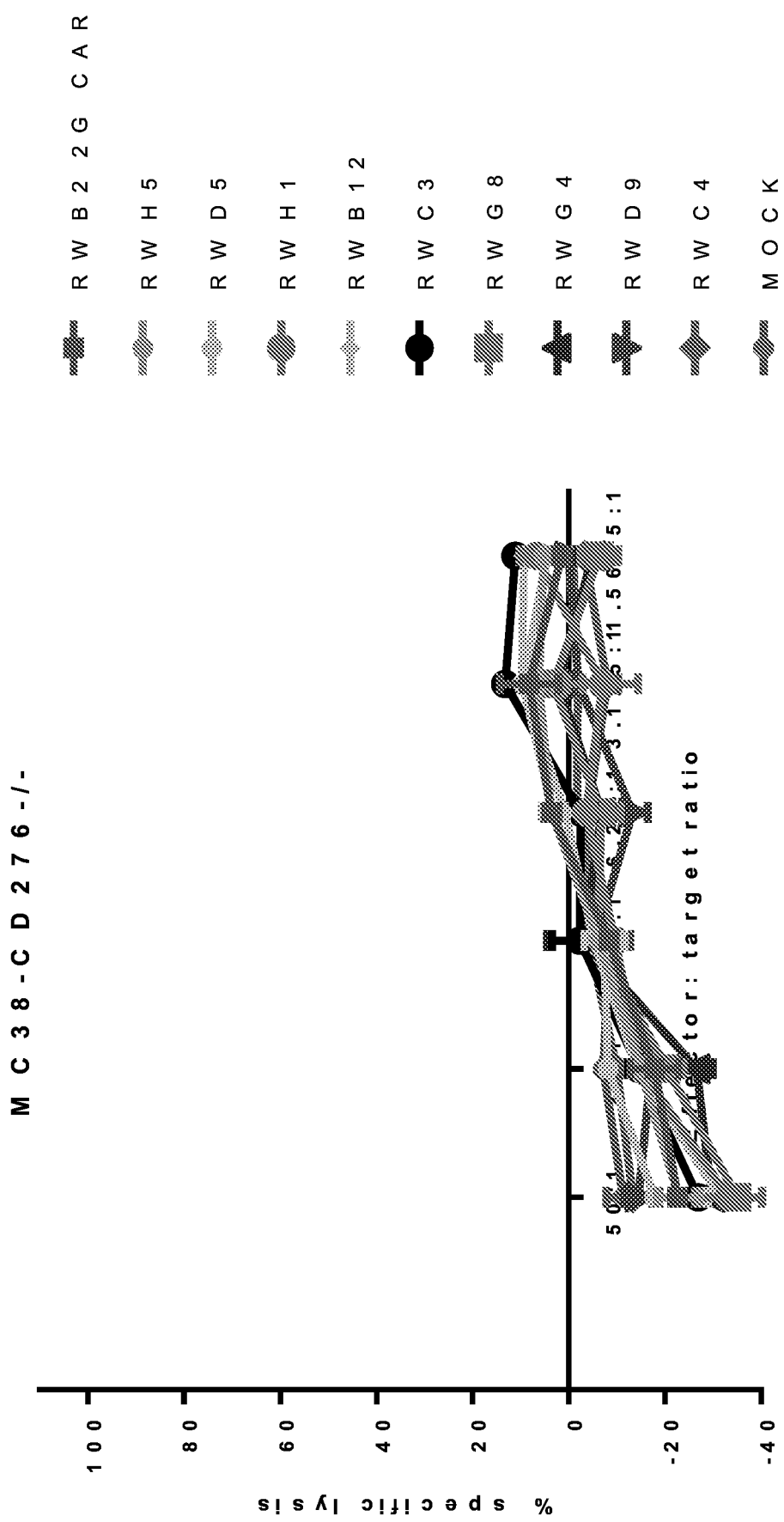

16C), and murine colon adenocarcinoma MC38-CD276$^{-/-}$ cells (FIG. 16D). Three of the CAR T-cells (RWB12, RWG8 and RWC4) exhibited potent cytotoxicity on B7H3-positive cells, but not B7H3-negative cells.

Figure 17B:
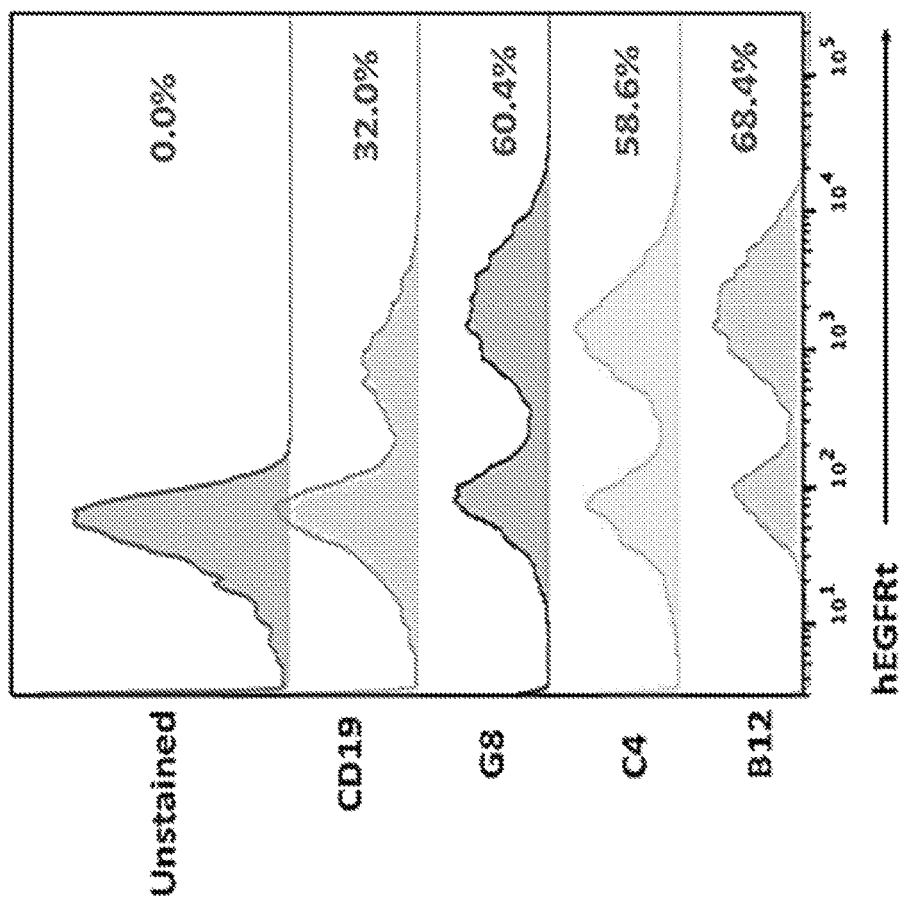
FIGS. 17A-17C: Cytotoxicity of B7H3 CAR T cells for pancreatic cancer cells. Cytotoxicity of human B7H3-targeted nanobody-derived CAR T cells (B12, G8, and C4), were evaluated using two B7H3-positive pancreatic cancer cell lines expressing Luciferase: Panc-1 GFP-Luc (GL) and BxPC-3 GL.
Figure 17A:
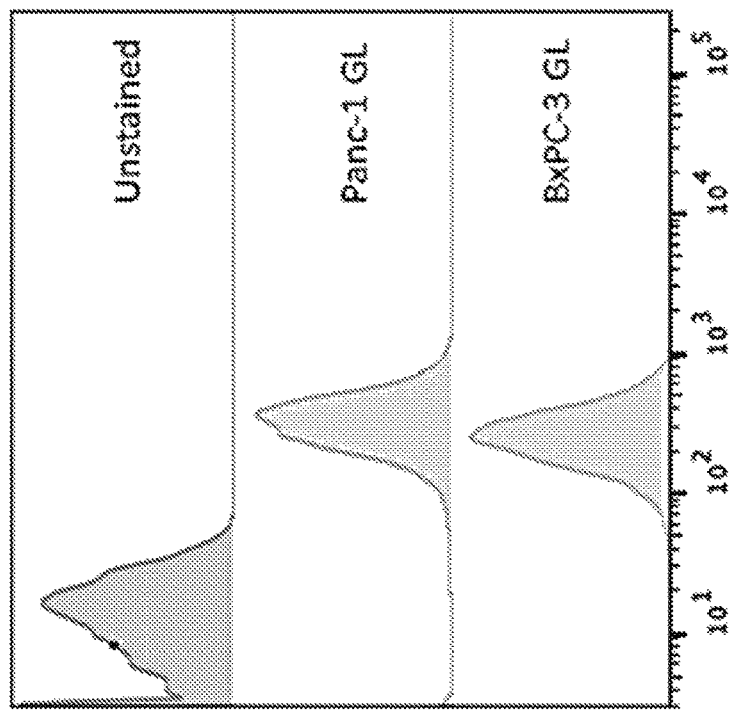
Figure 17C:
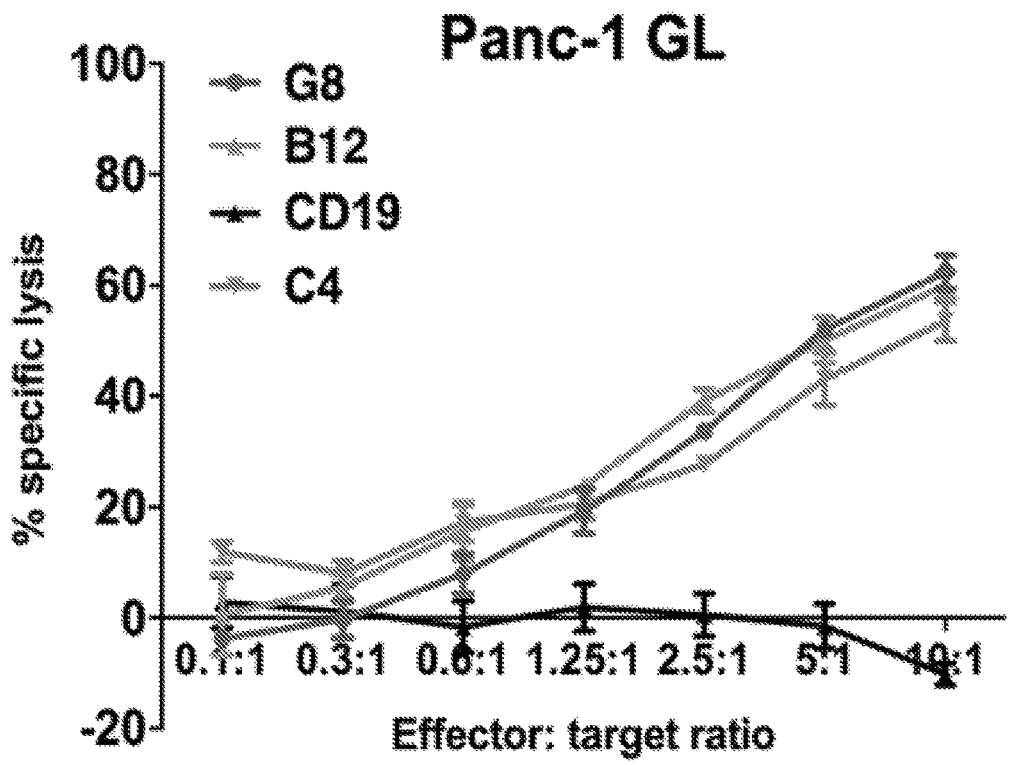
Figure 17C:
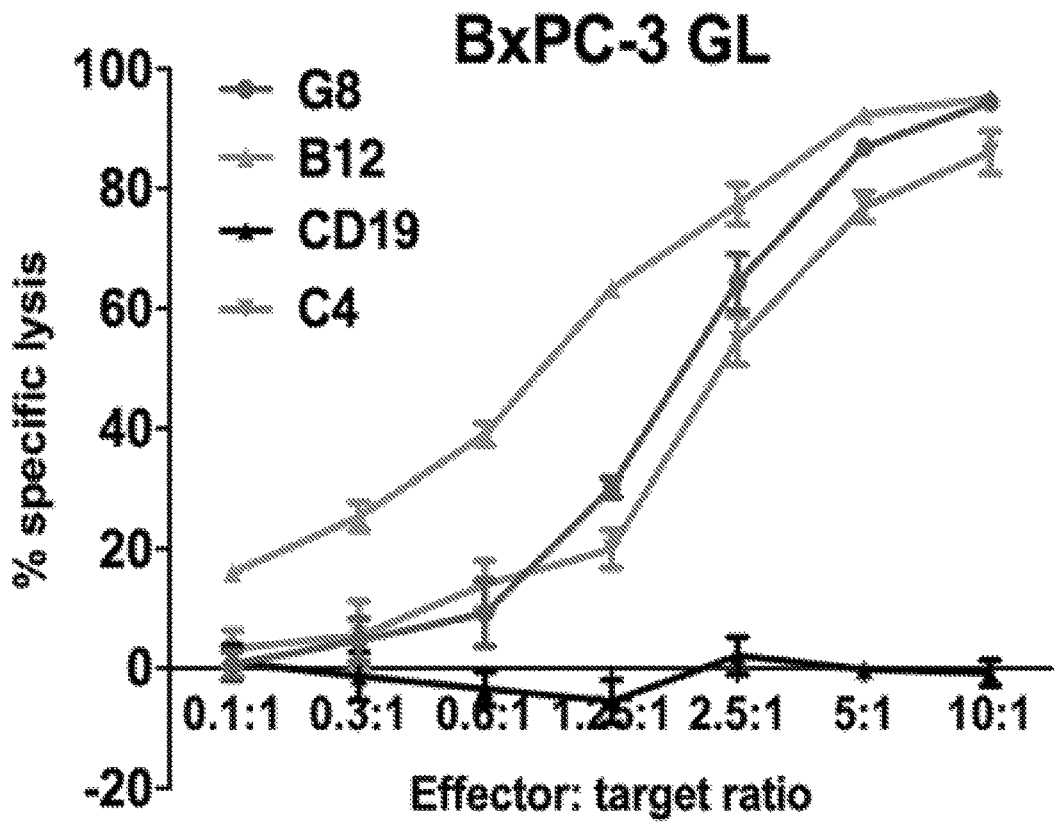

Example 4: B7H3-Targeted CAR T Cells Kill Pancreatic Tumor Cells in vitro and in vivo In vitro cytotoxicity of human B7H3-targeted nanobody-derived CART cells (RWB12, RWG8, and RWC4, shortened herein to B12, G8, and C4) were evaluated using two B7H3-positive pancreatic cancer cell lines expressing Luciferase: Panc-1 GFP-Luc (GL) and BxPC-3 GL. First, flow cytometry was performed to confirm that both Panc-1 and BxPC-1 cells express B7H3 (FIG. 17A). Transduction efficiency of lentivirus constructs expressing each B7H3-targeted CAR, as well as a CAR targeting CD19, was also determined by flow cytometry. As shown in FIG. 17B, the transduction efficiency of G8, C4 and B12 CARs was 60.4%, 58.6%, and 68.4%, respectively, while the transduction efficiency of T cells with an irrelevant CAR (CD19) was 32%. To assess cytotoxicity, B7H3-targeted (C4, G8 and B12) CAR T cells and control (CD19) CAR T cells were incubated with Panc-1 GL cells or BxPC-3 GL cells for 24 hours at varying Effector: Target (E:T) ratios. Both Panc-1 GL and BxPC-3 GL cells were effectively lysed by all three B7H3-targeted CAR T cells in a dose-dependent manner, while minimum killing was observed from control CAR T cells. These results demonstrate that the B7H3-targeted nanobody-based CAR T cells were able to efficiently lyse B7H3-positive pancreatic cancer cell lines in vitro.

Figure 18A:
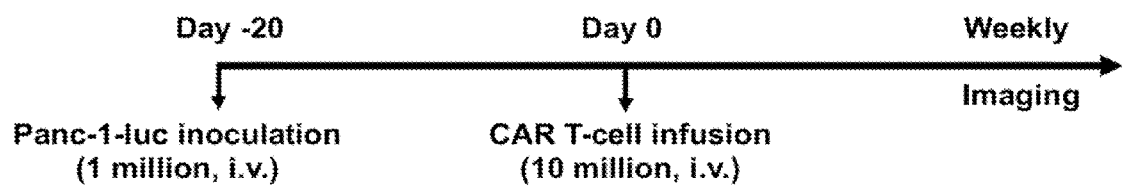
FIGS. 18A-18D: Panc-1 mouse model treated with human B7H3-specific CAR T cells at a high dose. Tumor regression in the Panc-1 xenograft mouse model following infusion of 10 million B7H3-targeted CAR T cells was evaluated.
Figure 18B:
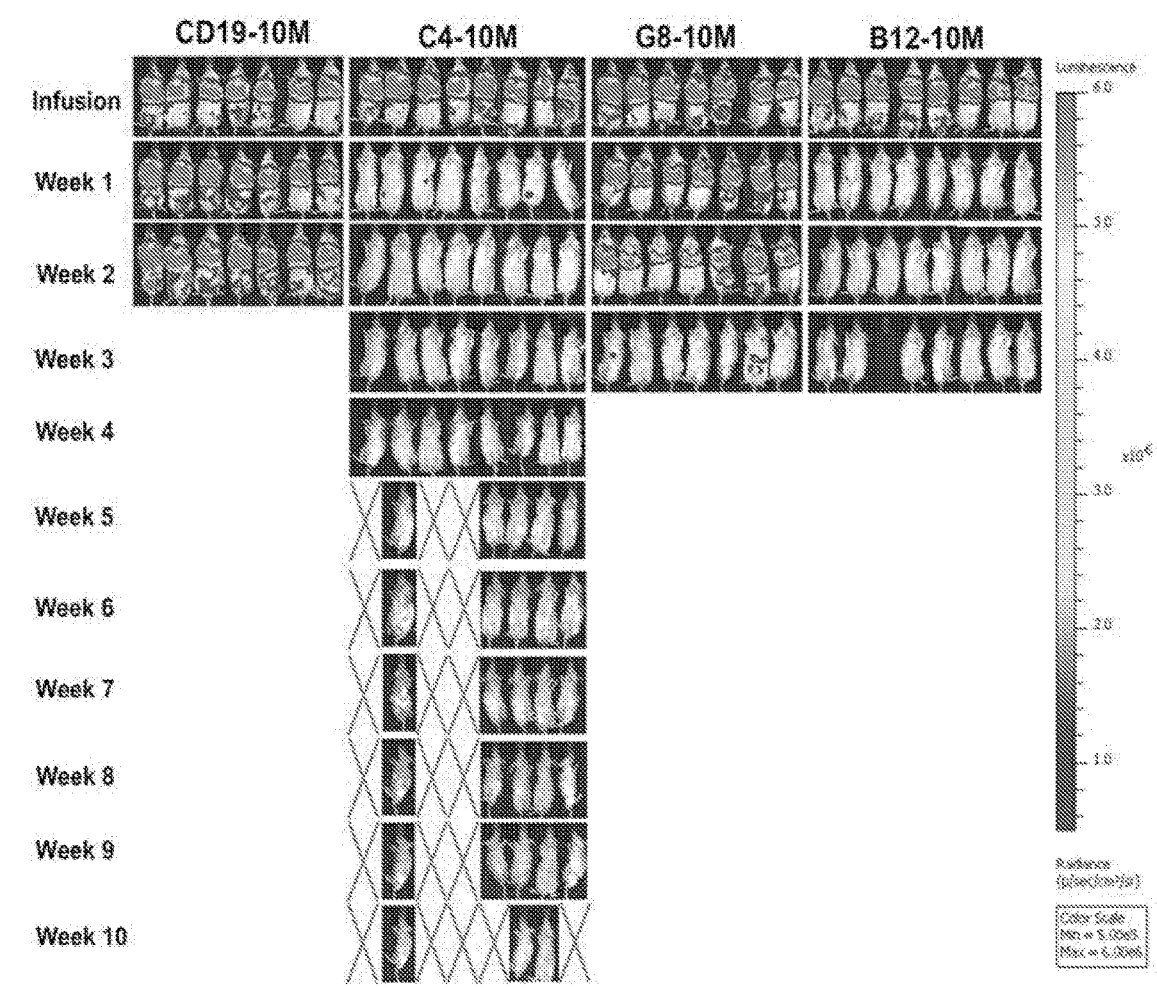
Figure 18C:
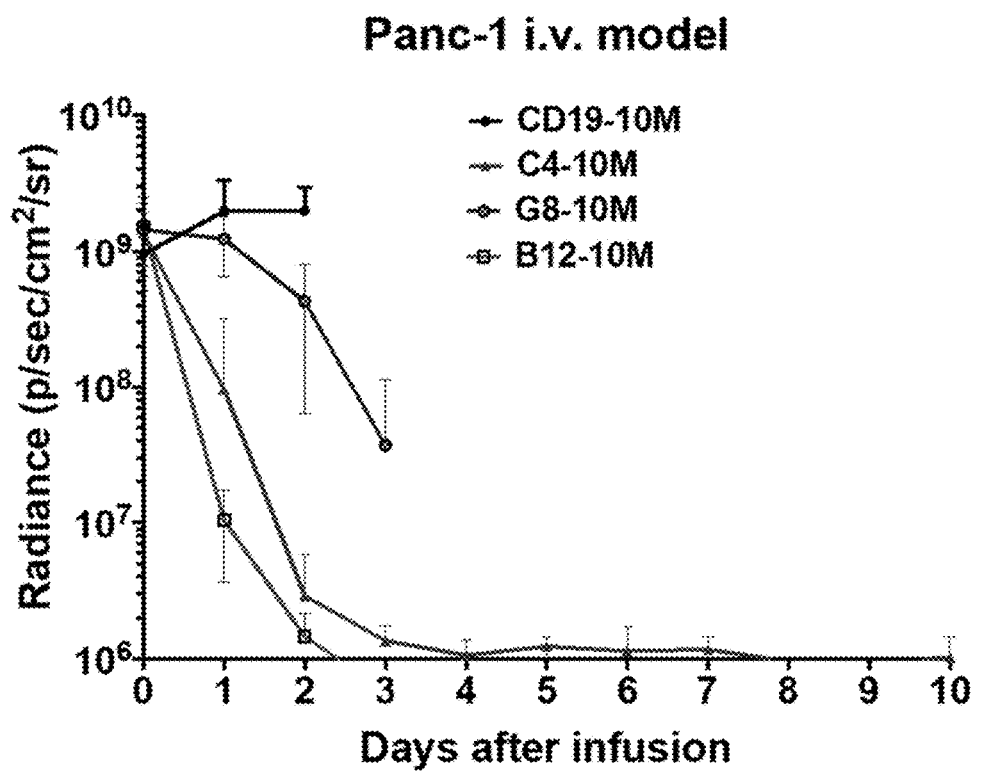
Figure 18D:
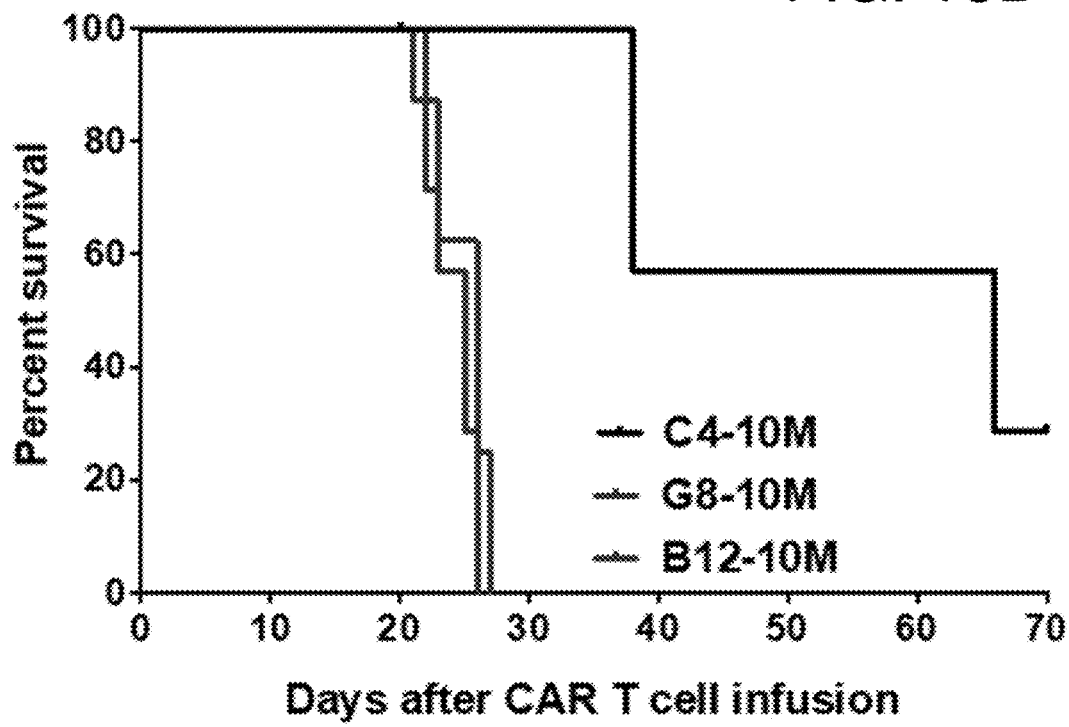

B7H3-targeted CAR T cells were further evaluated in a Panc-1 mouse xenograft model. One study utilized a high dose of CAR T cells (10 million) and a second study utilized a lower dose (5 million CAR T cells). A schematic of the experimental design for the high dose study is shown in FIG. 18A. One million Panc-1 GFP/Luc tumor cells were i.v. implanted into NSG mice to establish the tumor model. After 20 days (Day 0), mice were i.v. infused with 10 million C4, G8 or B12 CART cells (or control CD19 CART cells), and imaging was performed weekly. Representative bioluminescence images of Panc-1 tumor growth are shown in FIG. 18B. Mice treated with 10 million B7H3-targeted CAR T cells (C4, G8 or B12) showed significantly decreased tumor growth as compared with infusion of control CAR T cells, as evidenced by a decrease in tumor bioluminescence, measured as photons per second in CAR T cell-treated mice (FIG. 18C). Survival of mice treated with B7H3-targeted CAR T cells was also determined. FIG. 18D shows a Kaplan-Meier survival curve of tumor-bearing mice after treatment with 10 million C4, G8 or B12 CAR T cells. The results demonstrate that C4 CAR T cells are more potent than G8 or B12 CART cells in promoting mouse survival when administered at a high dose (10 million), and indicate that administration of 10 million CAR T cells is safe for mice.

Figure 19A:
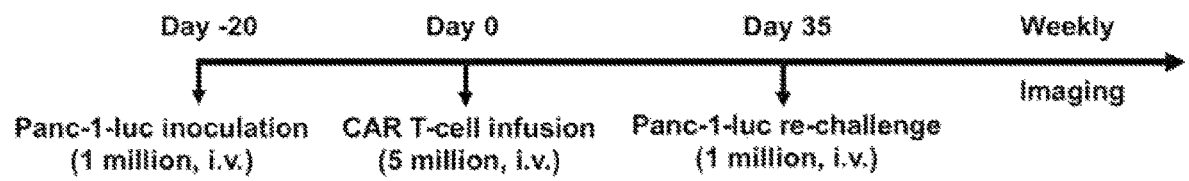
FIGS. 19A-19D: Panc-1 mouse model treated with human B7H3-specific CAR T cells at a low dose. Tumor regression in the Panc-1 xenograft mouse model following infusion of 5 million B7-H3-targeted CAR T cells was measured after tumor re-challenge.
Figure 19B:
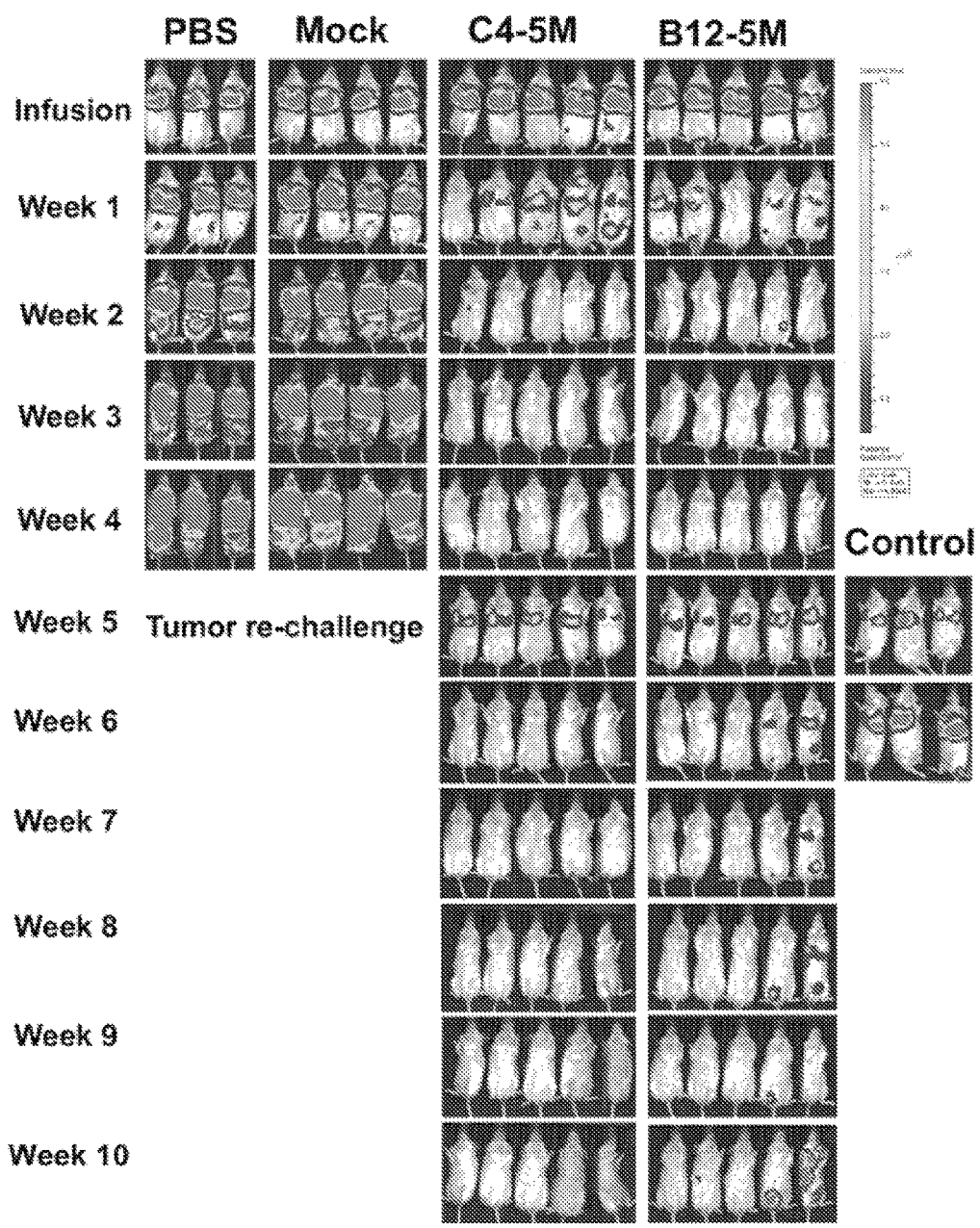
Figure 19C:
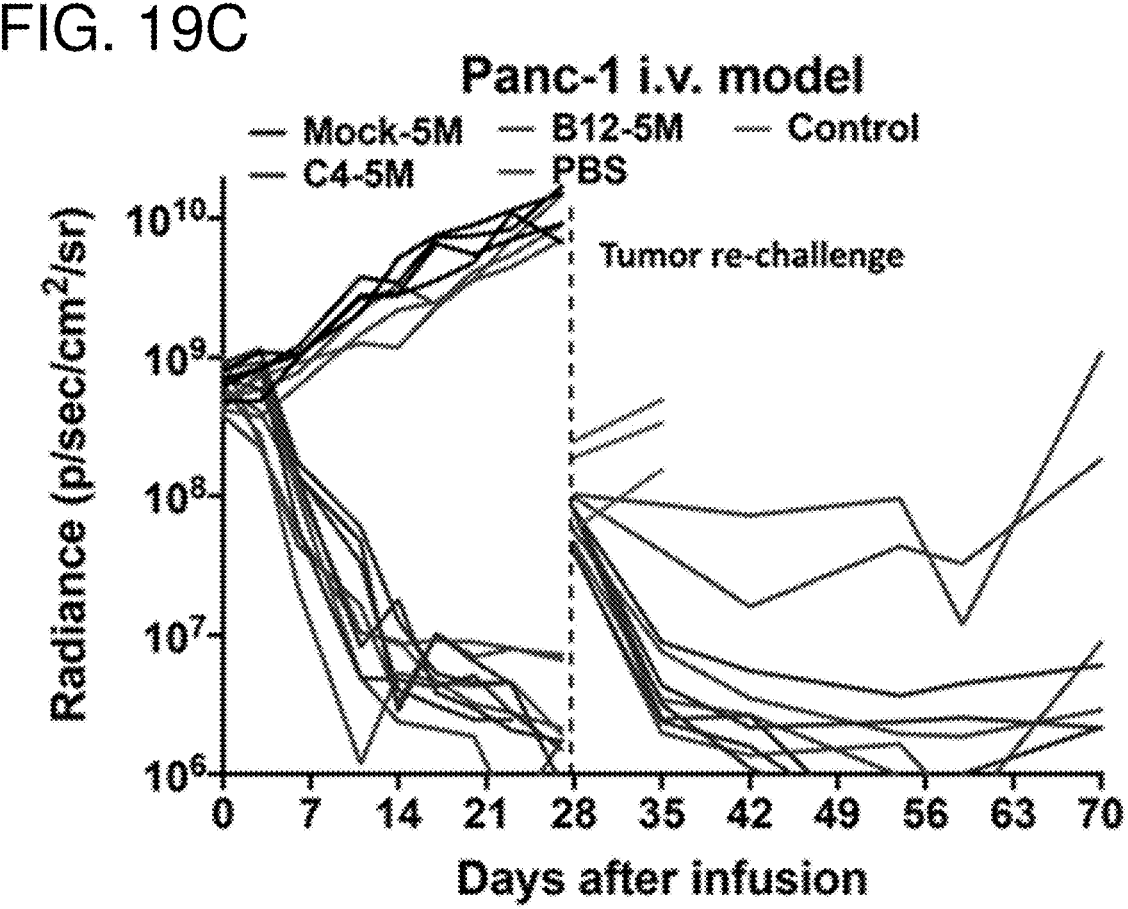
Figure 19D:
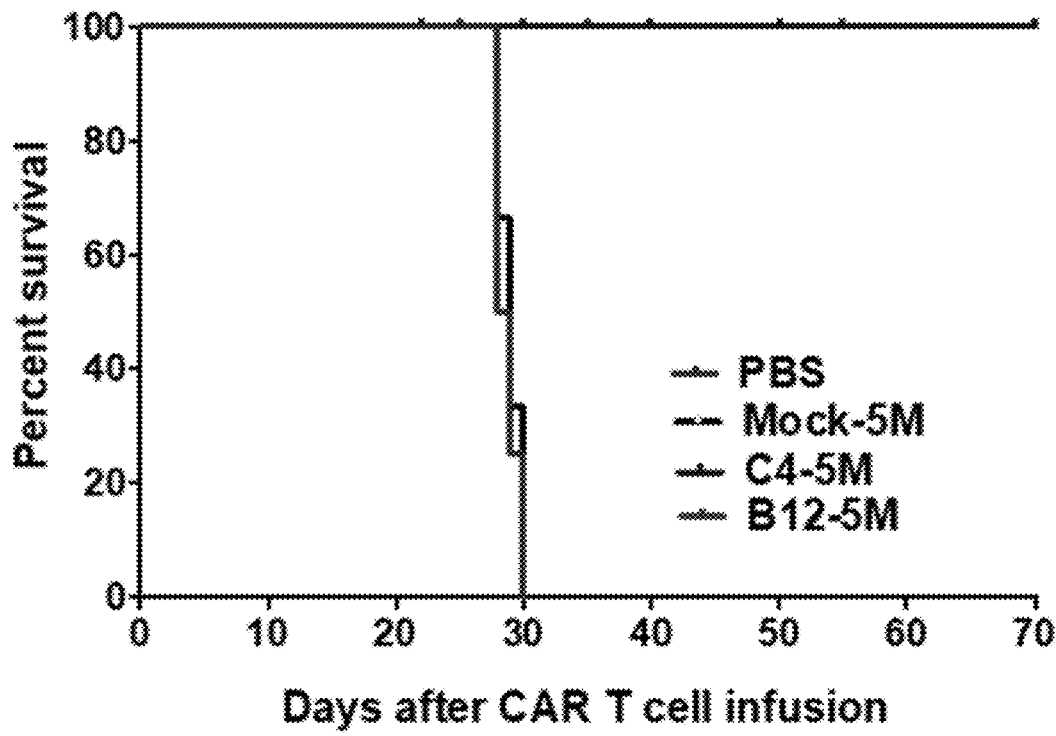

A second in vivo study evaluated treatment of Panc-1-tumor bearing mice with a lower dose of B7H3-specific CAR T cells infused following tumor re-challenge. A schematic of the experimental design for this study is shown in FIG. 19A. Panc-1 xenograft mice were i.v. infused with 5 million C4 CART cells, 5 million B12 CAR T cells, 5 million untransduced T cells (mock) or PBS 20 days (day 0) following inoculation of 1 million Panc-1-Luc cells. C4 CAR T cell- and B12 CAR T cell-treated mice that showed no detectable tumor were i.v. implanted with 1 million Panc-1 cells on day 35. As a control, naïve mice were implanted with Panc-1 cells. Imaging was performed weekly. Representative bioluminescence images of Panc-1 tumor growth in CAR T cell-treated mice are shown in FIG. 19B. Mice treated with 5 million C4 CAR T cells or 5 million B12 CAR T cells showed significantly decreased tumor growth compared with mice administered mock T cells or PBS. While tumors grew rapidly in control mice, 100% of mice previously treated with C4 CAR T cells remained tumor free after Panc-1 tumor re-challenge, and 60% of mice previously treated with B12 CAR T cells remained tumor free until 10 weeks after treatment. Quantification of tumor bioluminescence is shown in FIG. 19C. Survival of mice treated with B7H3-targeted CAR T cells was also determined. FIG. 19D shows a Kaplan-Meier survival curve of tumor-bearing mice after treatment. Mice that received 5 million C4 or B12 CAR T cells were still alive at day 70. In contrast, no mice treated with PBS or mock T cells survived more than 30 days following infusion.

Figure 20A:
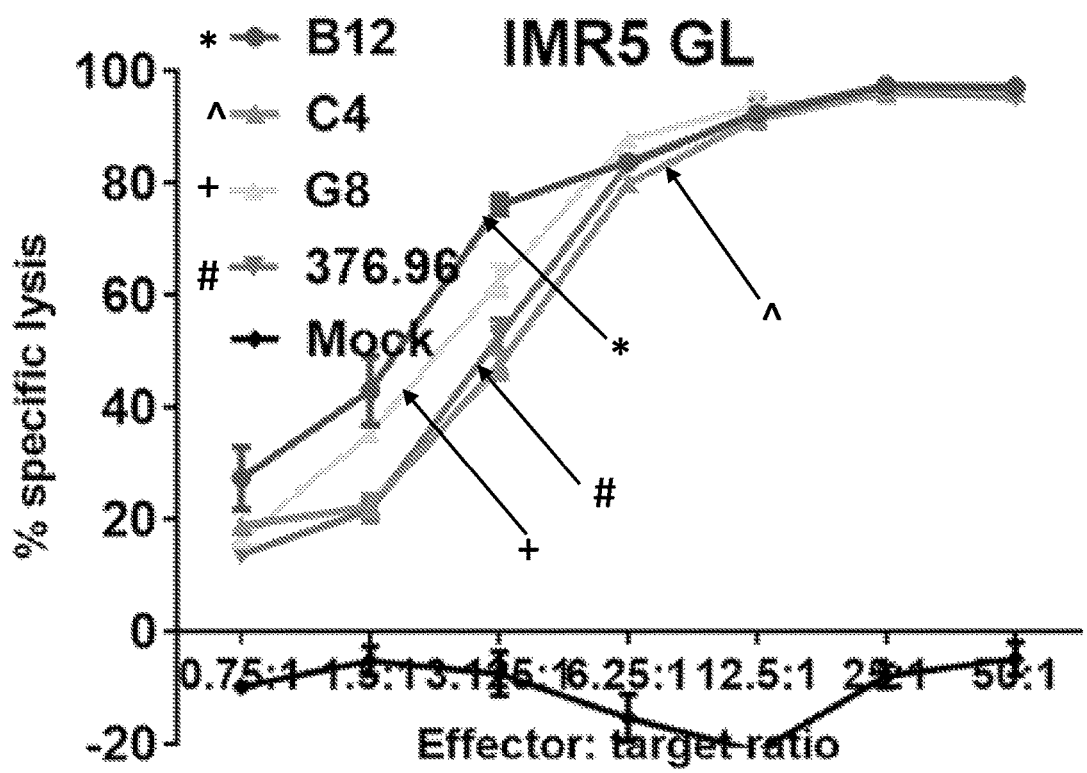
FIGS. 20A-20D: Testing of B7H3-targeted CAR T cells in the IMR5 neuroblastoma mouse model.

Example 5: B7H3-Targeted CAR T Cells Kill Neuroblastoma Tumor Cells in vitro and in vivo In vitro cytotoxicity of B7H3-targeted CAR T cells against neuroblastoma cell line IMR5 was tested. This study compared CAR T cells produced using the B7H3-targeted nanobodies disclosed herein with CAR T cells based on the commercial anti-human B7H3 hybridoma antibody 376.96 (Du et al., Cancer Cell 35(2): 221-237, 2019). G8, B12, C4 and 376.96 CART cells were incubated with IMR5 GL cells for 24 hours at varying Effector:Target (E:T) ratios. All CAR T cells effectively lysed IMR5 tumor cells in a dose-dependent manner compared with mock T cells; however, B12 CAR T cells were slightly more effective than the other CAR T cells tested (FIG. 20A).

Figure 20B:
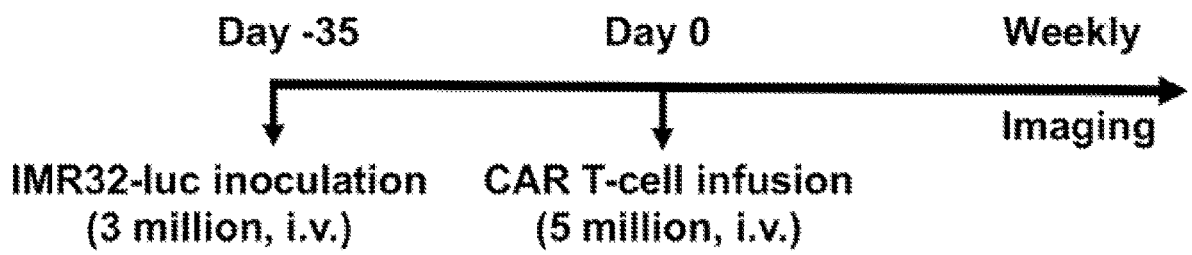
Figure 20C:
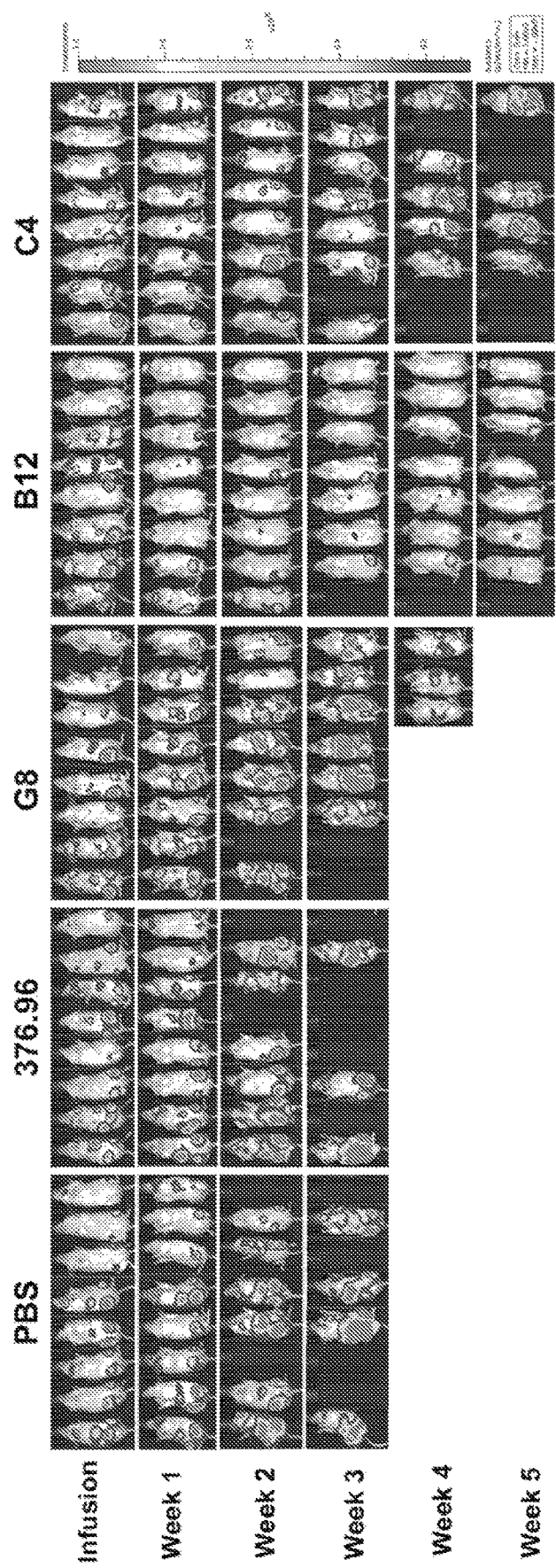
Figure 20D:
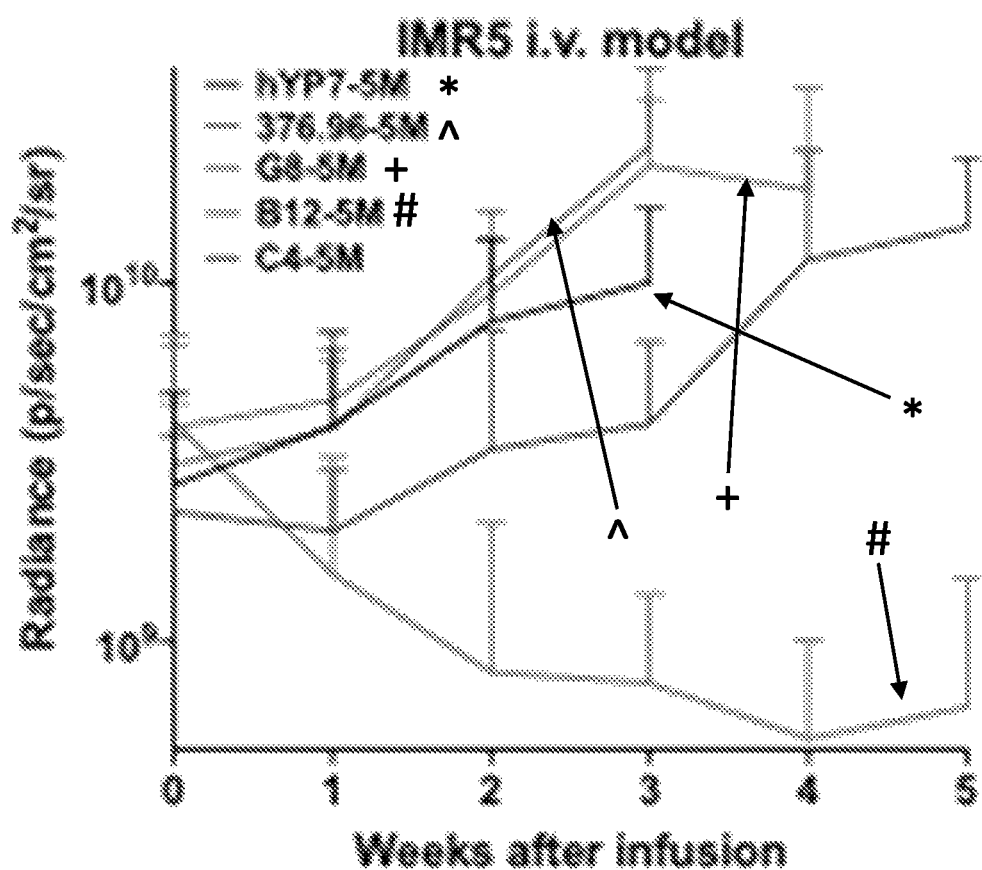

The CAR T cells were next evaluated in an IMR5 xenograft model (see schematic in FIG. 20B). IMR5 xenograft mice were i.v. infused with 5 million C4 CAR T cells, B12 CAR T cells, G8 CAR T cells, 376.96 CAR T cells or untransduced T cells (mock) 35 days (day 0) after tumor inoculation. Representative bioluminescence images of IMR5 tumor growth in the xenograft model is shown in FIG. 20C and quantification of tumor bioluminescence is shown in FIG. 20D. Mice treated with 5 million B12 CAR T cells showed significantly decreased tumor growth compared with 376.96 CAR T cells and mock T cells. C4 CAR T cells also showed modest anti-tumor activity.

Example 6: Cross-Reactivity of G8 for Mouse B7H3

Figure 21A:
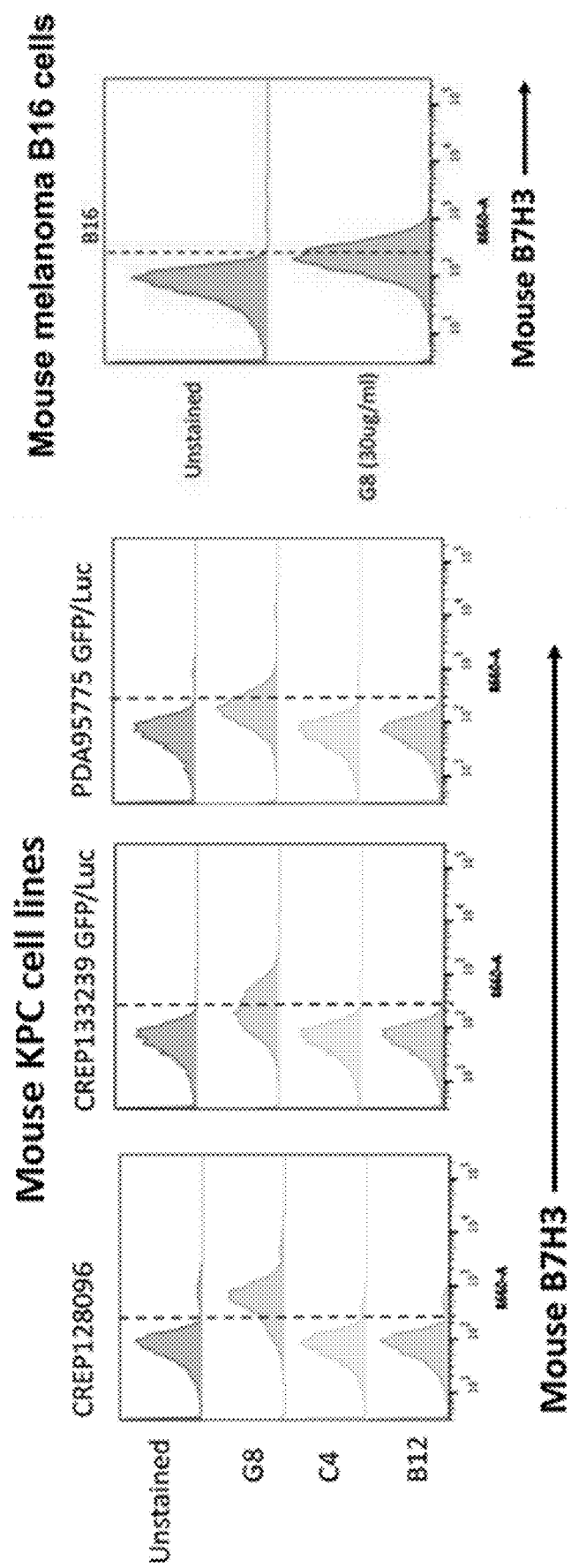
Figure 21B:
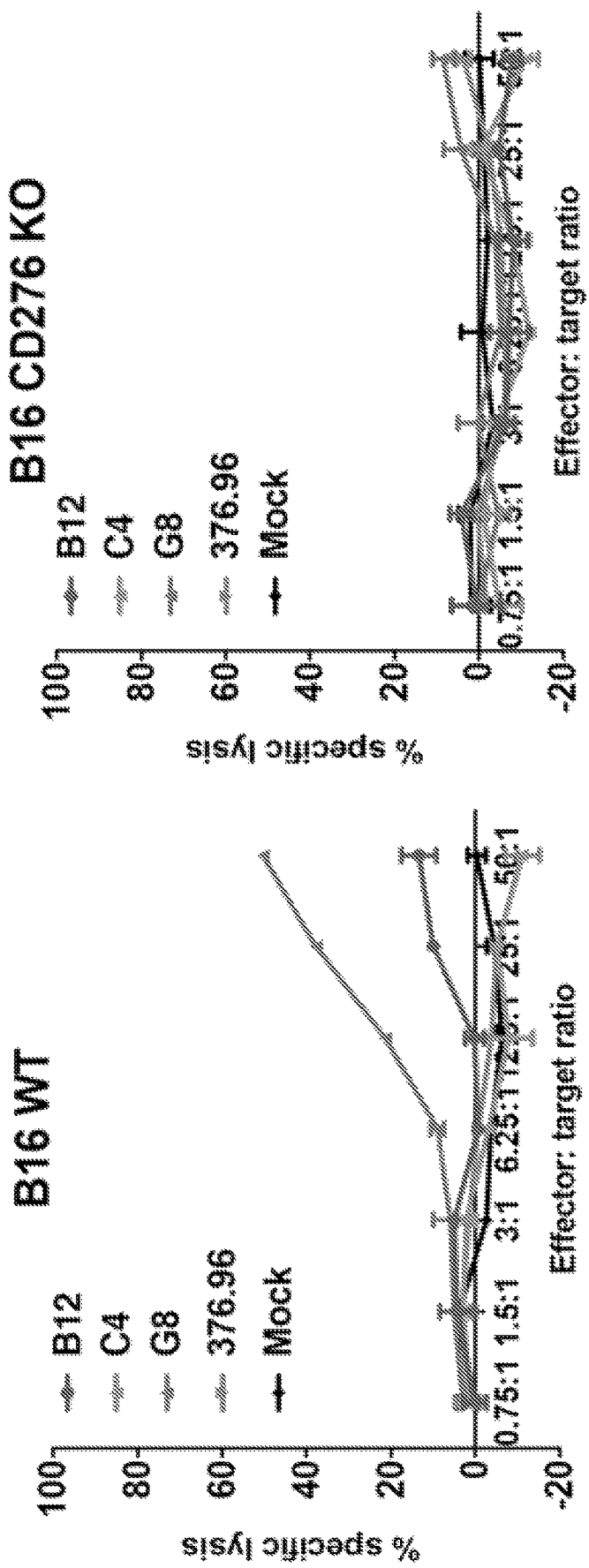

Binding activity of anti-B7H3 nanobodies G8, C4 and B12 to mouse B7H3 was measured by flow cytometry. G8, but not C4 or B12, showed positive binding to mouse B7H3 expressed on three KPC cell lines (CREP128096, CREP133239, and PDA95775; pancreatic ductal adenocarcinoma cells) and mouse melanoma cell line B16. In vitro cytotoxicity of B7H3-targeted CARs was evaluated using B16 melanoma cells and B7H3 (CD276) knockout cells. Only G8 CAR T cells showed specific killing of mouse B7H3-positive B16 cells (FIG. 21B).

Example 7: Epitope Mapping of B7H3 Nanobodies

Figure 21C:
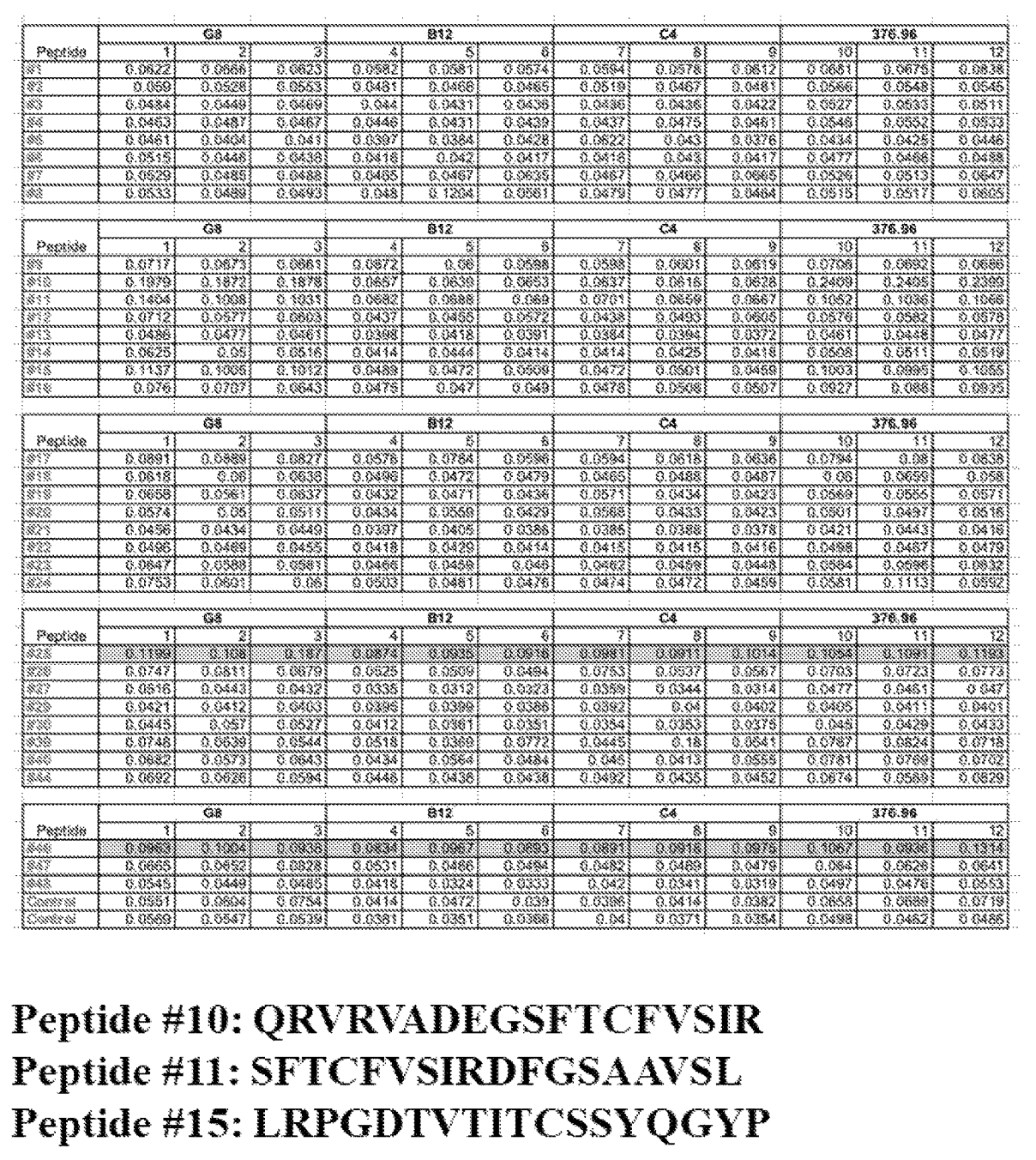

Epitope mapping of the anti-B7H3 nanobodies and commercial antibody 376.96 was performed. A total of 48 peptides from the human B7H3 protein were designed and synthesized. Each peptide consisted of 18 amino acids and overlapped with adjacent peptides by 9 amino acids. ELISA technology was used to test binding ability of the antibodies to each peptide (FIG. 21C). The results demonstrate that G8 and 376.96 bind a similar epitope, as both bound to peptides 10, 11, and 15 (SEQ ID NOs: 35-37). C4 and B12 may have a conformational epitope that couldn't be predicted by a linearized peptide library.

In view of the many possible embodiments to which the principles of the disclosed subject matter may be applied, it should be recognized that the illustrated embodiments are only examples of the disclosure and should not be taken as limiting the scope of the disclosure. Rather, the scope of the disclosure is defined by the following claims. We therefore claim all that comes within the scope and spirit of these claims.

The invention claimed is:

1. A single-domain monoclonal antibody that specifically binds B7H3, wherein the antibody comprises the complementarity determining region 1 (CDR1), CDR2 and CDR3 sequences of SEQ ID NO: 3, SEQ ID NO: 1, SEQ ID NO: 2, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11 or SEQ ID NO: 12.

2. The antibody of claim 1, wherein the CDR sequences are defined using the Kabat, IMGT or Paratome numbering schemes.

3. The antibody of claim 1 slim-2, wherein the CDR1, CDR2 and CD3 sequences respectively comprise:
residues 31-35, 50-66 and 97-114 of SEQ ID NO: 3;
residues 26-33, 51-58 and 97-115 of SEQ ID NO: 3;
residues 26-35, 50-61 and 98-114 of SEQ ID NO: 3;
residues 31-35, 50-66 and 97-118 of SEQ ID NO: 1;
residues 26-33, 51-58 and 97-119 of SEQ ID NO: 1;
residues 27-35, 47-62 nd 98-118 of SEQ ID NO: 1;
residues 31-35, 50-66 and 97-105 of SEQ ID NO: 2;
residues 26-33, 51-58 and 97-106 of SEQ ID NO: 2;
residues 27-35, 47-61 and 97-106 of SEQ ID NO: 2;

residues 31-35, 50-65 and 96-110 of SEQ ID NO: 4;
residues 26-33, 51-57 and 96-110 of SEQ ID NO: 4;
residues 27-35, 47-60 and 96-109 of SEQ ID NO: 4;
residues 27-30, 45-61 and 96-109 of SEQ ID NO: 5;
residues 26-28, 46-53 and 90-110 of SEQ ID NO: 5;
residues 27-30, 43-55 and 90-110 of SEQ ID NO: 5;
residues 31-35, 50-65 nd 96-111 of SEQ ID NO: 6;
residues 26-33, 51-57 and 96-112 of SEQ ID NO: 6;
residues 27-35, 47-60 and 96-111 of SEQ ID NO: 6;
residues 31-35, 50-65 and 96-111 of SEQ ID NO: 7;
residues 26-33, 51-57 and 96-112 of SEQ ID NO: 7;
residues 27-35, 47-60 and 96-111 of SEQ ID NO: 7;
residues 31-35, 50-65 and 96-111 of SEQ ID NO: 8:
residues 26-33, 51-57 and 96-112 of SEQ ID NO: 8;
residues 27-35, 47-60 and 96-111 of SEQ ID NO: 8;
residues 31-35, 50-65 and 96-111 of SEQ ID NO: 9;
residues 26-33, 51-57 and 96-112 of SEQ ID NO: 9;
residues 27-35, 47-60 and 96-111 of SEQ ID NO: 9;
residues 31-35, 50-65 and 96-113 of SEQ ID NO: 10;
residues 26-33, 51-57 and 96-114 of SEQ ID NO: 10;
residues 27-35, 47-60 and 97-114 of SEQ ID NO: 10;
residues 30-34, 50-64 and 93-105 of SEQ ID NO: 11;
residues 25-32, 50-56 and 93-104 of SEQ ID NO: 11;
residues 26-34, 46-59 and 93-105 of SEQ ID NO: 11;
residues 32-35, 51-65 and 94-107 of SEQ ID NO: 12;
residues 26-33, 51-57 and 94-107 of SEQ ID NO: 12; or
residues 27-35, 47-60 and 94-108 of SEQ ID NO: 12.

4. The antibody of claim 1, wherein the amino acid sequence of the antibody is at least 90% identical to SEQ ID NO: 3, SEQ ID NO: 1, SEQ ID NO: 2, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11 or SEQ ID NO: 12.

5. The antibody of claim 1, wherein the amino acid sequence of the antibody comprises SEQ ID NO: 3, SEQ ID NO: 1, SEQ ID NO: 2, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11 or SEQ ID NO: 12.

6. The antibody of claim 1, wherein the antibody is a humanized antibody.

7. The antibody of claim 1, wherein the antibody is a chimeric antibody.

8. A chimeric antigen receptor (CAR) comprising the antibody of claim 1.

9. The CAR of claim 8, further comprising a hinge region, a transmembrane domain, a costimulatory signaling moiety, and a signaling domain.

10. The CAR of claim 9, wherein:
the hinge region comprises a CD8α hinge region;
the transmembrane domain comprises a CD8α transmembrane domain;
the costimulatory signaling moiety comprises a 4-1BB signaling moiety;
the signaling domain comprises a CD3ζ signaling domain.

11. An isolated cell expressing the CAR of claim 8.

12. The isolated cell of claim 11, wherein the isolated cell is an immune cell.

13. An immunoconjugate comprising the antibody of claim 1 and an effector molecule.

14. The immunoconjugate of claim 13, wherein the effector molecule is a toxin, a photon absorber or a detectable label.

15. An antibody-drug conjugate (ADC) comprising a drug conjugated to the antibody of claim 1.

16. A multi-specific antibody comprising the antibody of claim 1 and at least one additional monoclonal antibody or antigen-binding fragment thereof.

17. The multi-specific antibody of claim 16, wherein the at least one additional monoclonal antibody or antigen binding fragment thereof specifically binds a component of the T cell receptor or a natural killer (NK) cell activating receptor.

18. An antibody-nanoparticle conjugate, comprising a nanoparticle conjugated to the antibody of claim 1.

19. The antibody-nanoparticle conjugate of claim 18, wherein the nanoparticle comprises a polymeric nanoparticle, nanosphere, nanocapsule, liposome, dendrimer, polymeric micelle, or niosome.

20. The antibody-nanoparticle conjugate of claim 18, wherein the nanoparticle comprises a cytotoxic agent.

21. A fusion protein comprising the antibody of claim 1 and a heterologous protein or peptide.

22. The fusion protein of claim 21, wherein the heterologous protein is an Fc protein or a leucine zipper.

23. An isolated nucleic acid molecule encoding the antibody of claim 1.

24. The isolated nucleic acid molecule of claim 23, operably linked to a promoter.

25. A vector comprising the nucleic acid molecule of claim 23.

26. An isolated host cell comprising the vector of claim 25.

27. A composition comprising a pharmaceutically acceptable carrier and the antibody of claim 1.

28. A method of detecting expression of B7H3 in a sample, comprising:
contacting the sample with the antibody of claim 1; and
detecting binding of the antibody to the sample, thereby detecting expression of B7H3 in the sample.

29. The method of claim 28, further comprising:
contacting the antibody with a detection antibody, and
detecting the binding of the detection antibody to the antibody, thereby detecting expression of B7H3 in the sample or diagnosing the subject as having a B7H3-positive cancer.

30. The method of claim 28, wherein the sample is obtained from a subject suspected of having a B7H3-positive cancer.

31. The method of claim 28, wherein the sample is a tumor biopsy.

* * * * *